United States Patent
Walker

(10) Patent No.: US 11,465,804 B2
(45) Date of Patent: Oct. 11, 2022

(54) BUCKET AND LID SYSTEMS AND APPARATUSES

(71) Applicant: Robin E. Walker, Chicago, IL (US)

(72) Inventor: Robin E. Walker, Chicago, IL (US)

(*) Notice: Subject to any disclaimer, the term of this patent is extended or adjusted under 35 U.S.C. 154(b) by 0 days.

(21) Appl. No.: 16/565,151

(22) Filed: Sep. 9, 2019

(65) Prior Publication Data

US 2021/0070497 A1   Mar. 11, 2021

(51) Int. Cl.
| | |
|---|---|
| *B65D 43/02* | (2006.01) |
| *B65D 21/02* | (2006.01) |
| *B65D 43/16* | (2006.01) |
| *B65D 51/24* | (2006.01) |

(52) U.S. Cl.
CPC ..... *B65D 21/0223* (2013.01); *B65D 43/0208* (2013.01); *B65D 43/161* (2013.01); *B65D 51/242* (2013.01); *B65D 2543/00027* (2013.01); *B65D 2543/00074* (2013.01); *B65D 2543/00231* (2013.01); *B65D 2543/00555* (2013.01); *B65D 2543/00712* (2013.01)

(58) Field of Classification Search
CPC  B65D 25/32; B65D 21/0223; B65D 43/0208; B65D 43/161; B65D 43/22; B65D 43/16; B65D 43/18; B65D 51/242; B65D 2543/00027; B65D 2543/00074; B65D 2543/00231; B65D 2543/00555; B65D 2543/00712; B65D 2543/000805; B65D 2543/00759; B65D 2543/00685
USPC .... 220/265, 266, 263, 904, 760, 761, 254.3, 220/784, 786, 780, 254.1
See application file for complete search history.

(56) References Cited

U.S. PATENT DOCUMENTS

| | | | |
|---|---|---|---|
| 1,031,015 A * | 7/1912 | Lundgaard | A47J 36/08 210/245 |
| 1,170,797 A | 2/1916 | Burroughs | |
| 1,441,040 A | 1/1923 | Stephenson | |
| D163,697 S | 6/1951 | Keiding et al. | |
| 2,711,267 A | 6/1955 | Doolittle | |
| 3,421,654 A | 1/1969 | Hexel | |
| 3,696,962 A * | 10/1972 | Fehres | B65D 43/0212 220/319 |
| 3,782,583 A | 1/1974 | Abbey | |
| 3,831,798 A * | 8/1974 | Rowe | B65D 25/32 215/256 |
| 4,754,898 A | 7/1988 | Britt et al. | |

(Continued)

OTHER PUBLICATIONS

E-Z Bucket Covers, SmartPak Equine, http://www.smartpakequine.com, retrieved Feb. 24, 2016.

(Continued)

*Primary Examiner* — Don M Anderson
*Assistant Examiner* — Elizabeth J Volz
(74) *Attorney, Agent, or Firm* — McAndrews Held & Malloy, Ltd.

(57) ABSTRACT

A lid for a bucket comprises a center portion and at least one side portion. In some embodiments, the side portion is removably coupled to the center portion. In some embodiments, the side portion is hingedly connected to the center portion and includes at least one cutout suitable for receiving a bail mount of the bucket. The hinged connection between the center portion and the side portion may be on an axis substantially perpendicular to an axis on which plural bail mounts of the bucket lie.

4 Claims, 70 Drawing Sheets

(56) References Cited

U.S. PATENT DOCUMENTS

| | | | |
|---|---|---|---|
| 4,896,452 A | 1/1990 | Smith et al. | |
| 4,946,057 A | 8/1990 | Connolly et al. | |
| 4,955,513 A | 9/1990 | Bennett | |
| 5,345,784 A | 9/1994 | Bazemore et al. | |
| D351,701 S | 10/1994 | Sawatsky | |
| 5,452,820 A | 9/1995 | Mislavsky | |
| D389,553 S | 1/1998 | Muto | |
| 5,758,886 A | 6/1998 | Mayer | |
| 5,870,969 A | 2/1999 | Boyce | |
| D425,600 S | 5/2000 | Pas et al. | |
| D439,022 S | 3/2001 | Brandeis | |
| D442,668 S | 5/2001 | Tobias | |
| 6,357,169 B1 * | 3/2002 | Gouge | A01K 97/05 220/263 |
| D462,737 S | 9/2002 | Lipari | |
| 6,783,018 B1 | 8/2004 | Rondeau | |
| 6,851,569 B2 | 2/2005 | Conti et al. | |
| 6,866,172 B2 | 3/2005 | Shackelford | |
| 7,150,380 B2 * | 12/2006 | Hoepner | B65D 43/169 222/480 |
| 7,201,355 B1 | 4/2007 | Zien et al. | |
| D552,351 S | 10/2007 | Bauers | |
| D553,319 S | 10/2007 | Martelly | |
| D589,214 S | 3/2009 | Johnston | |
| D593,269 S | 5/2009 | Weiler | |
| 7,578,411 B1 | 8/2009 | Zien et al. | |
| 8,308,031 B2 * | 11/2012 | Vogel | B65D 47/0804 222/556 |
| D688,434 S | 8/2013 | Kinskey | |
| 8,733,585 B2 | 5/2014 | Abdi et al. | |
| 8,806,803 B1 | 8/2014 | Mitchell et al. | |
| D722,735 S | 2/2015 | Del Rosario Roy et al. | |
| D756,583 S | 5/2016 | Arvinte et al. | |
| 9,371,924 B2 | 6/2016 | Foucault | |
| D769,561 S | 10/2016 | Galbraith | |
| D783,917 S | 4/2017 | Gringer et al. | |
| D784,811 S | 4/2017 | Scevola | |
| D785,129 S | 4/2017 | Humphreys, Jr. et al. | |
| D819,897 S | 6/2018 | Felton | |
| D859,155 S | 9/2019 | Reiley et al. | |
| 10,399,749 B1 | 9/2019 | Walker et al. | |
| D887,268 S | 6/2020 | Rhea | |
| 2004/0089665 A1 | 5/2004 | Nnamani | |
| 2004/0188451 A1 | 9/2004 | Karlsson | |
| 2008/0190951 A1 * | 8/2008 | Gallagher | B65D 43/021 220/780 |
| 2010/0089922 A1 * | 4/2010 | Chen | B65D 43/0256 220/266 |
| 2011/0000919 A1 | 1/2011 | Whalen | |
| 2014/0021214 A1 * | 1/2014 | Jack | B65D 43/0212 220/826 |
| 2015/0158172 A1 | 6/2015 | Conway et al. | |
| 2016/0200508 A1 | 7/2016 | Thoma et al. | |
| 2016/0251131 A1 | 9/2016 | Edwards | |

OTHER PUBLICATIONS

All Terrain Bucket System, Just HorsN Around, LLC, http://justhorsnaround.com, retrieved Feb. 24, 2016.
Lids for Vikan Pails, Contractor Supply Net Work, http://contractorsupplynetwork.com, retrieved Feb. 24, 2016.
Brabantia Flatback Fingerprint Proof Bin, Mummy Melton, http://mummymelton.blogspot.com/2013/11/review-brabantia-flatback-fingerprint.html, retrieved Feb. 24, 2016.
Lid for Bucket, Vikan Products, http://www.vikan.com/uk/all-products/detail/?gid=7820&id=1957, retrieved Feb. 24, 2016.
Vikan lid, https://store.savesmartproducts.com/vikan-5-gallon-buket-lid-red/, retrieved Oct. 14, 2021.

* cited by examiner

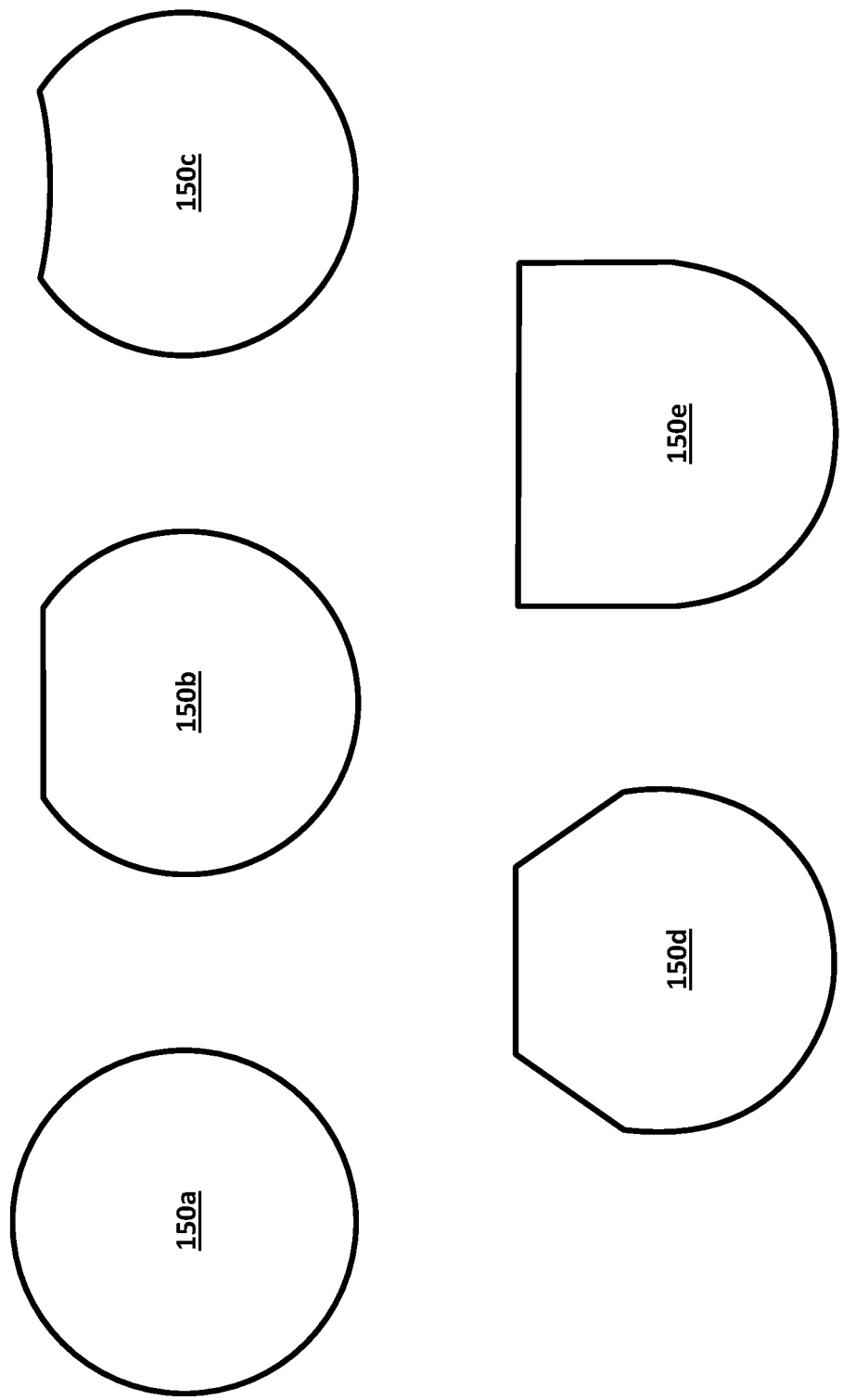

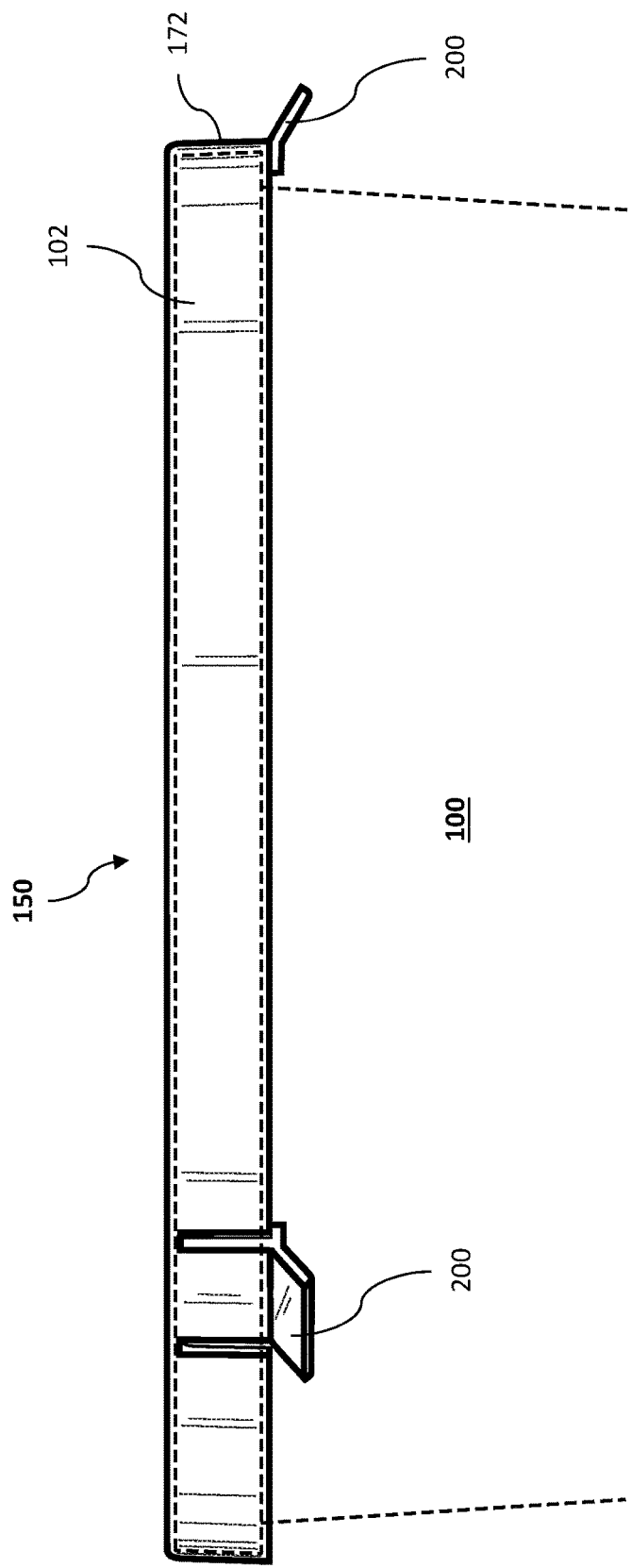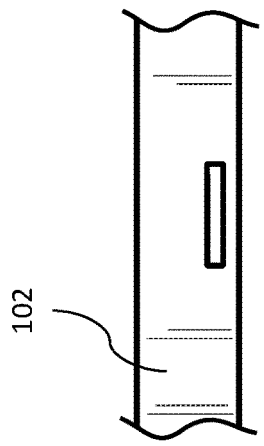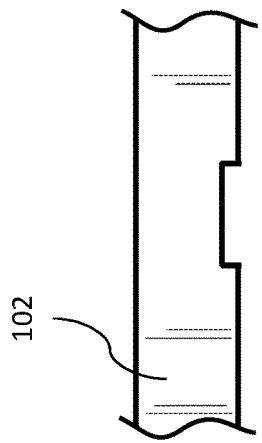

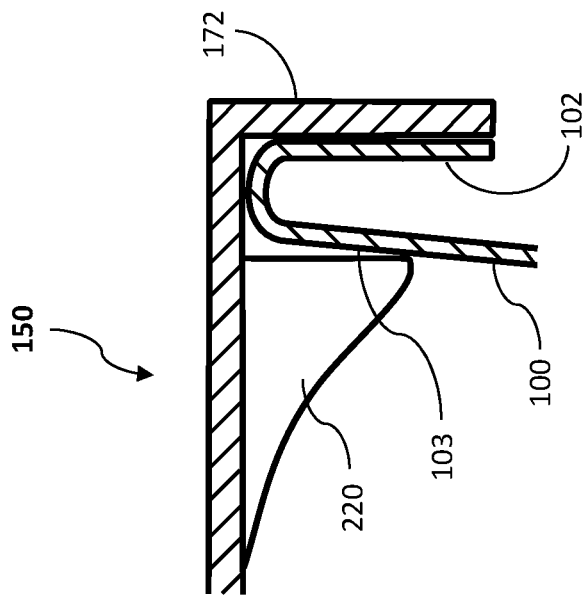
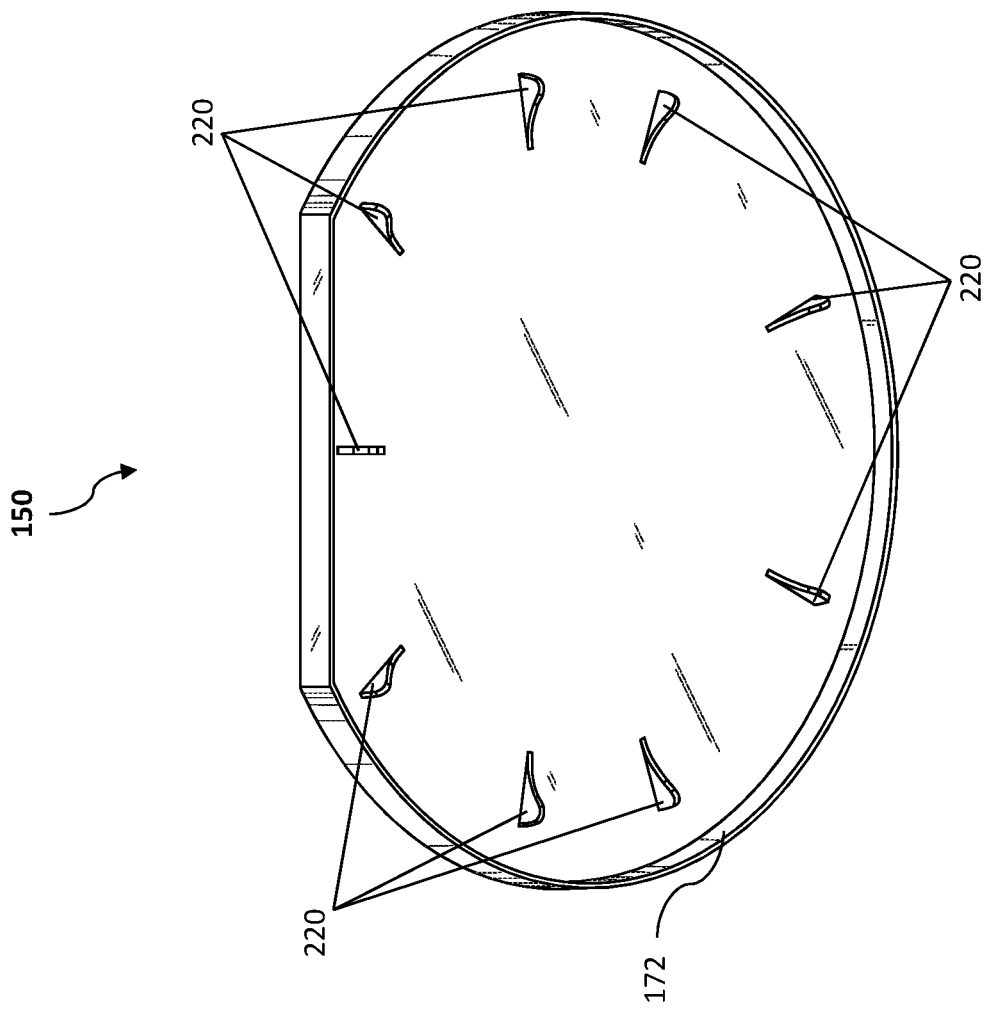

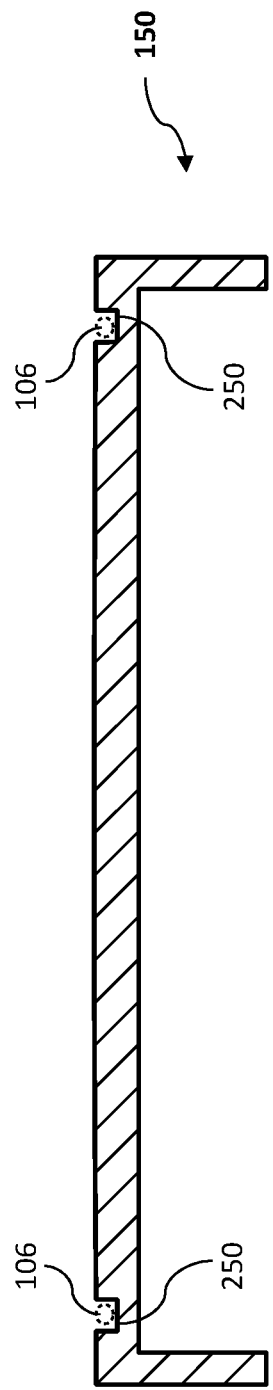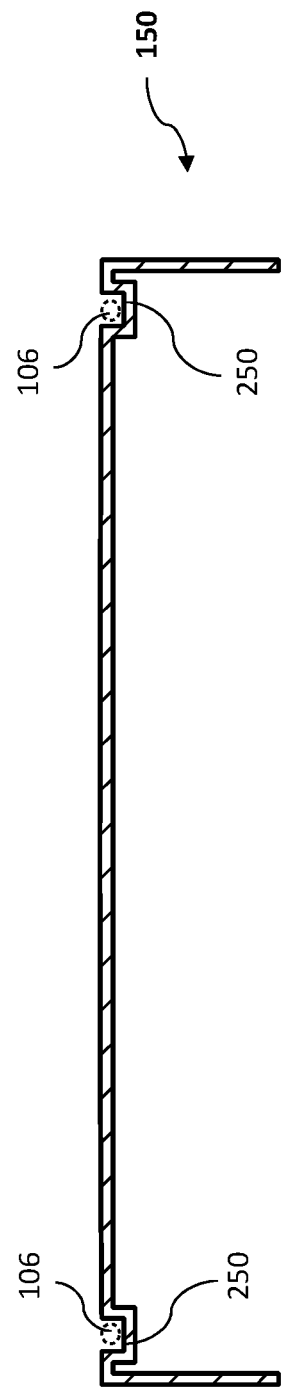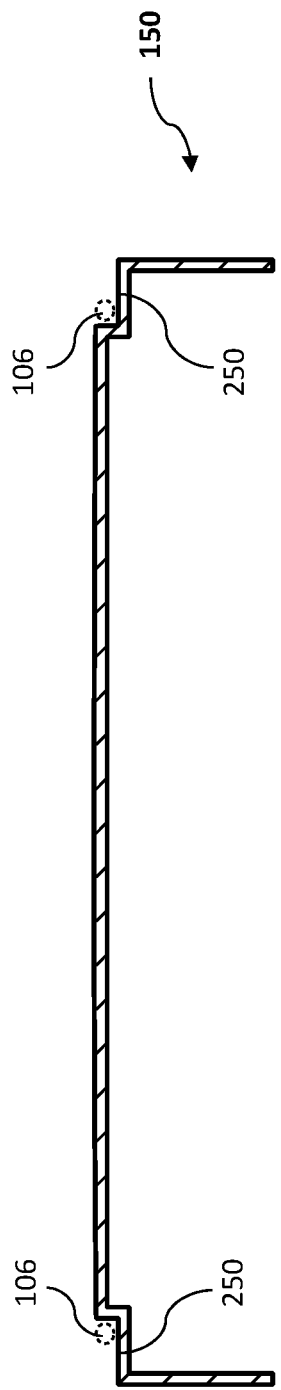

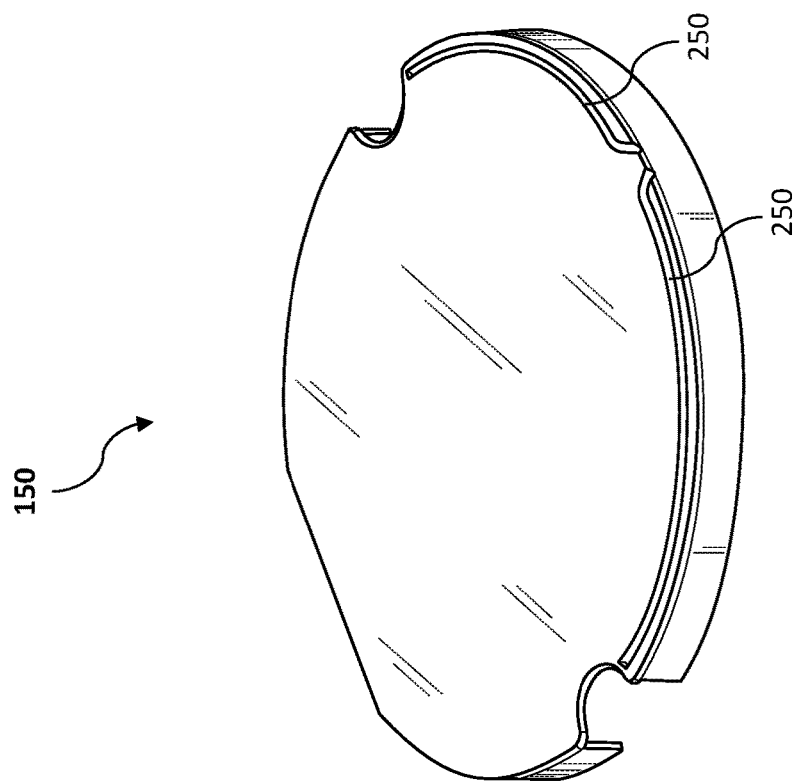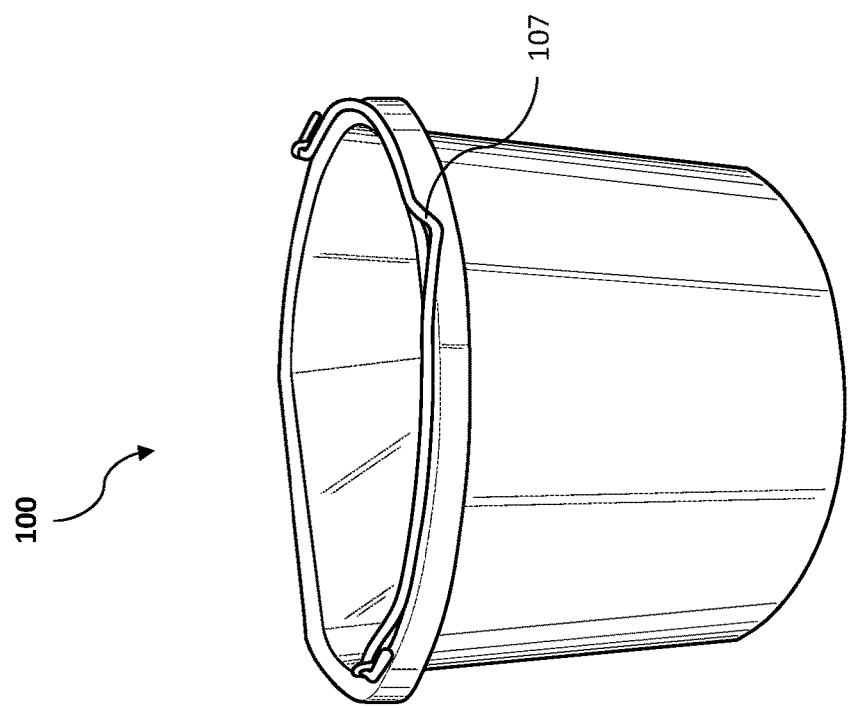
FIG. 8E

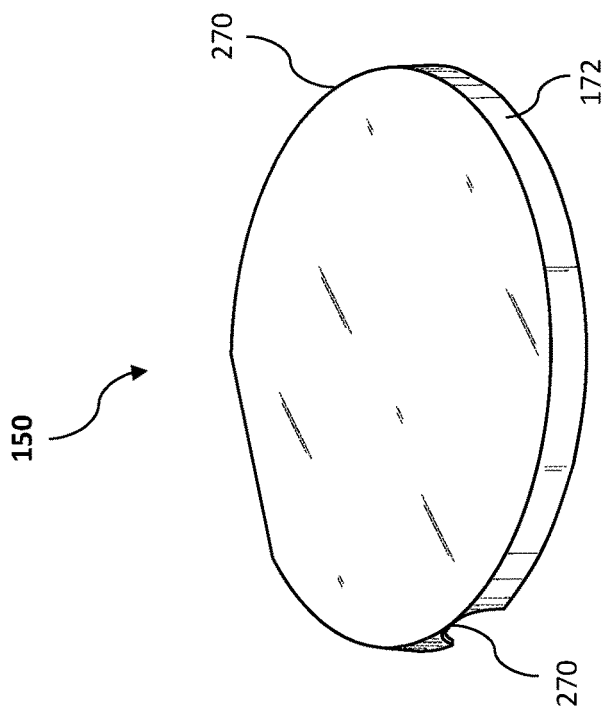
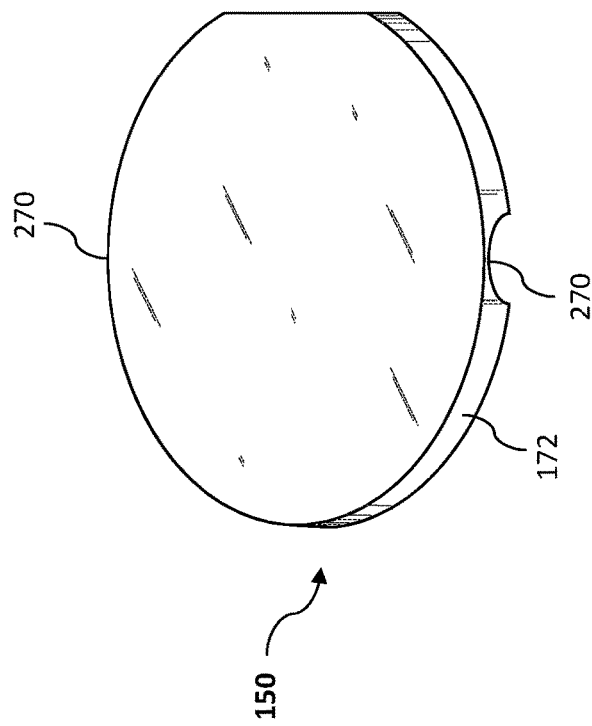
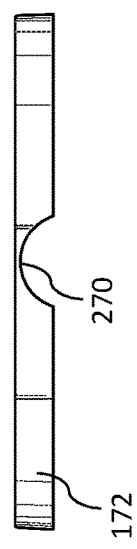

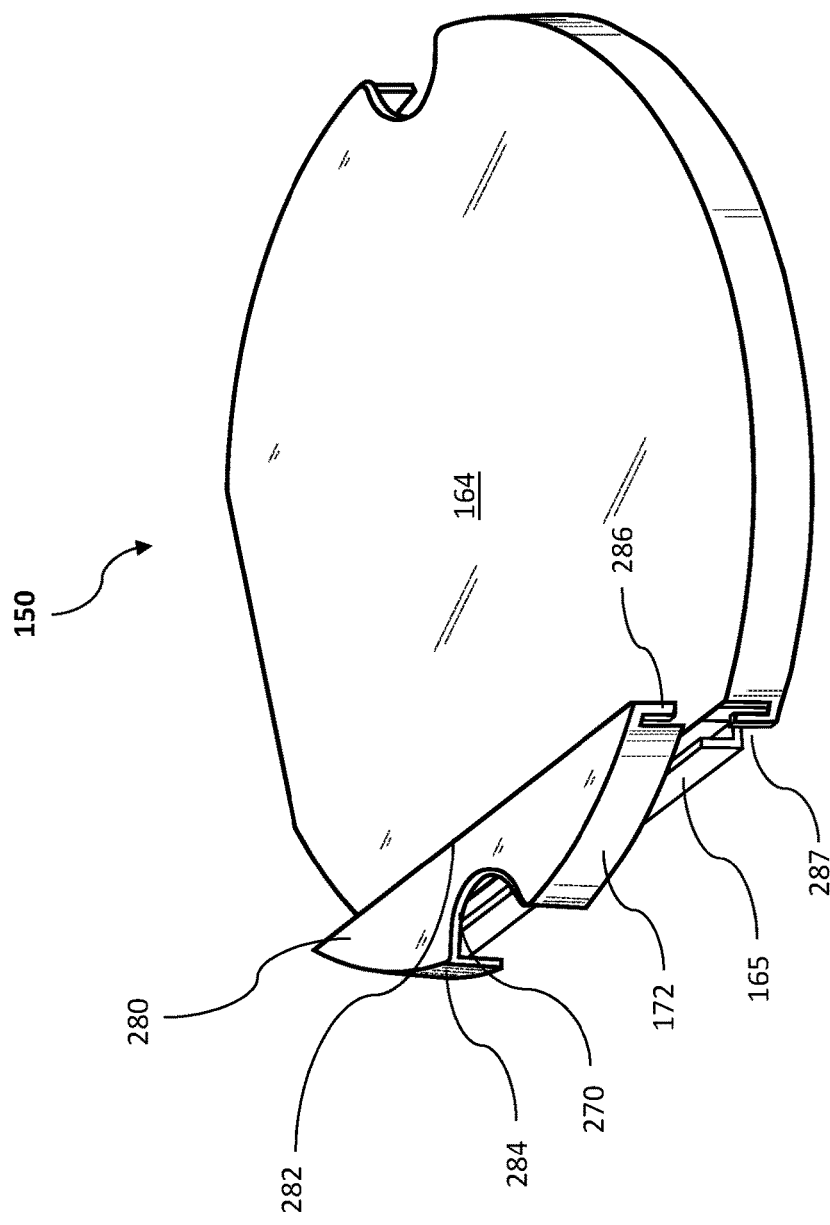
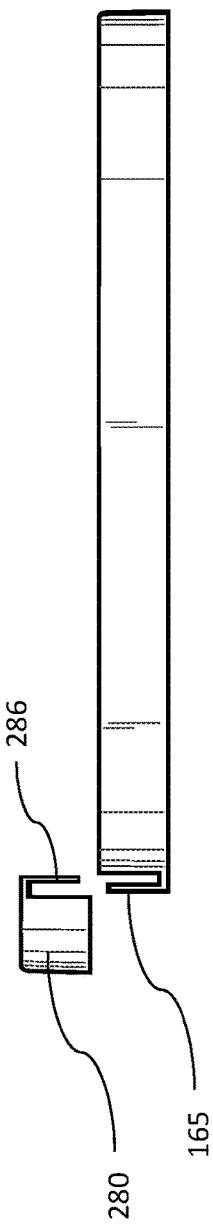

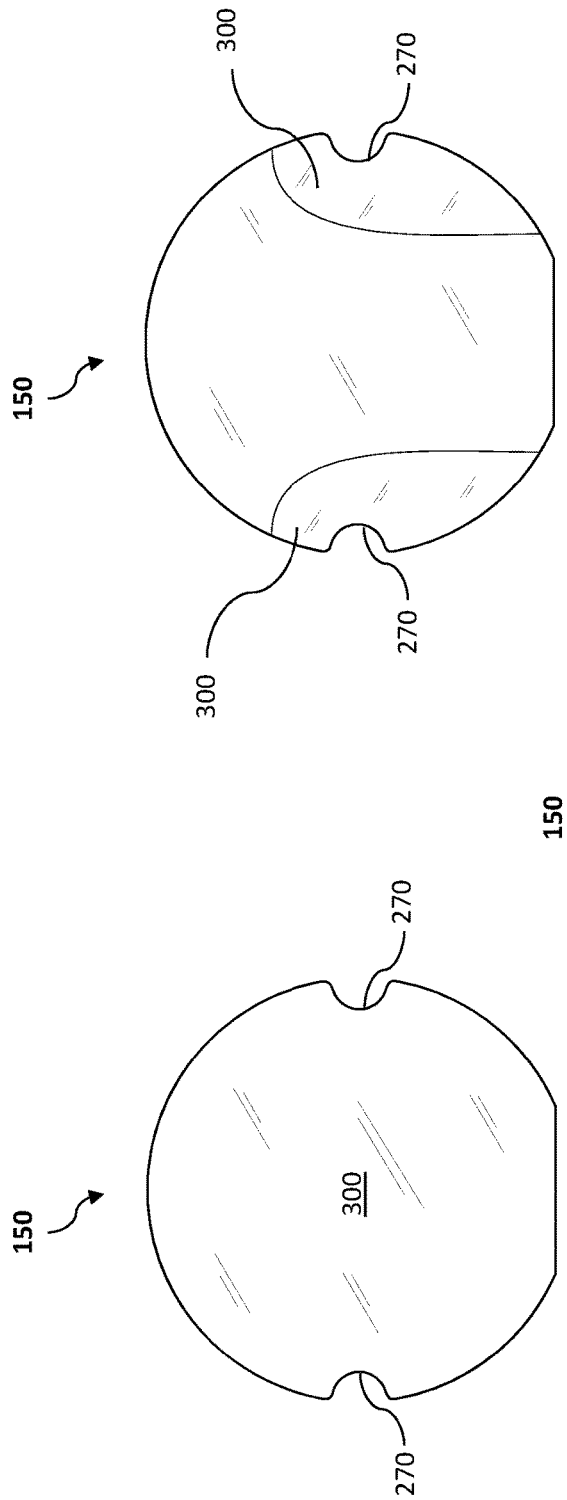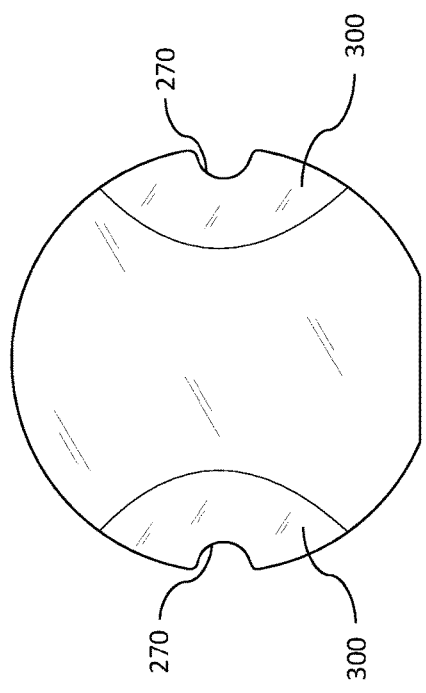

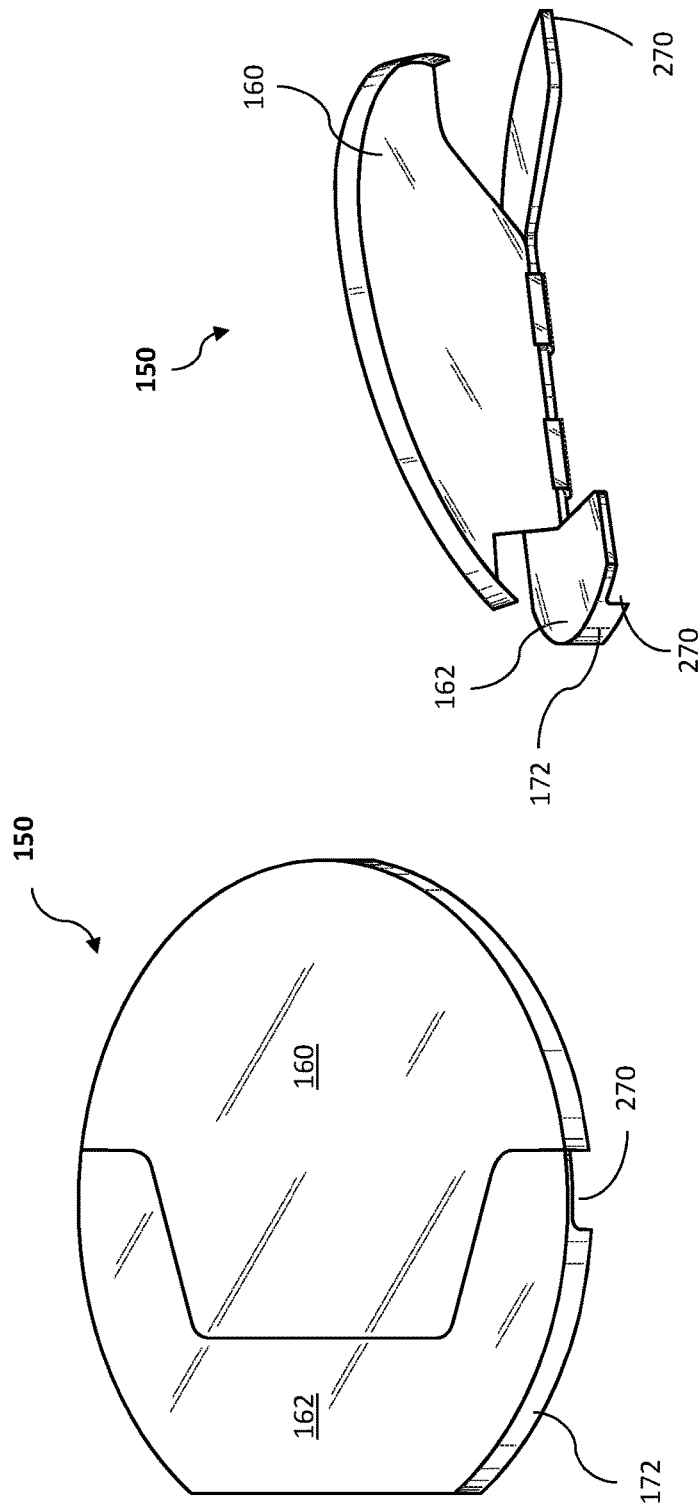
FIG. 20E
FIG. 20F
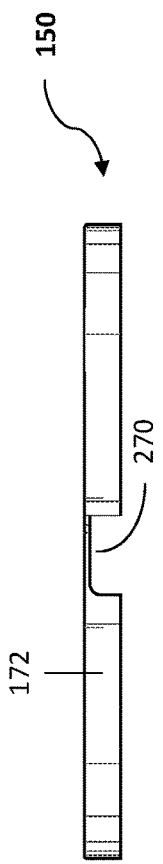
FIG. 20G

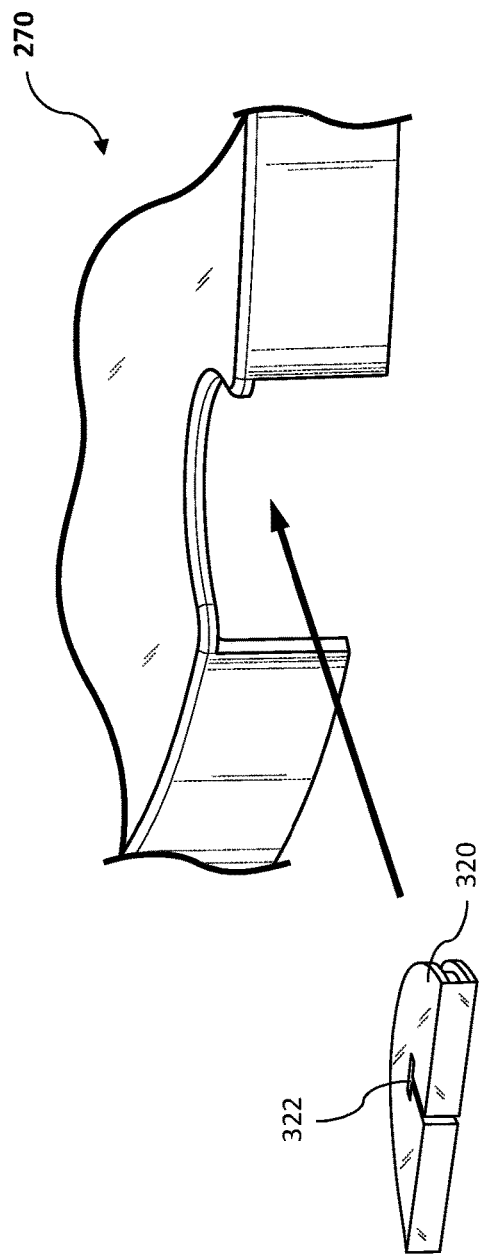
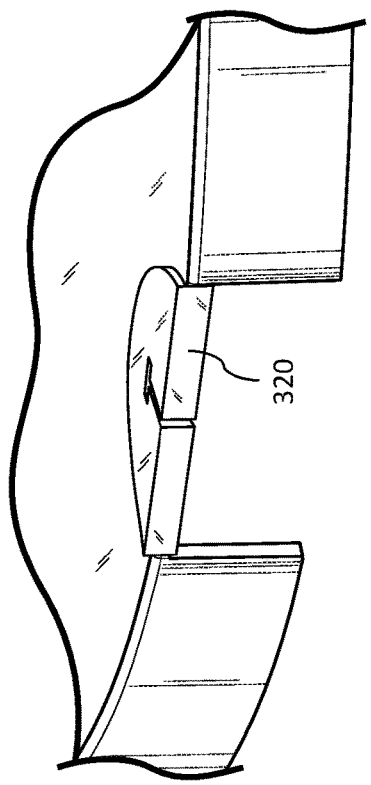
FIG. 23A
FIG. 23B

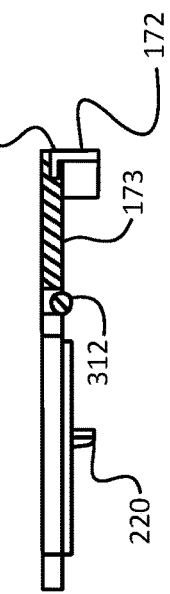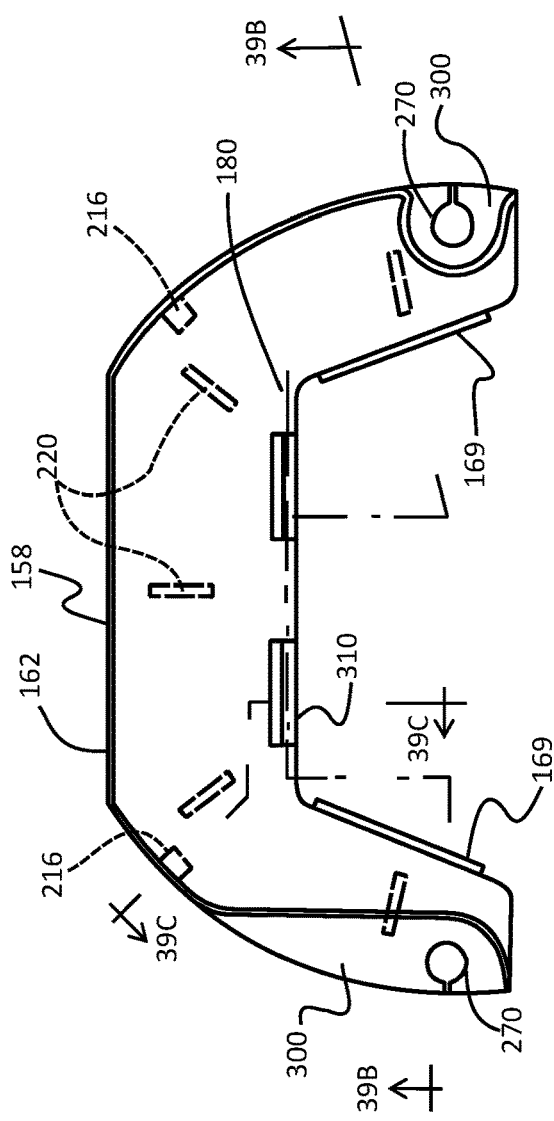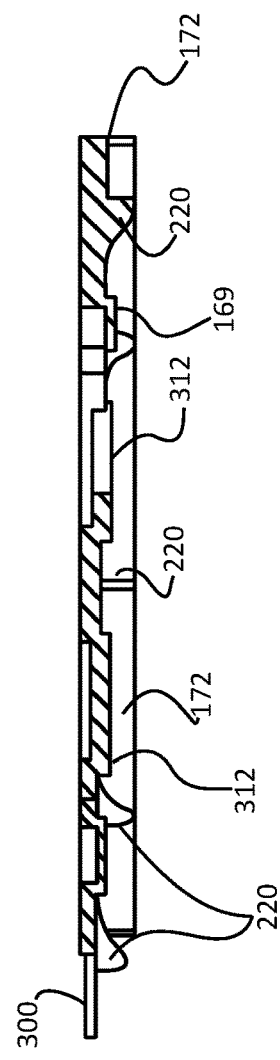
FIG. 39C
FIG. 39A
FIG. 39B

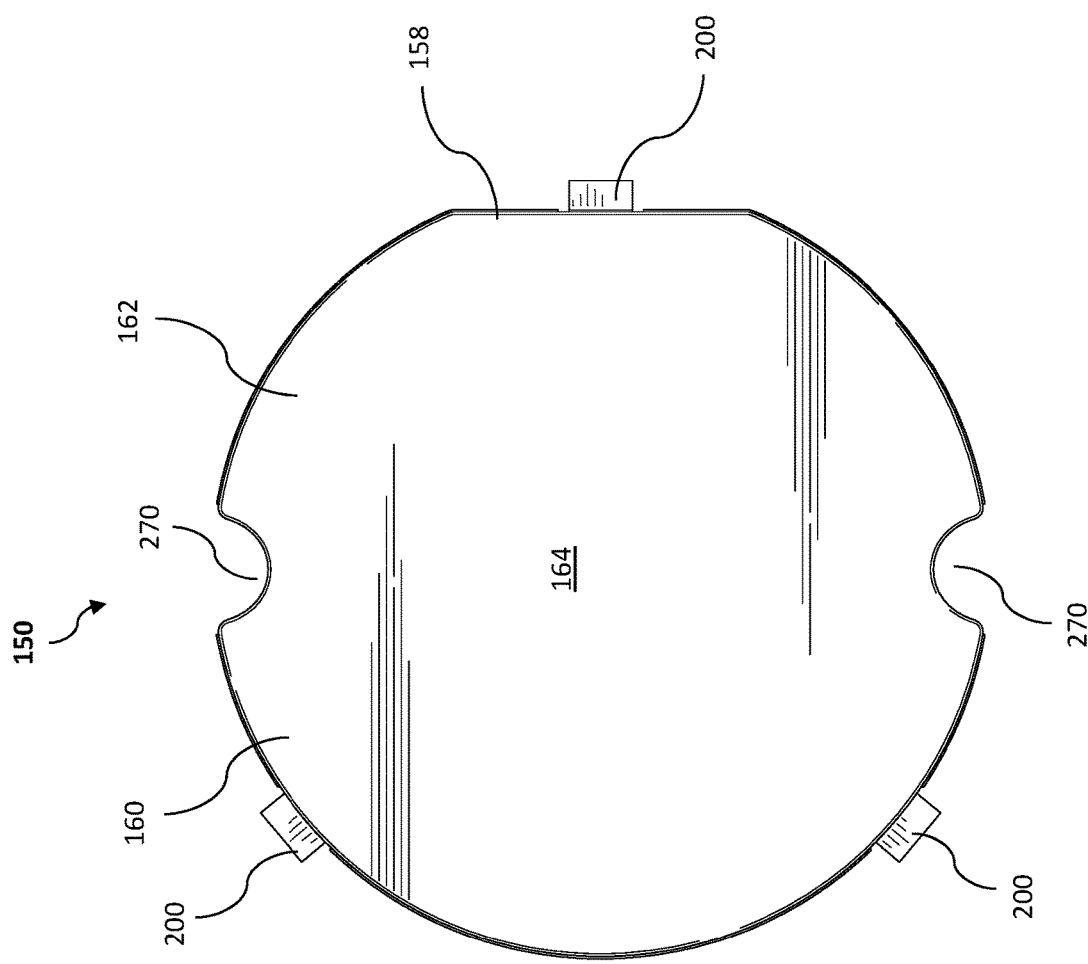

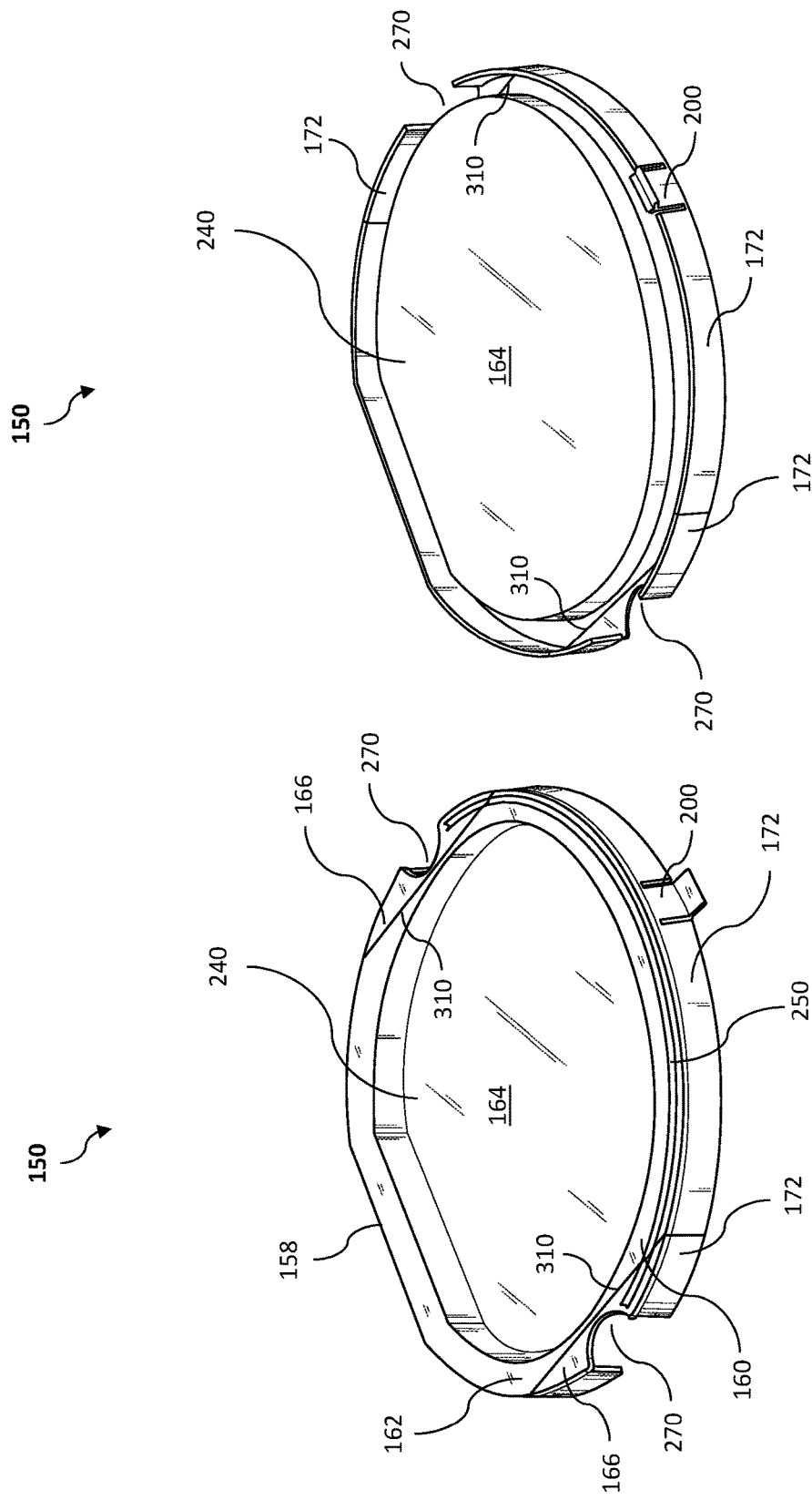

BUCKET AND LID SYSTEMS AND APPARATUSES

FIELD

The present disclosure generally relates to systems and apparatuses for buckets. More specifically, the present disclosure is directed to buckets and lids for buckets, and particularly, lids for buckets having a flat back.

BACKGROUND

Buckets, in general, have been around for many years. They are used for many purposes, from household maintenance to industrial applications. One particular type of bucket, a flat back bucket, is particularly useful on ranches and farms, especially in connection with horse stables. These buckets are often used to store water and feed for horses. The flat back allows such buckets to be hung flush to a wall so that horses can eat and drink with their head remaining at a comfortable level while minimizing the risk that the horse may knock the bucket over.

The conventional flat back bucket has at least one side that is straight or slightly bowed inward, which defines the flat back. Besides the flat back, the remaining portion of the rim of such buckets often have a semicircular, rectangular, or trapezoidal shape, or a combination thereof. Some flat back buckets include a rim channel, which is a portion of the bucket rim that curls outward or projects upward from the mouth of the bucket. Conventional buckets also have a bail for carrying or hanging the buckets. The bail attaches to the bucket with bail mounts, which are typically disposed upward or laterally from or near the rim channel.

One problem with existing flat back buckets is that the buckets are sold without lids. Without lids, it is not feasible to store water or feed in the buckets due to the risk of contamination and/or rodent or insect infestation. Without lids, it is also not possible to stack buckets that contain water or feed.

Attempts have been made to provide lids for flat back buckets, but have not been entirely satisfactory. One known attempt is a soft fabric cover with a pair of slits for receiving the bail mounts and bail. Fabric covers are not satisfactory because they cannot support the weight of another bucket and provide only limited protection from rodents, insects, and debris. Fabric covers also must be removed for horses to drink or feed from the bucket, which can result in the cover getting lost or collecting dirt and other debris when removed from the bucket. Other attempts have also been unsatisfactory because they do not accommodate buckets with bail mounts disposed upwardly from a rim channel, do not support stacking buckets, must be removed before a horse can drink or feed from the bucket, are unwieldy to attach to a bucket, or some combination thereof.

Accordingly, there is a need for an improved lid for a flat back bucket that can accommodate different bucket configurations while increasing the usefulness of standard buckets.

SUMMARY

The present disclosure is related to systems and apparatuses for buckets and lids.

According to a first aspect, a lid for a bucket comprises: a center portion with a top surface and a bottom surface; and at least one side portion with a top surface and a bottom surface, the side portion removably coupled to the center portion.

In certain aspects, the bucket has plural bail mounts and the at least one side portion of the lid further comprises at least one cutout suitable for receiving one of the plural bail mounts of the bucket.

In certain aspects, the bucket has a semicircular configuration with a flat back, and the lid has a semicircular configuration with a flat back that is suitable for matching the bucket.

In certain aspects, the lid further comprises a front portion opposite the flat back of the lid, the front portion having at least one groove suitable for receiving a bail handle of the bucket.

In certain aspects, the bucket has a rim channel and the lid further comprises outer lips extending from the center portion and the at least one side portion, wherein the outer lips are capable of being exterior of and overhang the rim channel of the bucket.

In certain aspects, the lid further comprises at least one locking tab capable of securing the lid to the rim channel of the bucket.

In certain aspects, the lid further comprises at least one retainer lip extending downwardly from the bottom surface of the center portion, the retainer lip being substantially parallel to the outer lip of the center portion and positioned relative to the outer lip of the center portion to form a gap suitable for receiving the rim channel of the bucket, wherein the retainer lip is capable of engaging an inner surface of the rim channel.

In certain aspects, the center portion includes a downwardly recessed portion.

In certain aspects, the recessed portion is capable of engaging an inner surface of the rim channel of the bucket.

According to a second aspect, a lid for a bucket having a rim channel and plural bail mounts comprises: plural cutouts suitable for receiving the plural mail mounts; a center portion with a top surface and a bottom surface; and at least one side portion with a top surface and a bottom surface, the side portion hingedly connected to the center portion and having one of the plural cutouts; wherein the plural bail mounts of the bucket are on a first axis and the hinged connection between the center portion and the at least one side portion lies on a second axis substantially perpendicular to the first axis.

In certain aspects, the bucket has a semicircular configuration with a flat back, and the lid has a semicircular configuration with a flat back that is suitable for matching the bucket.

In certain aspects, the lid further comprises a front portion opposite the flat back of the lid, the front portion having at least one groove suitable for receiving a bail handle of the bucket.

In certain aspects, the lid further comprises outer lips extending from the center portion and the at least one side portion, wherein the outer lips are capable of being exterior of and overhang the rim channel of the bucket.

In certain aspects, the lid further comprises at least one locking tab capable of securing the lid to the rim channel of the bucket.

In certain aspects, the lid further comprises at least one retainer lip extending downwardly from the bottom surface of the center portion, the retainer lip being substantially parallel to the outer lip of the center portion and positioned relative to the outer lip of the center portion to form a gap suitable for receiving the rim channel of the bucket, wherein the retainer lip is capable of engaging an inner surface of the rim channel.

In certain aspects, the center portion includes a downwardly recessed portion.

In certain aspects, the recessed portion is suitable for receiving the bottom of another bucket in a stacked relationship.

In certain aspects, the recessed portion is capable of engaging an inner surface of the rim channel of the bucket.

BRIEF DESCRIPTION OF THE DRAWINGS

The foregoing and other objects, features, and advantages of the systems and apparatuses described herein will be apparent from the following description of particular embodiments thereof, as illustrated in the accompanying figures, where like reference numbers refer to like structures. The figures are not necessarily to scale, emphasis instead being placed upon illustrating the principles of the systems and apparatuses described herein.

FIG. 1F is a top plan view illustrating example lid shapes.

FIG. 3B is a side elevation view illustrating an example lid comprising locking tabs.

FIGS. 3C and 3D are side elevation views illustrating example bucket rim channel configurations for locking tabs.

FIG. 5A is a perspective view illustrating an example lid comprising ribs.

FIG. 5B is a cross-sectional side elevation view illustrating a bucket rim channel and a lid comprising ribs.

FIGS. 8B through 8D are cross-sectional side elevation views illustrating example bail handle grooves.

FIG. 8E is a perspective view illustrating a bucket bail handle hook and example bail handle grooves.

FIG. 11A is a perspective view illustrating example bail mount cutouts.

FIG. 11B is a side elevation view illustrating example bail mount cutouts.

FIG. 11C is a perspective view illustrating example bail mount cutouts.

FIG. 16A is a perspective view illustrating an example lid comprising a removable side portion.

FIG. 16B is a front elevation view illustrating an example lid comprising a removable side portion.

FIGS. 18A through 18C are top plan views illustrating example lids comprising flex zones.

FIGS. 20D through 20F are perspective views illustrating example multi-piece lids.

FIG. 20G is a left side elevation view of an example multi-piece lid.

FIGS. 23A through 24B are perspective views illustrating example fillers for bail mount cutouts.

FIG. 39A is a plan view of the rear lid portion of the fifth embodiment.

FIG. 39B is a partial cross-sectional view of the rear lid portion of the fifth embodiment taken along line 39B-39B of FIG. 39A.

FIG. 39C is a partial cross-sectional view of the rear lid portion of the fifth embodiment taken along line 39C-39C of FIG. 39A.

FIG. 41F is a top plan view of the sixth embodiment.

FIGS. 46A and 46B are perspective views illustrating a lid according to an eleventh embodiment.

DETAILED DESCRIPTION

References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Recitation of ranges of values herein are not intended to be limiting, referring instead individually to any and all values falling within the range, unless otherwise indicated herein, and each separate value within such a range is incorporated into the specification as if it were individually recited herein. In the following description, it is understood that terms such as "first," "second," "top," "bottom," "side," "front," "back," and the like are words of convenience and are not to be construed as limiting terms unless otherwise stated or clear from the context.

As used herein, the terms "about," "approximately," "substantially," or the like, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or the like) provided herein, is intended merely to better illuminate the embodiments and do not pose a limitation on the scope of the embodiments. The terms "e.g.," and "for example" set off lists of one or more non-limiting examples, instances, or illustrations. No language in the specification should be construed as indicating any unclaimed element as essential to the practice of the embodiments.

As used herein, the term "and/or" means any one or more of the items in the list joined by "and/or." As an example, "x and/or y" means any element of the three-element set {(x), (y), (x, y)}. In other words, "x and/or y" means "one or both of x and y." As another example, "x, y, and/or z" means any element of the seven-element set {(x), (y), (z), (x, y), (x, z), (y, z), (x, y, z)}. In other words, "x, y, and/or z" means "one or more of x, y, and z."

As used herein, the terms "exemplary" and "example" mean "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention," "embodiments," or "invention" do not require that all embodiments of the invention include the discussed feature, advantage or mode of operation.

Buckets and Lids Generally.

Figure 1A:
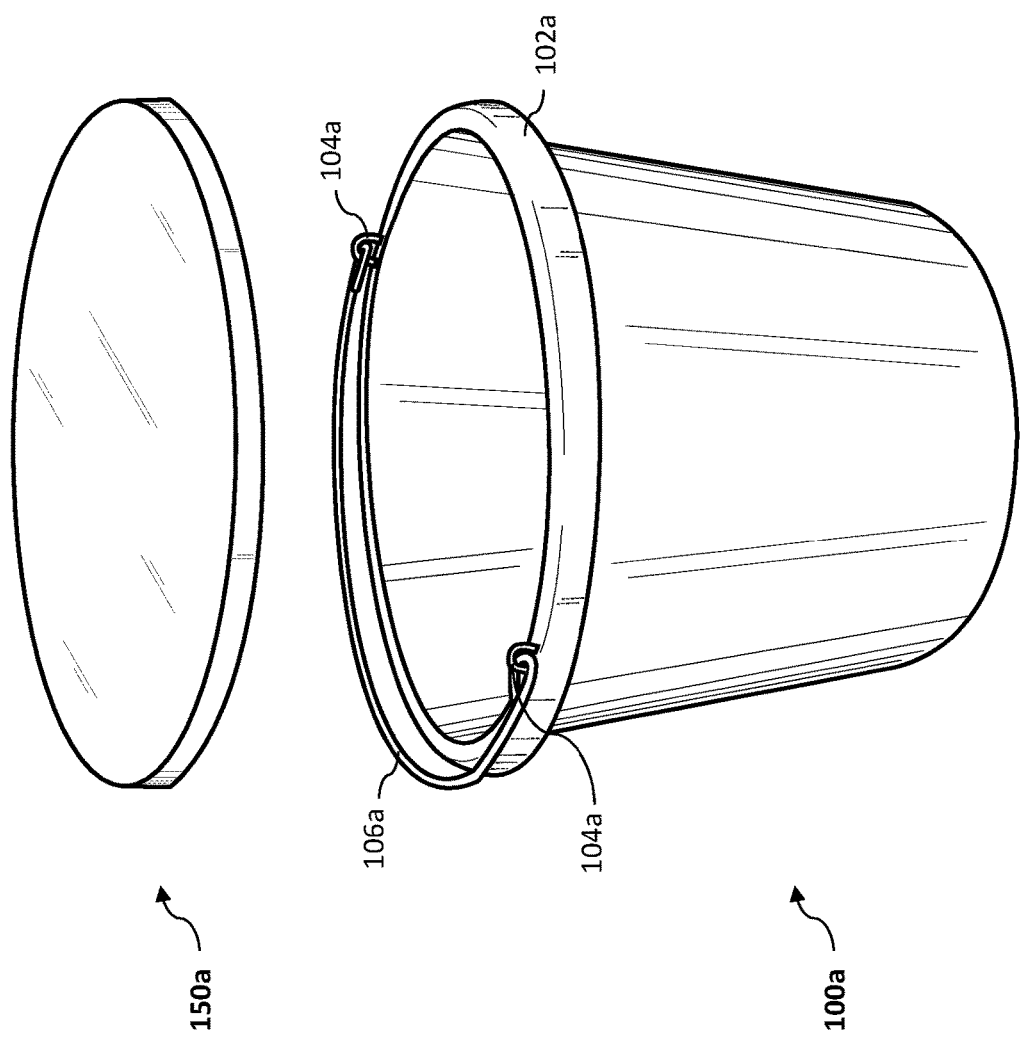
FIGS. 1A through 1E are perspective views illustrating example bucket and lid shapes and configurations to which the present disclosure is generally related.

FIG. 1A is a perspective view illustrating a conventional round bucket 100a having a rim channel 102a that curls outward from the mouth of bucket 100a. Bail mounts 104a are inverted U-shaped brackets disposed upwardly from rim channel 102a. Bail handle 106a wraps between the prongs of inverted U-shaped bail mounts 104a to secure the handle 106a to bucket 100a. Bail handle 106a generally lies on the surface of rim channel 102a when bucket 100a is at rest. FIG. 1A further illustrates the general shape of a lid 150a that may match the shape of bucket 100a such that the shape of the bottom of the lid 150a generally aligns with the shape of the top of bucket 100a.

Figure 1B:
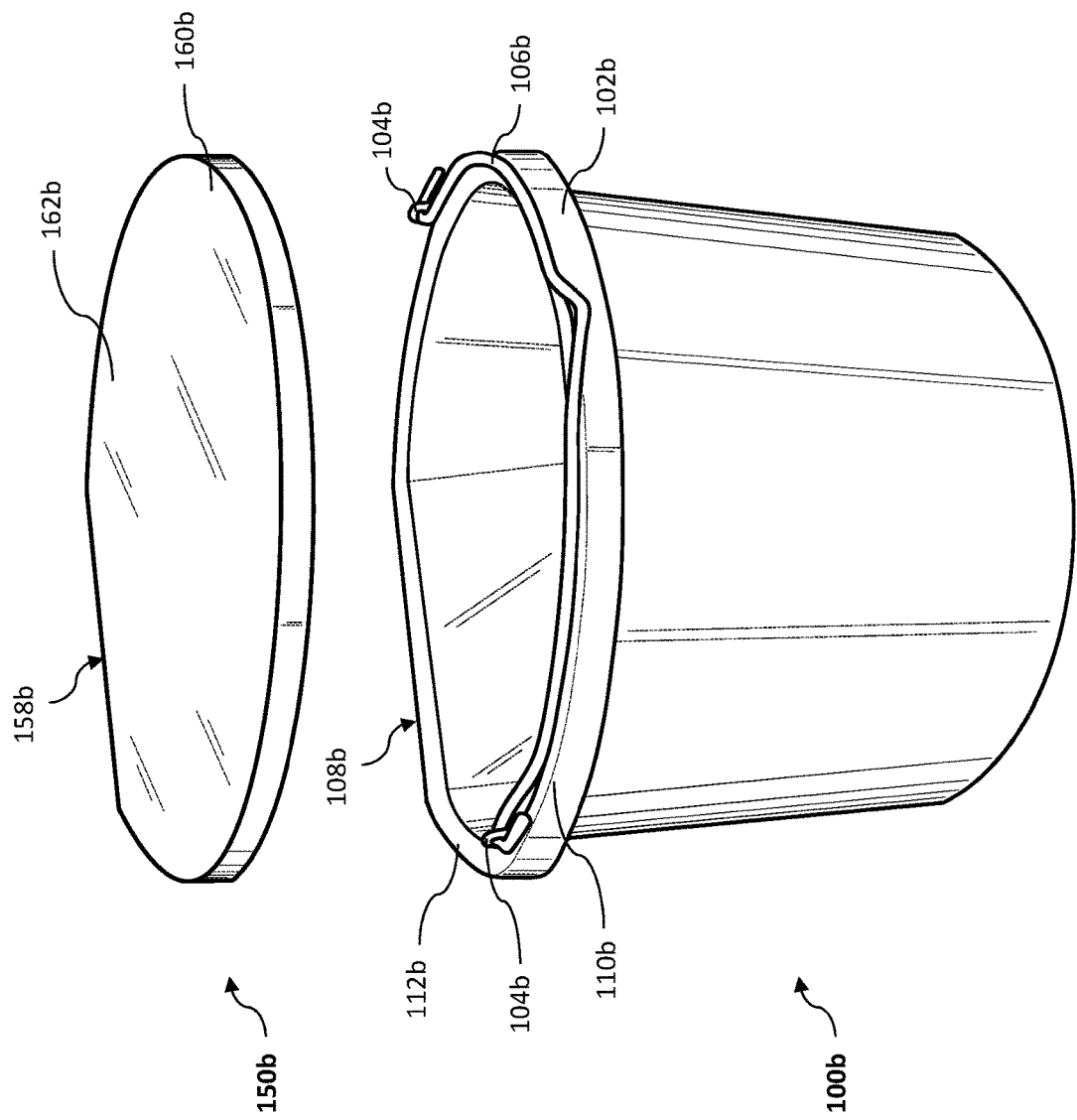

FIG. 1B is a perspective view illustrating a flat back bucket 100b having a rim channel 102b that curls outward from the mouth of bucket 100b. Bail mounts 104b are inverted U-shaped brackets disposed upwardly from rim channel 102b. Bail handle 106b wraps between the prongs of inverted U-shaped bail mounts 104b to secure the handle 106b to bucket 100b. Bail handle 106b generally lies on the surface of rim channel 102b when bucket 100b is at rest. Bucket 100b has a flat back 108b, a front portion 110b, and a rear portion 112b. Front portion 110b and rear portion 112b are semicircular in plan view. FIG. 1B further illustrates the general shape of a lid 150b that may match the shape of bucket 100b. As illustrated in FIG. 1B, lid 150b has a flat back 158b, a front portion 160b, and a rear portion 162b. Front portion 160b and rear portion 162b are semicircular in plan view.

Figure 1C:
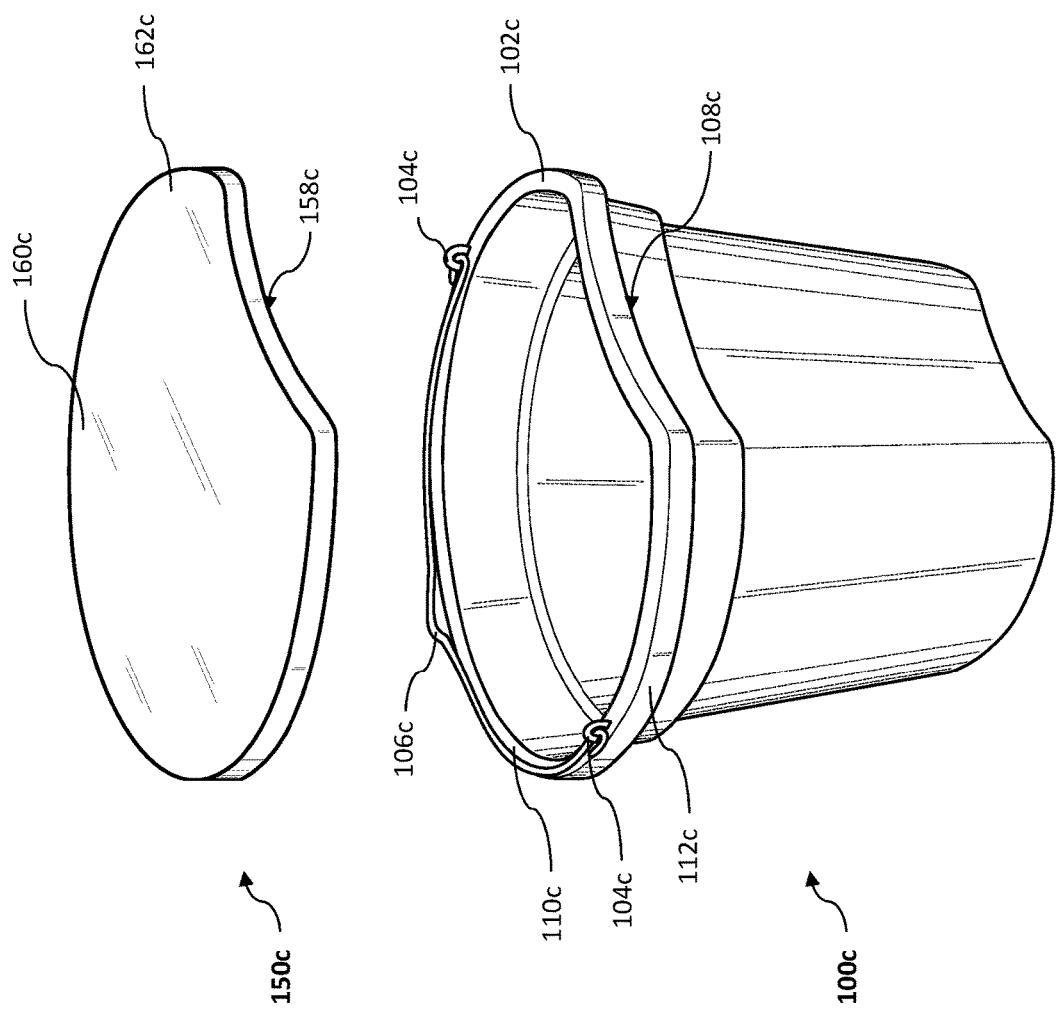

FIG. 1C is a perspective view illustrating a flat back bucket 100c having a rim channel 102c that curls outward from the mouth of bucket 100c. Bail mounts 104c are inverted U-shaped brackets disposed upwardly from rim channel 102c. Bail handle 106c wraps between the prongs of inverted U-shaped bail mounts 104c to secure the handle 106c to bucket 100c. Bail handle 106c generally lies on the surface of rim channel 102c when bucket 100c is at rest. Bucket 100c has a flat back 108c, a front portion 110c, and a rear portion 112c. Front portion 110c and rear portion 112c are semicircular in plan view. FIG. 1C further illustrates the general shape of a lid 150c that may match the shape of bucket 100c. As illustrated in FIG. 1C, lid 150c has a flat back 158c, a front portion 160c, and a rear portion 162c. Front portion 160c and rear portion 162c are semicircular in plan view.

Figure 1D:
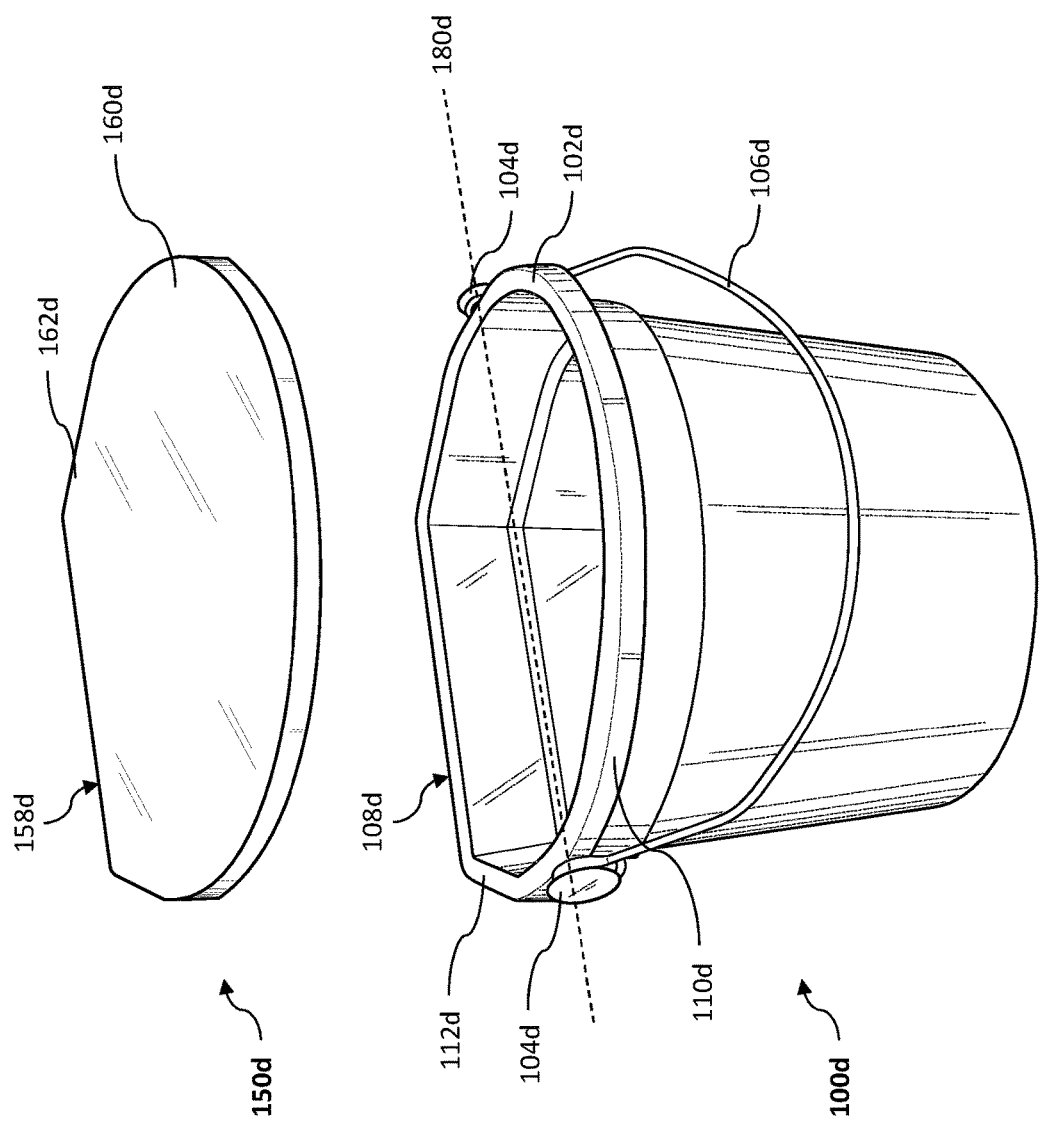

FIG. 1D is a perspective view illustrating a flat back bucket 100d having a rim channel 102d that curls outward from the mouth of bucket 100d. Bail mounts 104d are disposed laterally from or near rim channel 102d about an axis 180d that is substantially parallel to the flat back 108d. Bail handle 106d wraps around the bail mounts 104d to secure the handle 106d to bucket 100d. Bail handle 106d generally lies on the side of bucket 100d when bucket 100d is at rest. Bucket 100d has a flat back 108d, a front portion 110d that is semicircular in plan view, and a rear portion 112d that is trapezoidal in plan view. FIG. 1D further illustrates the general shape of a lid 150d that may match the shape of bucket 100d. As illustrated in FIG. 1D, lid 150d has a flat back 158d, a front portion 160d that is semicircular in plan view, and a rear portion 162d that is trapezoidal in plan view.

Figure 1E:
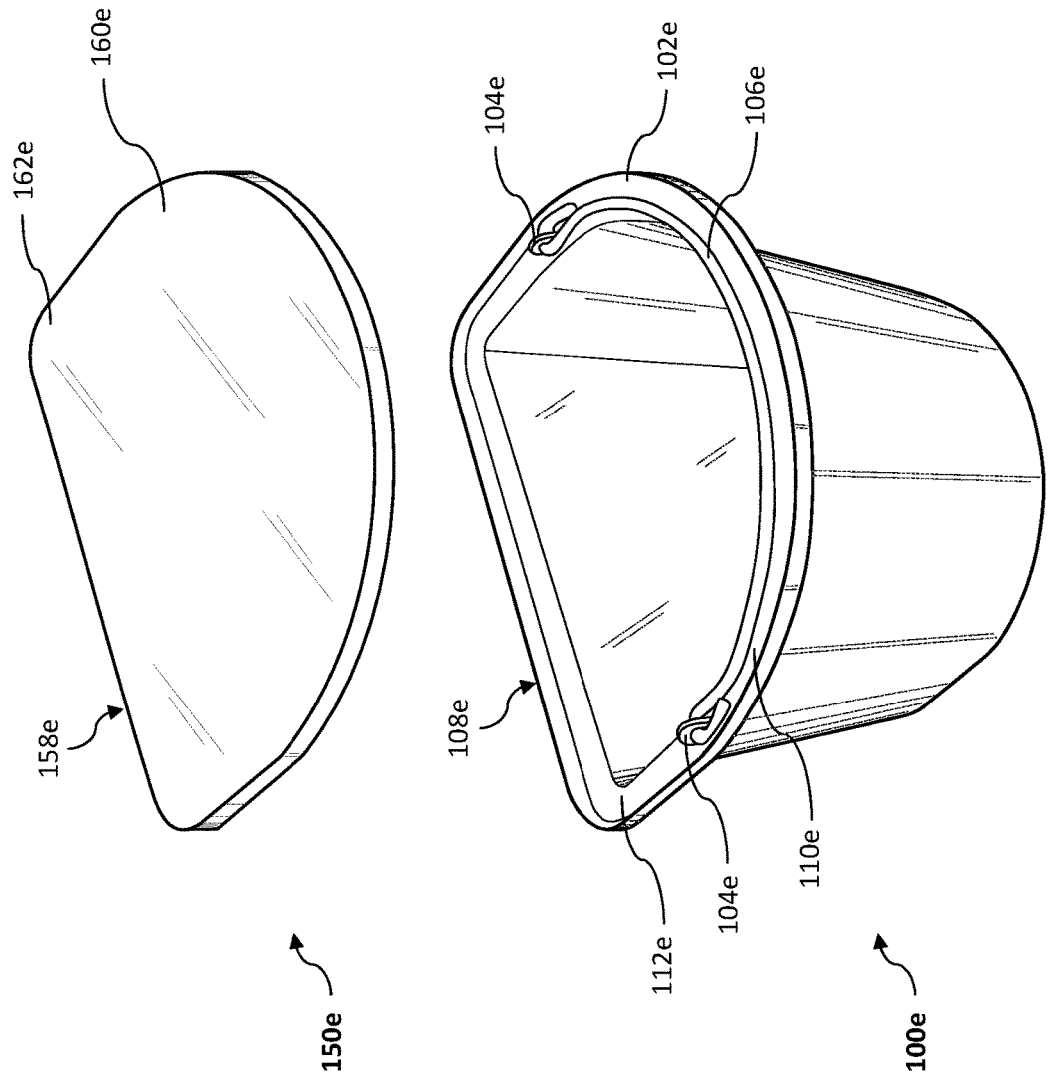

FIG. 1E is a perspective view illustrating a flat back bucket 100e having a rim channel 102e that projects upward from the mouth of bucket 100e. Bail mounts 104e are inverted U-shaped brackets disposed upwardly from rim channel 100e. Bail handle 106e wraps between the prongs of inverted U-shaped bail mounts 104e to secure the handle 106e to bucket 100e. Bail handle 106e generally lies on the surface of rim channel 102e when bucket 100e is at rest. Bucket 100e has a flat back 108e, a front portion 110e that is semicircular in plan view, and a rear portion 112e that is rectangular in plan view. FIG. 1E further illustrates the general shape of a lid 150e that may match the shape of bucket 100e. As illustrated in FIG. 1E, lid 150e has a flat back 158e, a front portion 160e that is semicircular in plan view, and a rear portion 162e that is rectangular in plan view.

FIG. 1F is atop plan view illustrating lids 150a through 150e. While the shapes of lids 150a through 150e may match conventional buckets, other shapes and configurations are possible and contemplated herein. For example, lid 150c may have a trapezoidal-shaped or rectangular-shaped rear portion. It will be appreciated by those of ordinary skill in the art that the inventive features described throughout this disclosure may be applied to lids of various shapes and configurations, including those illustrated in FIGS. 1A through 1E. As a matter of convenience and not limitation, common reference numbers in FIGS. 1A through 1E will be used throughout this disclosure without reference to any particular embodiment unless otherwise stated. For example, throughout this disclosure, buckets will generally be referred to hereinafter as 100, rim channels as 102, bail mounts as 104, bail handles as 106, flat backs of buckets as 108, front bucket portions as 110, rear bucket portions as 112, lids as 150, flat backs of lids as 158, front lid portions as 160, and rear lid portions as 162. As a matter of further convenience and not limitation, the shape of lid 150b is generally used to illustrate various inventive features, it being appreciated that the inventive features are not limited to only lids having the shape of lid 150b.

Figure 1G:
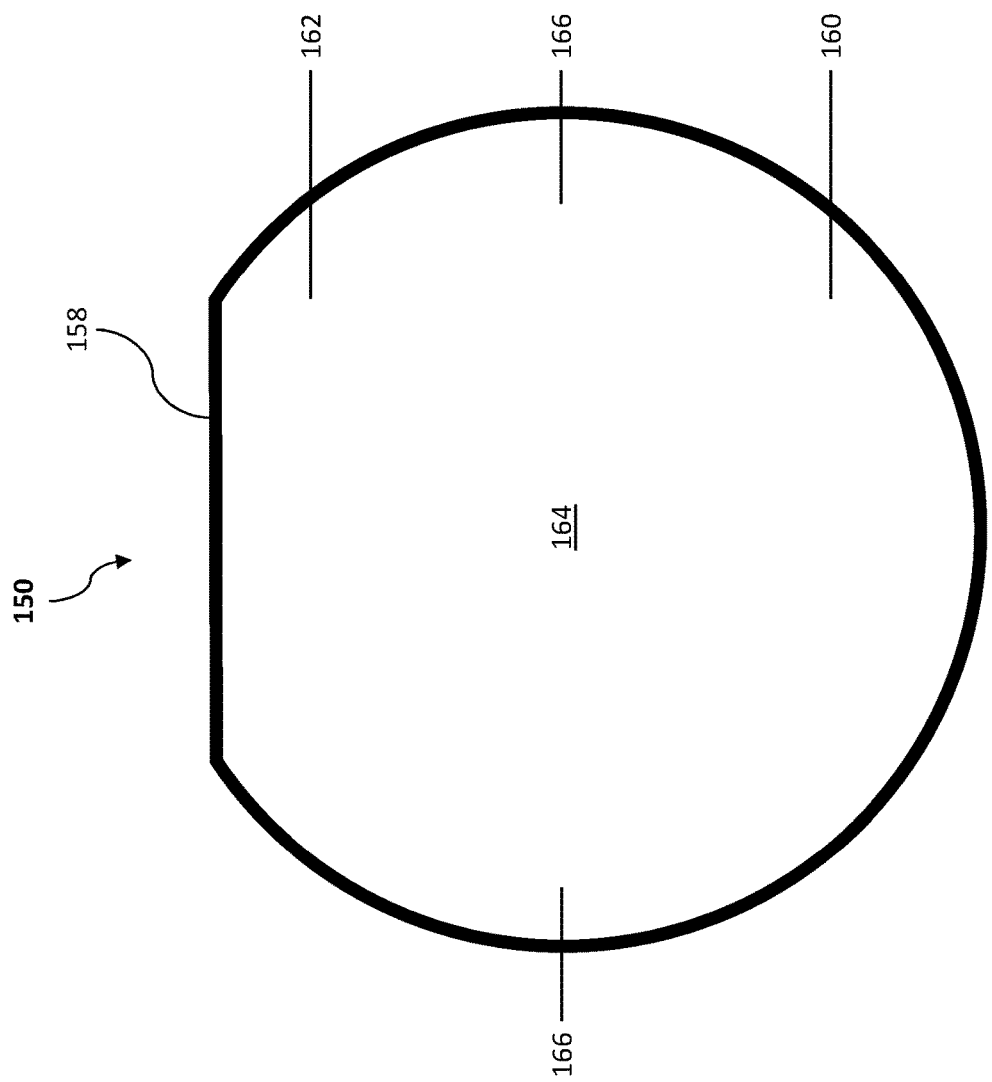
FIG. 1G is a top plan view illustrating various lid portions.

Throughout this disclosure, various regions of a lid 150 may be referred to as a front lid portion, rear lid portion, center lid portion, and side lid portion. FIG. 1G is a top plan view illustrating these general regions in the context of a lid 150 having a flat back 158. As illustrated in FIG. 1G, a front lid portion 160 is generally the area of lid 150 opposite the flat back 158, a rear lid portion 162 is generally the area of lid 150 near the flat back 158, a center lid portion 164 is generally the area comprising the center of lid 150, and side lid portions 166 are generally the areas of lid 150 occupying regions near where bail mounts 104 of a bucket 100 would be located. As illustrated in FIG. 1G, side lid portions 166 will typically be located approximately midway between front lid portion 160 and rear lid portion 162, and on an axis substantially parallel to flat back 158.

It will be appreciated by those of ordinary skill in the art that regions 160, 162, 164, and 166 illustrated in FIG. 1G are for convenience only and not limitation. For example, side lid portions 166 may overlap with center lid portion 164, front lid portion 160, and/or rear lid portion 162. Side lid portions 166 may include the area near where bail mounts 104 would be located, or may extend laterally towards the center of lid 150. As another example, the entire lid 150 may comprise only a center lid portion 164. Furthermore, where a lid 150 does not have a flat back 158, the general orientation of regions 160, 162, 164, and 166 may still apply, but any portion may be a front lid portion 160 and a rear lid portion 162. Additionally, lid 150 referred to throughout this disclosure includes a top surface and a bottom surface, the bottom surface being the portion of the lid intended to engage a bucket and/or rim channel.

Outer Lip.

Figure 2:
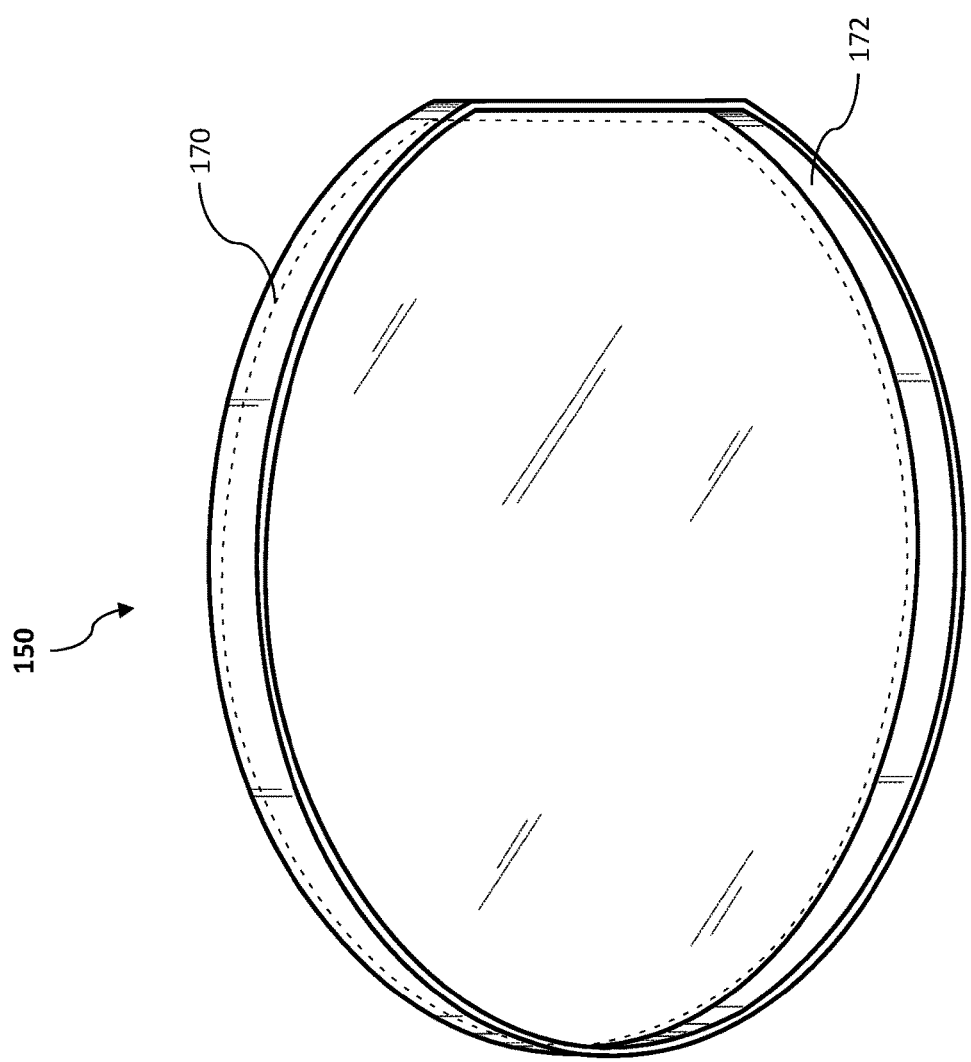
FIG. 2 is a perspective view illustrating an example lid comprising a peripheral margin and outer lip.

As illustrated in FIG. 2, a lid 150 can include a peripheral margin 170, which is generally an area on the bottom surface of lid 150 intended to engage a rim channel 102 of a bucket 100 when lid 150 is on the bucket. In FIG. 2, the peripheral margin 170 is illustrated with a dashed line. As further illustrated in FIG. 2, a lid 150 can include an outer lip 172 that extends downwardly from peripheral margin 170 of lid 150. Outer Lip 172 is intended to be exterior to, and overhang, a rim channel 102 of a bucket 100 when lid 150 is on the bucket.

Locking Tabs.

Figure 3A:
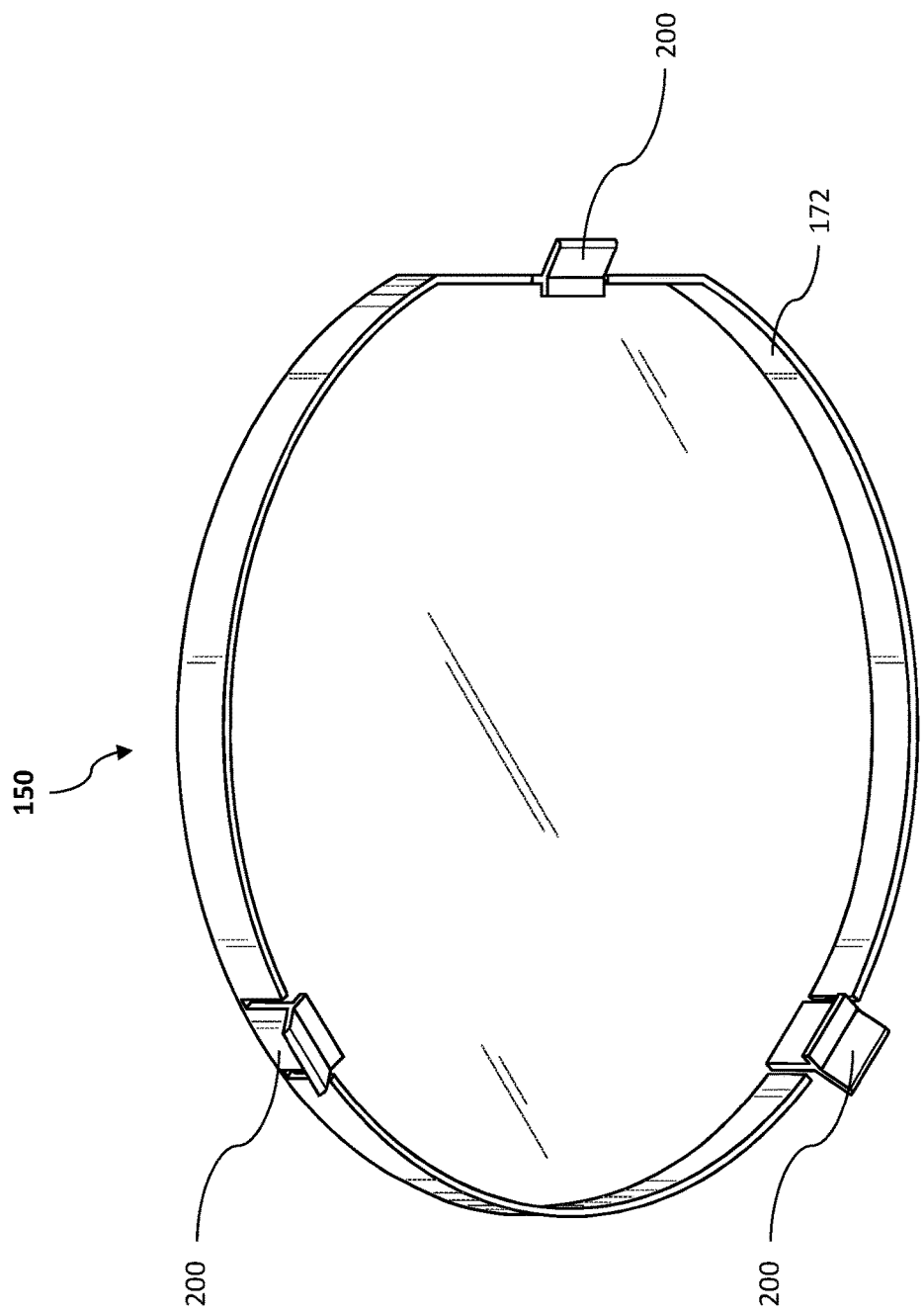
FIG. 3A is a perspective view illustrating an example lid comprising locking tabs.

As illustrated in FIG. 3A, a lid 150 can include one or more locking tabs 200 to secure lid 150 to a bucket. Locking tabs 200 can be made part of, and integral with, outer lip 172 of lid 150. For example, lid 150 can be manufactured by injection moulding. Although FIG. 3A illustrates lid 150 as including three locking tabs 200, lid 150 can include any number of locking tabs. For example, lid 150 can include only one locking tab, such as in the front or rear of lid 150.

Alternatively, lid 150 can include two locking tabs, such as on opposite sides of lid 150. As another example, lid 150 can include four locking tabs, such as spaced equally around the perimeter of lid 150.

FIG. 3B is a right side elevation view of lid 150 from FIG. 3A illustrated on a bucket 100 (shown in dashed lines). As illustrated in FIG. 3B, locking tabs 200 can be configured to engage the bottom of rim channel 102 (shown in dashed lines) of bucket 100. That is, outer lip 172 can be dimensioned and sized such that it may be substantially flush with the bottom of rim channel 102 so that locking tabs 200 can releasably engage the bottom of rim channel 102. It will be appreciated by those of ordinary skill in the art that other configurations are possible. For example, rim channel 102 can have an area configured to line up with locking tabs 200 and may be dimensioned shorter than the bottom of rim channel 102. This is illustrated in FIG. 3C. In this regard, locking tabs 200 may engage rim channel 102 slightly above the bottom of rim channel 102. As another example, rim channel 102 can have an opening dimensioned to accept a locking tab 200. This is illustrated in FIG. 3D. The configuration in FIG. 3D may be particularly useful when the rim channel 102 of a bucket 100 projects upward rather than curls outward, such as bucket 100e shown in FIG. 1E.

Figure 3E:
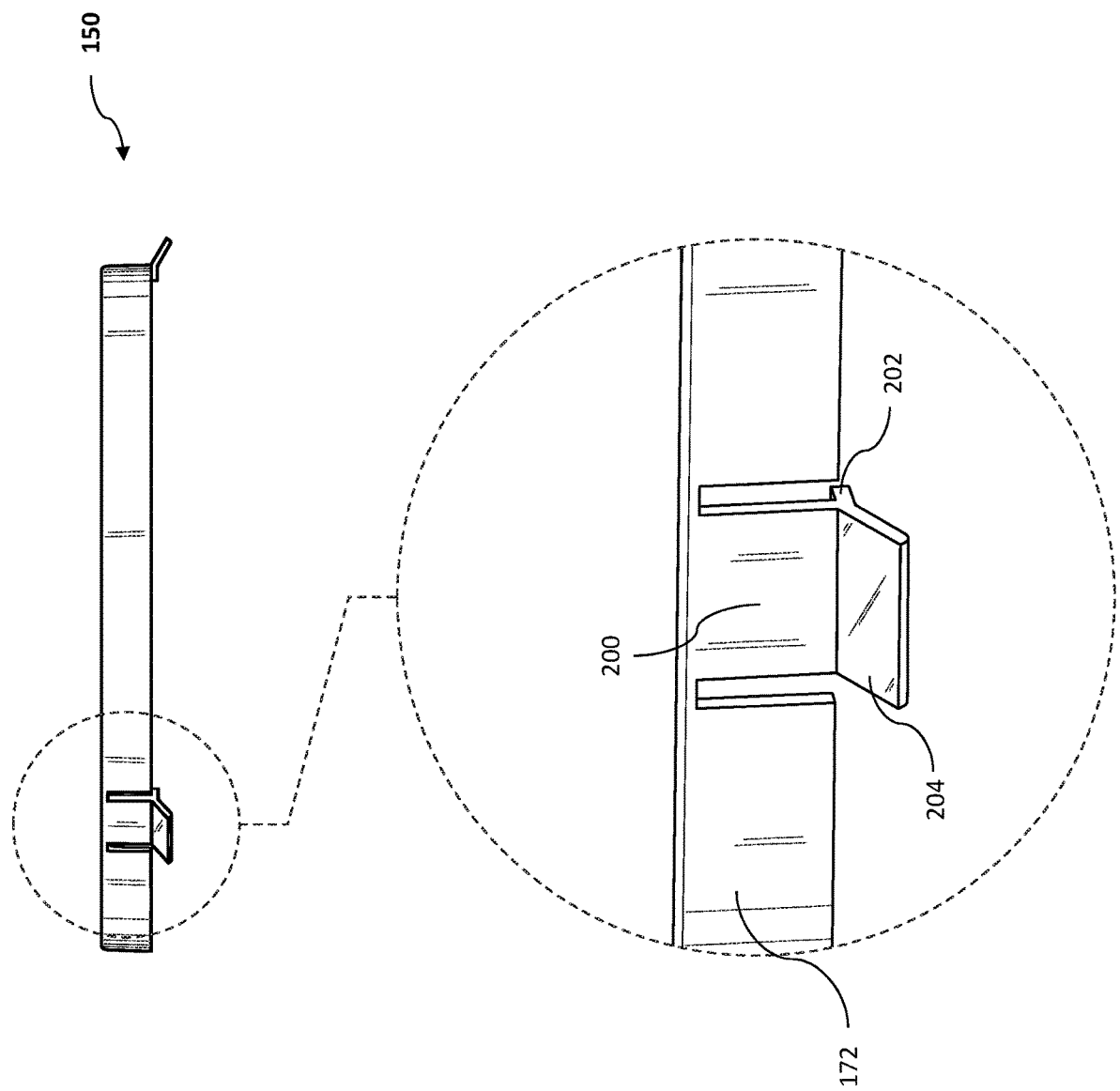
FIG. 3E is an enlarged view illustrating an example locking tab.

FIG. 3E is an enlarged view of a lid 150 illustrating a locking tab 200. As illustrated, locking tab 200 can have a clip portion 202 configured to engage a rim channel 102. Locking tab 200 can optionally have a grip portion 204 to allow a user to exert a force on locking tab 200 to releasably engage it from a rim channel 102.

Figure 4A:
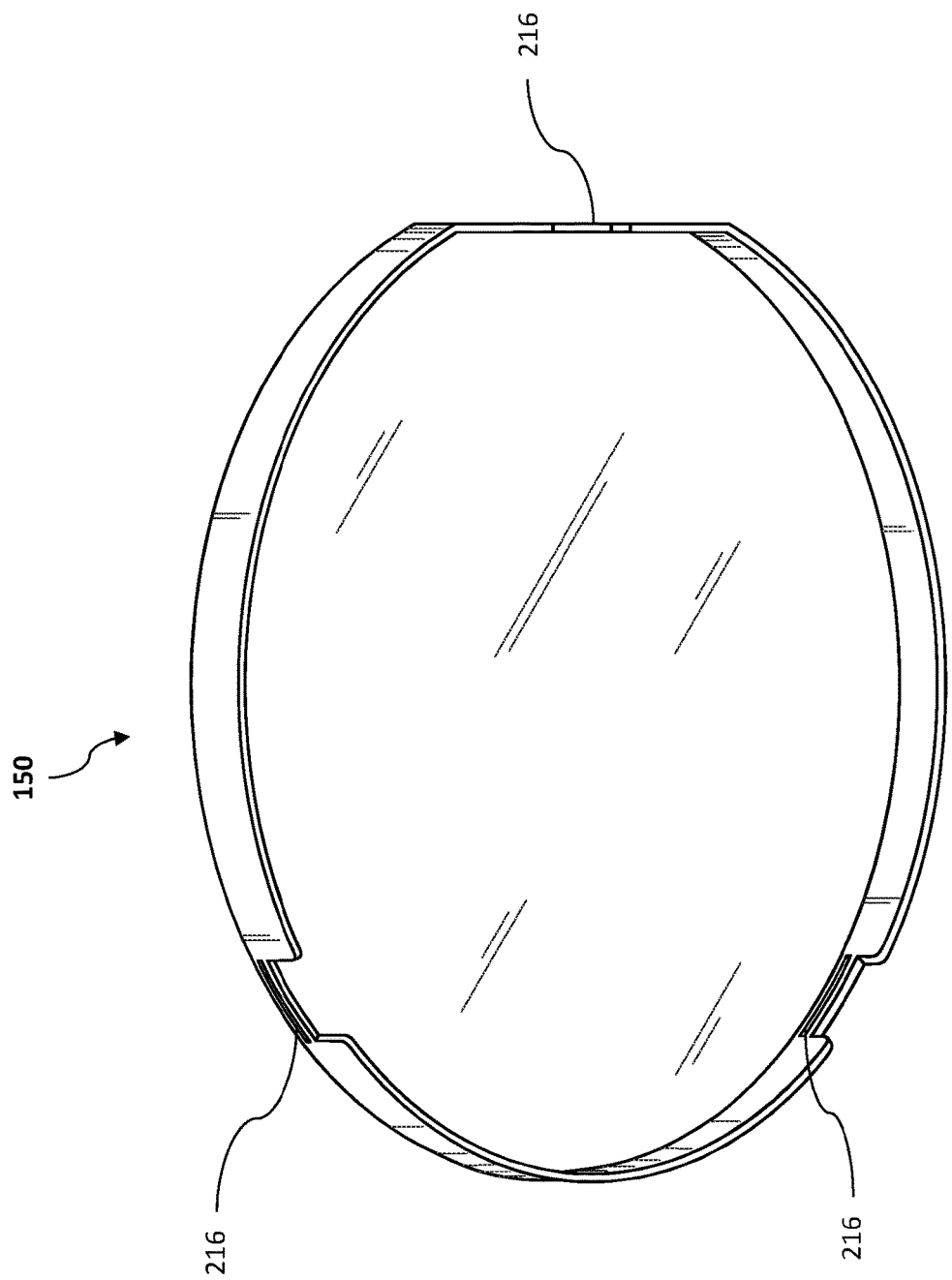
FIG. 4A is a perspective view illustrating an example lid comprising receiving slots for locking tabs.
Figure 4B:
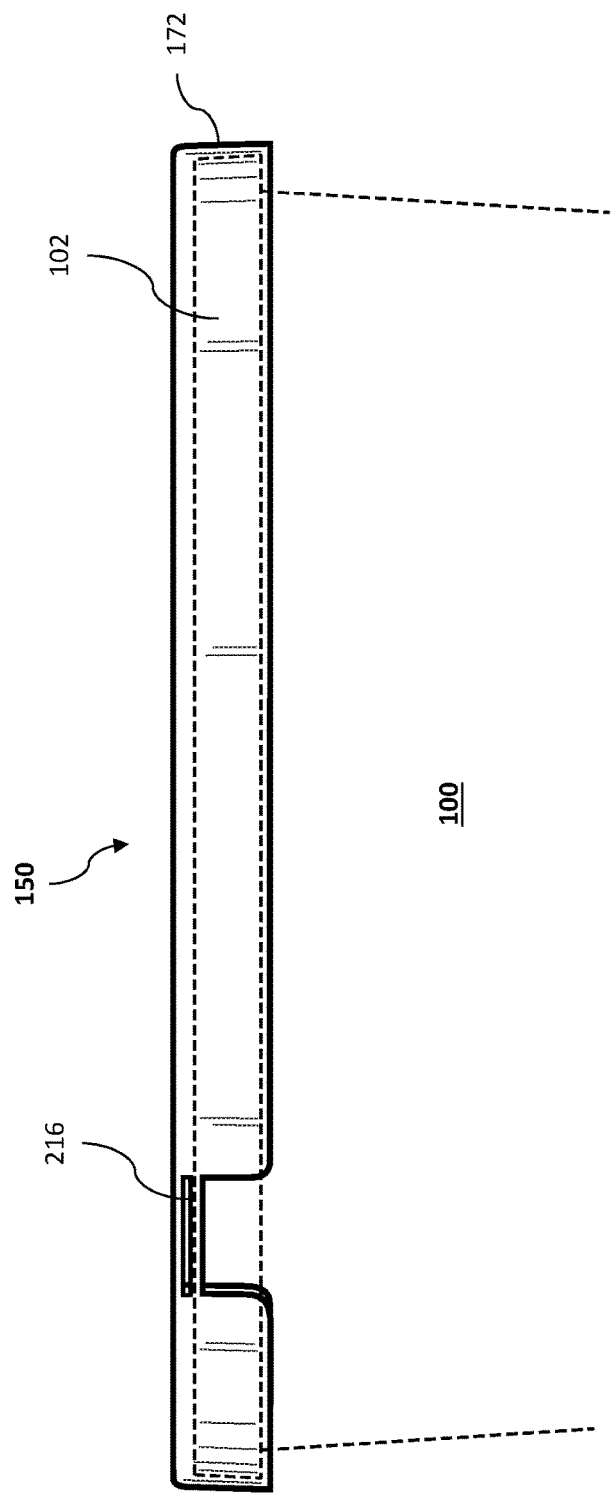
FIG. 4B is a side elevation view illustrating an example lid comprising receiving slots for locking tabs.
Figure 4C:
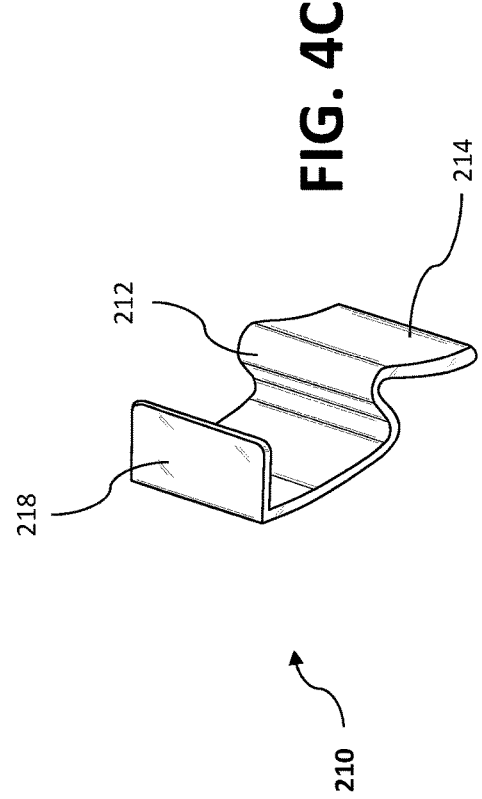
FIG. 4C is a perspective view illustrating an example removable locking tab.

As illustrated in FIGS. 4A through 4C, a lid 150 can include one or more receiving slots 216 to receive removable locking tabs 210 to secure lid 150 to a bucket 100 (shown in dashed lines in FIG. 4B). As best illustrated in FIG. 4B, outer lip 172 of lid 150 can include a receiving slot 216 near the top of outer lip 172. Removable locking tab 210 can be inserted into receiving slot 216 to releasably engage the bottom of rim channel 102 (shown in dashed lines in FIG. 4B). Removable locking tab 210 can include an upper flat portion 218 that is configured to be inserted into a receiving slot 216. Optionally, the upper flat portion 218 can be configured to snap permanently into receiving slot 216 such that it cannot be removed from lid 150 once inserted. This may help prevent inadvertent loss of locking tab 210 during use. As illustrated in FIG. 4C, removable locking tab 210 can have a clip portion 212 configured to engage a rim channel 102 of a bucket 100. Removable locking tab 210 can have a grip portion 214 to allow a user to exert a force on removable locking tab 210 to releasably engage it from a rim channel 102.

Although FIG. 4A illustrates lid 150 with three receiving slots 216, lid 150 can include any number of receiving slots 216. For example, lid 150 can include only one receiving slot 216, such as in the front or rear of lid 150. Alternatively, lid 150 can include two receiving slots 216, such as on opposite sides of lid 150. As another example, lid 150 can include four receiving slots 216, such as spaced equally around the perimeter of lid 150. Additionally, lid 150 can be secured to a bucket 100 with one or more removable locking tabs 210, including with fewer locking tabs than receiving slots 216. For example, lid 150 can have a plurality of receiving slots 216 spaced around the perimeter of outer lip 172, but only one, two, or three (or any other number) such receiving slots 216 may be utilized for removable locking tabs 210. In this regard, lid 150 may be versatile in that a user can place removable locking tabs 210 wherever desired, which may change from time to time based on the contents of bucket 100.

Ribs.

As illustrated in FIG. 5A, lid 150 can include one or more ribs 220 extending downwardly from the bottom surface of lid 150. Ribs 220 can be positioned relative to outer lip 172 to form a slot or gap for receiving the rim channel 102 of a bucket 100. FIG. 5B is a cross-sectional side view of a lid 150 on a bucket 100 that better illustrates ribs 220. As illustrated, ribs 220 can be positioned on the bottom surface of lid 150 a distance approximately equal to the width of rim channel 102 so as to engage an inner wall 103 of rim channel 102 when lid 150 is on bucket 100. Although nine ribs are illustrated in FIG. 5A, lid 150 can include any number of ribs.

Retainer Lips.

Figure 6B:
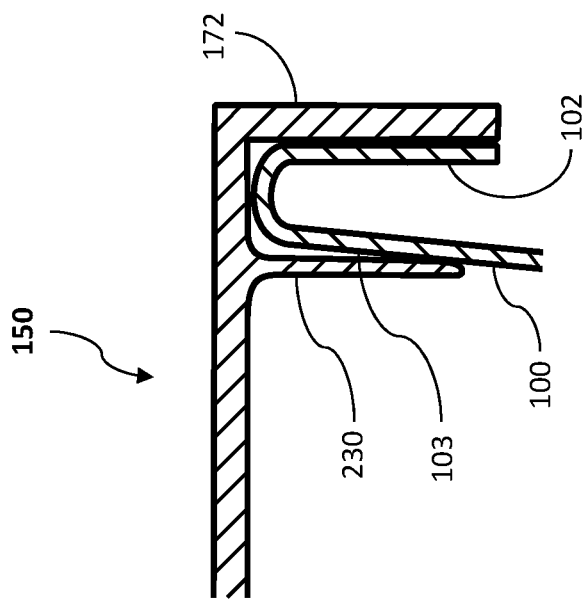
FIG. 6B is a cross-sectional side elevation view illustrating a bucket rim channel and a lid comprising a retainer lip.
Figure 6A:
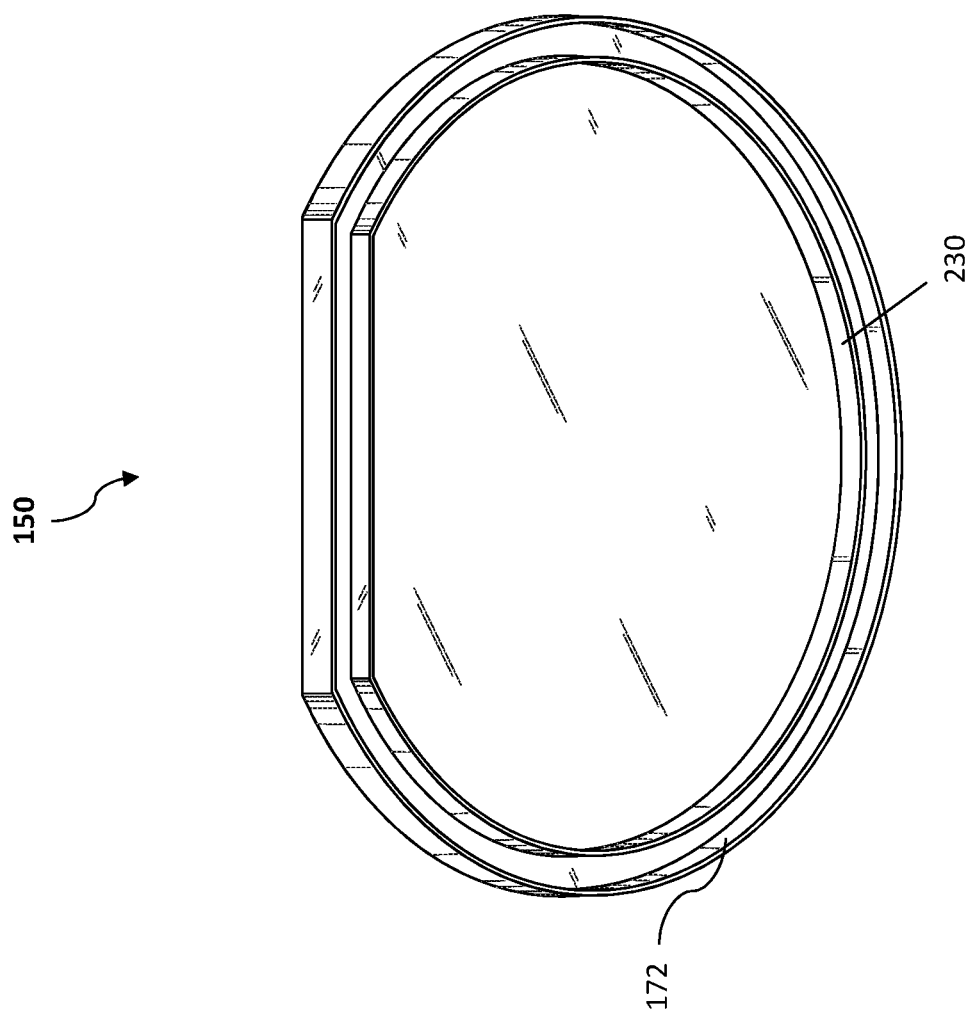
FIG. 6A is a perspective view illustrating an example lid comprising a retainer lip.

As illustrated in FIG. 6A, lid 150 can include a retainer lip 230 extending downwardly from the bottom surface of lid 150. Retainer lip 230 can be positioned relative to outer lip 172 to form a slot or gap for receiving the rim channel 102 of a bucket 100. FIG. 6B is a cross-sectional side view of a lid 150 on a bucket 100 that better illustrates retainer lips 230. As illustrated, retainer lip 230 can be positioned on the bottom surface of lid 150 a distance approximately equal to the width of rim channel 102 so as to engage an inner wall 103 of rim channel 102 when lid 150 is on bucket 100. Retainer lip 230 can be made of a flexible material to allow it to bend when lid 150 is placed over rim channel 102 and retainer lip 230 engages inner wall 103. Although FIG. 6A illustrates only one retainer lip generally extending around the perimeter of lid 150, lid 150 can include any number of retainer lips. For example, lid 150 can have a retainer lip 230 that is substantially parallel to a flat back of lid 150, and another retainer lip 230 near the front of lid 150. As another example, lid 150 can have four retainer lip 230 spaced approximately equally apart around the perimeter of lid 150.

Recesses.

Figure 7B:
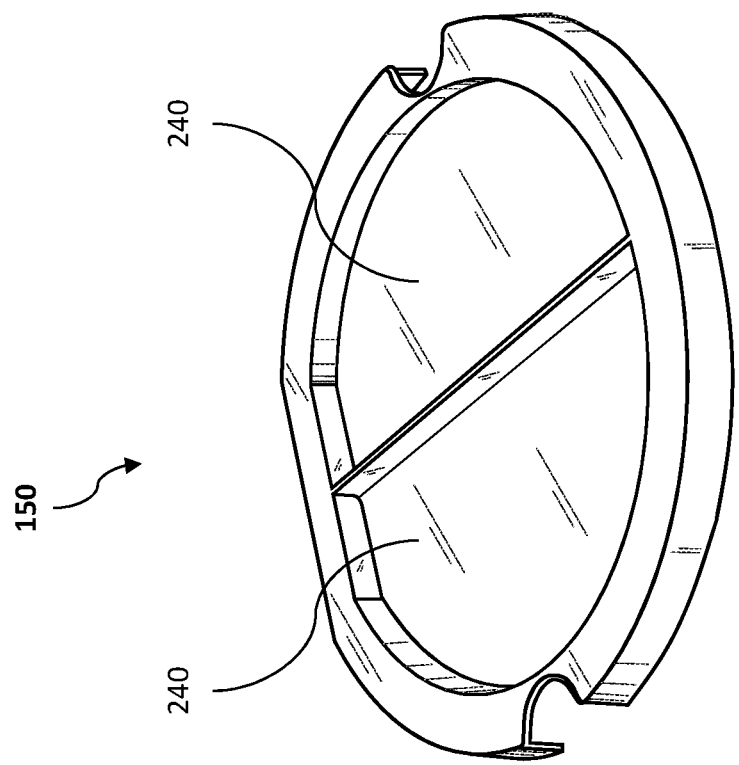
FIGS. 7A through 7C are perspective views illustrating example lids comprising recessed portions.
Figure 7A:
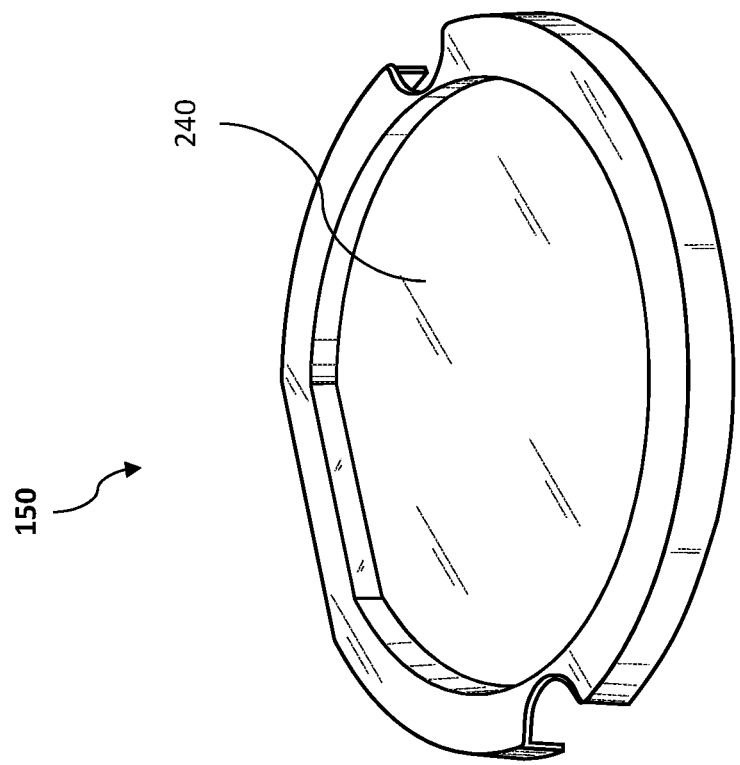

As illustrated in FIGS. 7A and 7B, lid 150 can include one or more recessed portions 240 that extend downwardly from an upper surface of the lid 150. The outer walls of conventional buckets are often tapered, resulting in a diameter near the bottom of the bucket that is smaller than a diameter near the top of the bucket. Thus, recessed portions 240 can be sized and configured to receive the bottom of another bucket in a stacked relationship. Although FIGS. 7A and 7B illustrate one and two recessed portions, respectively, other configurations are possible. For example, the bottom of a bucket 100 can include two upwardly projecting ridges perpendicular to each other, resulting in the bottom surface of bucket 100 being divided into quadrants. Accordingly, lid 150 can include four recessed portions 240 to accommodate the bottom of such a bucket configuration.

Figure 7D:
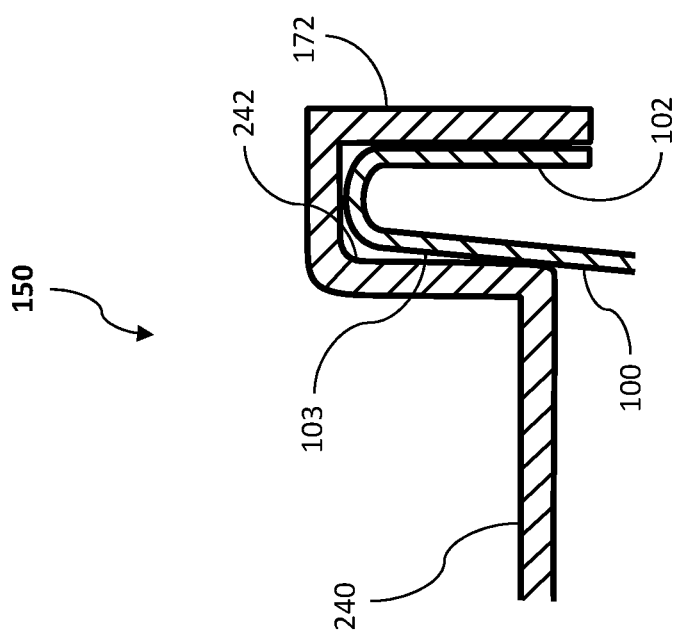
FIG. 7D is a cross-sectional side elevation view illustrating a bucket rim channel and a lid comprising a recessed portion.
Figure 7C:
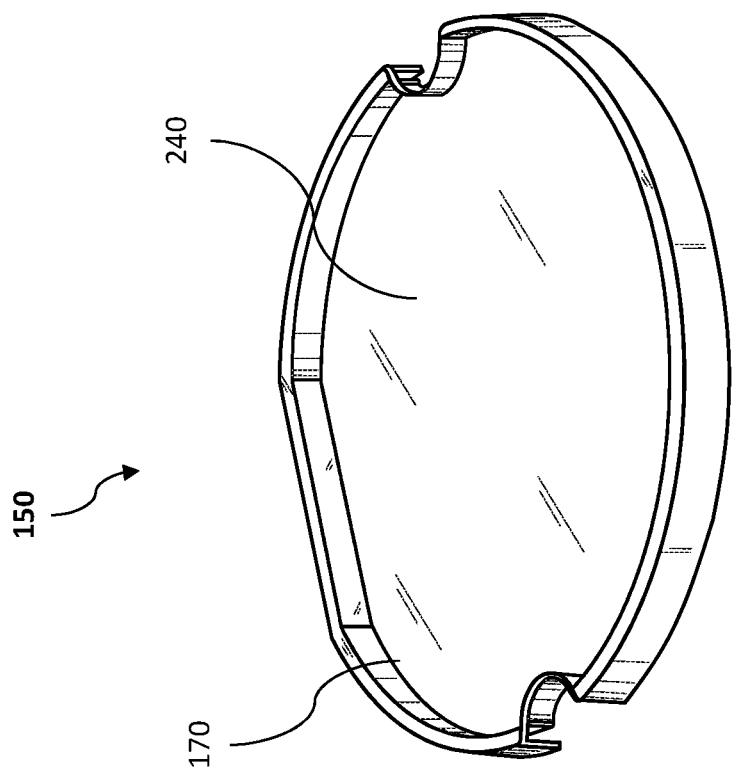

As illustrated in FIG. 7C, recessed portions 240 can extend downwardly from the upper surface of lid 150 near a peripheral margin 170. In this regard, recessed portions 240 can be sized and configured so that a rim channel 102 of a bucket 100 can fit in the area between the inner surface of outer lip 172 and recessed portions 240. FIG. 7D is a cross-sectional side view of a lid 150 on a bucket 100 that better illustrates this. As illustrated, an outer surface 242 of recessed portion 240 can be configured to engage inner surface 103 of rim channel 102 and securably attach lid 150 to bucket 100. Recessed portions 240 can also receive the bottom of another bucket in a stacked relationship as explained above. Although FIG. 7C illustrates only one recessed portion, other configurations are possible. For example, the two recessed portions illustrated in FIG. 7B can project downwardly from the upper surface of lid 150 near peripheral margin 170. Thus, recessed portions 240 can play dual roles by facilitating the stacking of buckets and securably attaching lid 150 to bucket 100.

Bail Handle Grooves.

Figure 8A:
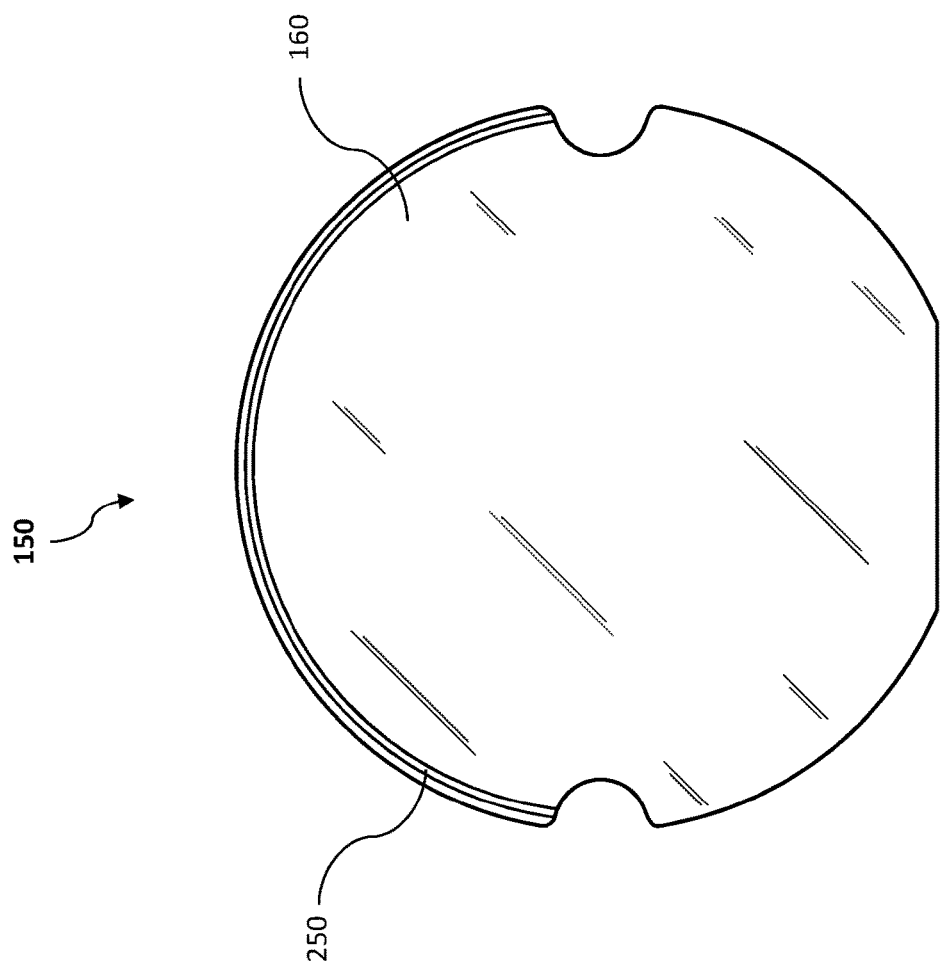
FIG. 8A is a top plan view illustrating an example lid comprising a bail handle groove.

As illustrated in FIG. 8A, lid 150 can include one or more grooves 250 in a front portion 160 of lid 150 to receive a bail handle 106 of a bucket 100. As noted above, some buckets have bail mounts disposed upwardly from a rim channel of the bucket, resulting in the bail handle of such buckets generally lying on the surface of the rim channel when the bucket is at rest. Thus, groove 250 can accommodate such bucket configurations by providing an area on lid 150 for bail handle 106 to lie when bucket 100 is at rest. FIGS. 8B, 8C, and 8D are cross-sectional side views of alternative lid configurations having a groove 250. As illustrated, different configurations for groove 250 are possible, some of which might depend, in part, on the thickness of lid 150. For example, FIG. 8B illustrates groove 250 accommodating bail handle 106 (shown in dashed lines) for one lid construction. FIG. 8C illustrates groove 250 accommodating bail handle 106 with a lid construction that is raised relative to a rim channel. FIG. 8D illustrates groove 250 accommodating bail handle 106 with a raised lid center portion. Additionally, some bail handles include a hook portion 107 as illustrated in FIG. 8E. To accommodate such a hook, groove 250 can comprise two grooves that exit near the front of lid 150 as illustrated in FIG. 8E.

Bail Handle Cutout.

Figure 9:
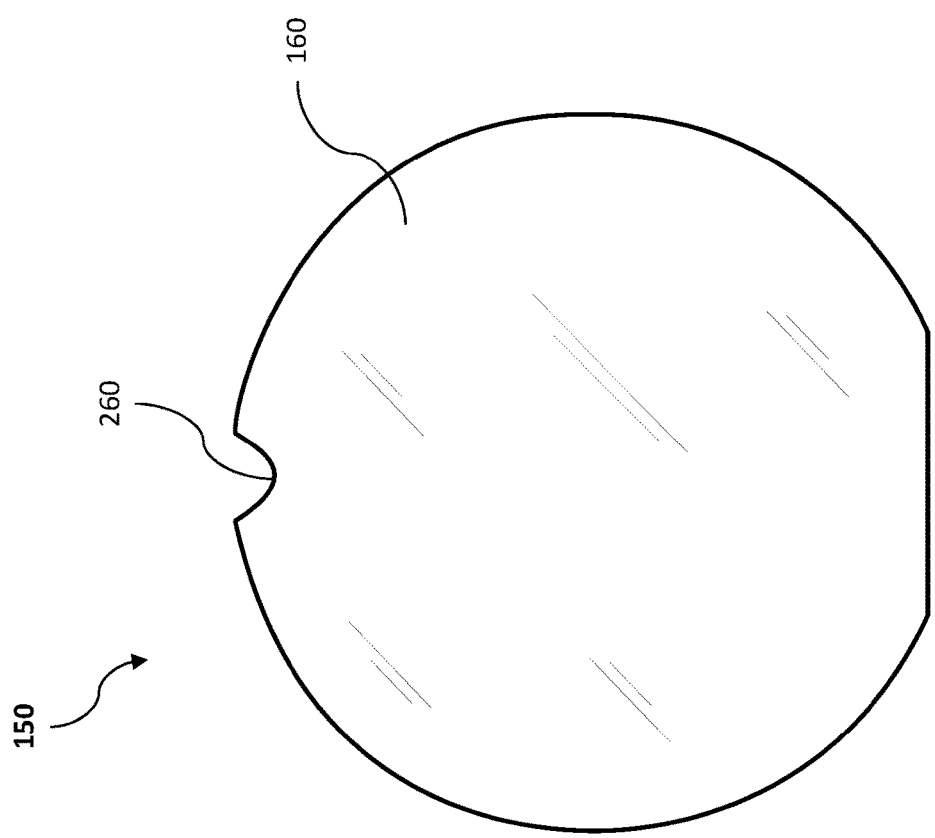
FIG. 9 is a top plan view illustrating an example lid comprising a bail handle cutout.

As illustrated in FIG. 9, lid 150 can include a cutout 260 in a front lid portion 160. Cutout 260 can provide room to grasp bail handle 106 (not shown). Cutout 260 may be particularly useful when lid 150 includes a groove 250 in which bail handle 106 lies when bucket 100 is at rest.

Bail Mount Cutouts.

Lid 150 can include a pair of cutouts 270 generally aligned on an axis that coincides with an axis for bail mounts 104 of a bucket 100 (an example axis 180*d* is illustrated in FIG. 1D). Cutouts 270 provide space to avoid interference of the lid 150 with bail handle 106 or bail mounts 104 when lid 150 is on a bucket 100. Cutouts 270 can be any shape or size suitable to accommodate bail mounts 104 of a bucket 100. Where bail mounts 104 are disposed upwardly from rim channel 102, cutouts 270 may be in the upper surface of a lid 150. Where bail mounts 104 are disposed laterally from or near rim channel 102, cutouts 270 may be in the outer lip 172 of a lid 150. By way of example only and without limitation, example embodiments illustrating alternative bail mount cutouts 270 are now provided.

Figure 10C:
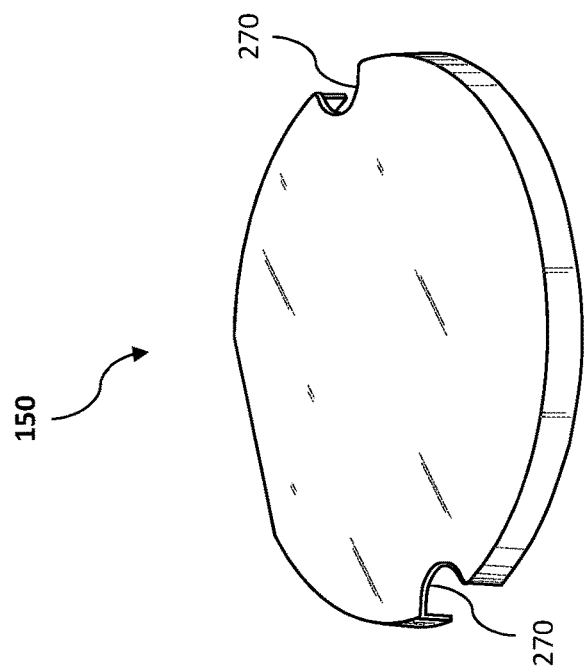
FIG. 10C is a perspective view illustrating example bail mount cutouts.
Figure 10A:
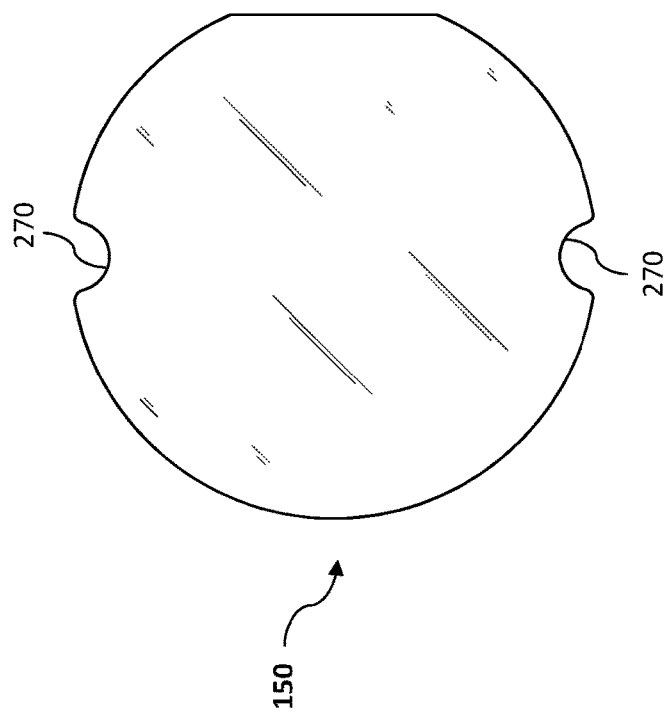
FIG. 10A is a top plan view illustrating example bail mount cutouts.
Figure 10B:
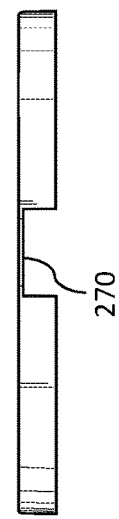
FIG. 10B is a side elevation view illustrating example bail mount cutouts.

For example, FIGS. 10A, 10B, and 0C illustrate cutouts 270 having a generally semicircular shape in the upper surface of lid 150. In this regard, cutouts 270 can accommodate bail mounts 104 disposed upwardly or laterally from or near a rim channel 102.

As another example, FIGS. 1A, 11B, and 11C illustrate cutouts 270 having a generally semicircular shape in outer lip 172 of lid 150. In this regard, cutouts 270 can accommodate bail mounts 104 disposed laterally from or near a rim channel 102. FIGS. 11A and 11C are perspective views in which far end cutouts 270 are not shown, but it should be understood and appreciated that lid 150 illustrated in FIGS. 11A and 11C includes a pair of cutouts on opposite sides.

Figure 12C:
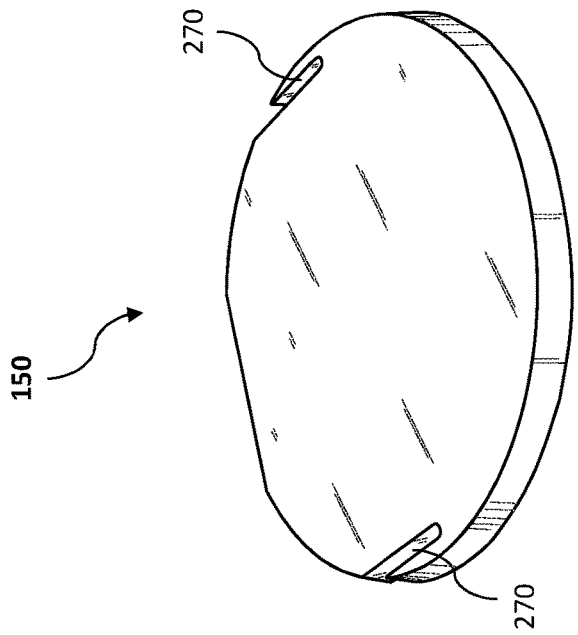
FIG. 12C is a perspective view illustrating example bail mount cutouts.
Figure 12A:
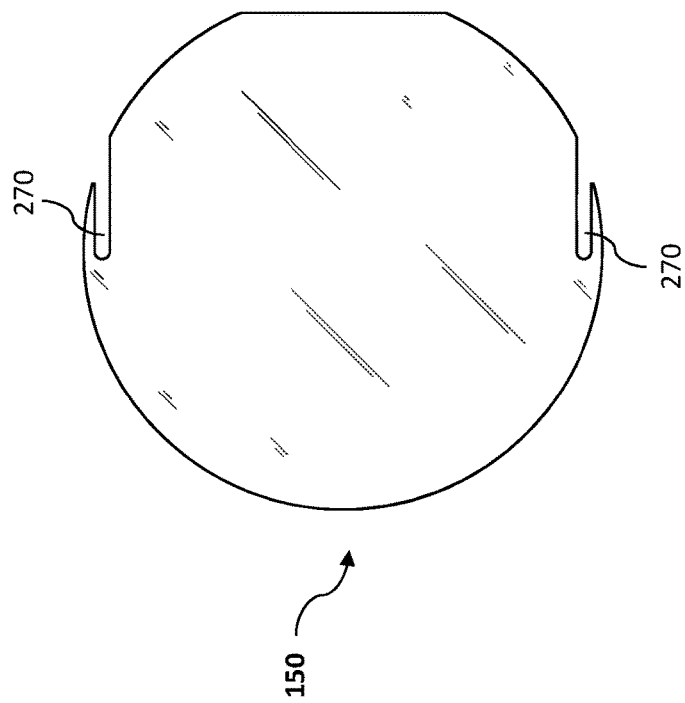
FIG. 12A is a top plan view illustrating example bail mount cutouts.
Figure 12B:
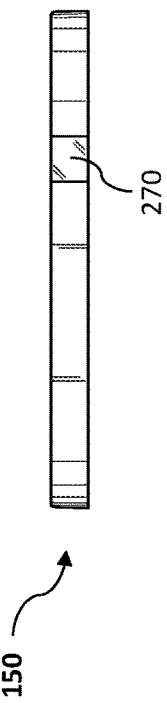
FIG. 12B is a side elevation view illustrating example bail mount cutouts.

As another example, FIGS. 12A, 12B, and 12C illustrate cutouts 270 having a slotted shape in the upper surface of lid 150. In this regard, cutouts 270 can accommodate bail mounts 104 disposed upwardly from a rim channel 102. Lid 150 can be placed onto a bucket 100 by sliding lid 150 from the front towards the rear of bucket 100 and over bail mounts 104.

Figure 13C:
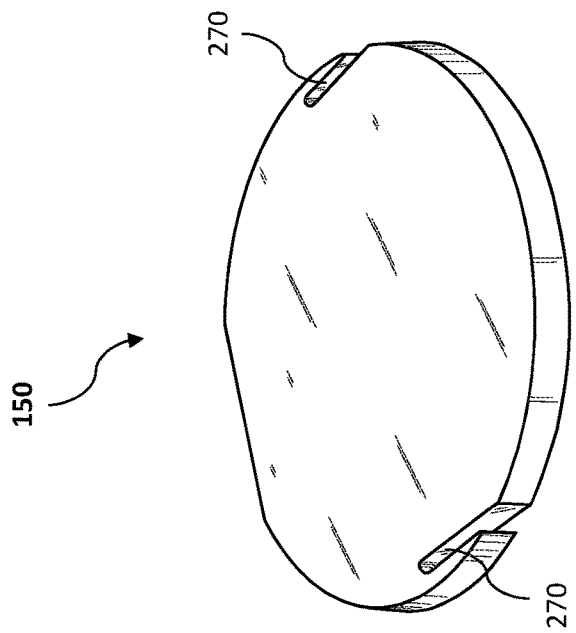
FIG. 13C is a perspective view illustrating example bail mount cutouts.
Figure 13A:
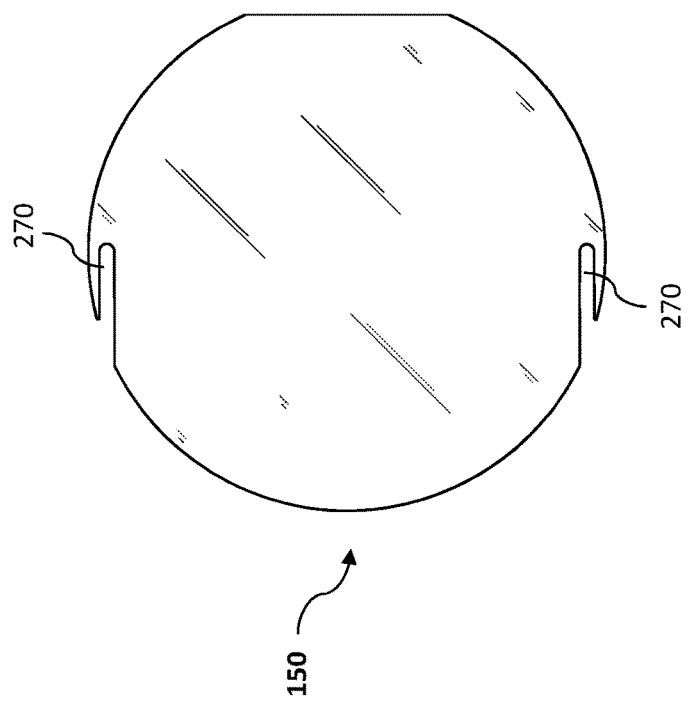
FIG. 13A is a top plan view illustrating example bail mount cutouts.
Figure 13B:
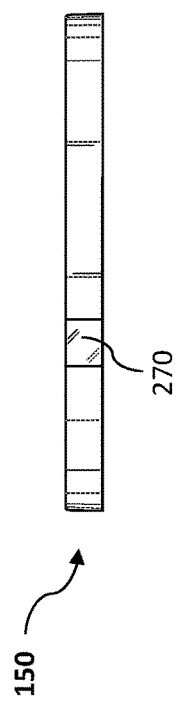
FIG. 13B is a side elevation view illustrating example bail mount cutouts.

As another example, FIGS. 13A, 13B, and 13C illustrate cutouts 270 having a slotted shape in the upper surface of lid 150. In this regard, cutouts 270 can accommodate bail mounts 104 disposed upwardly from a rim channel 102. Lid 150 can be placed onto a bucket 100 by sliding lid 150 from the rear towards the front of bucket 100 and over bail mounts 104.

Figure 14C:
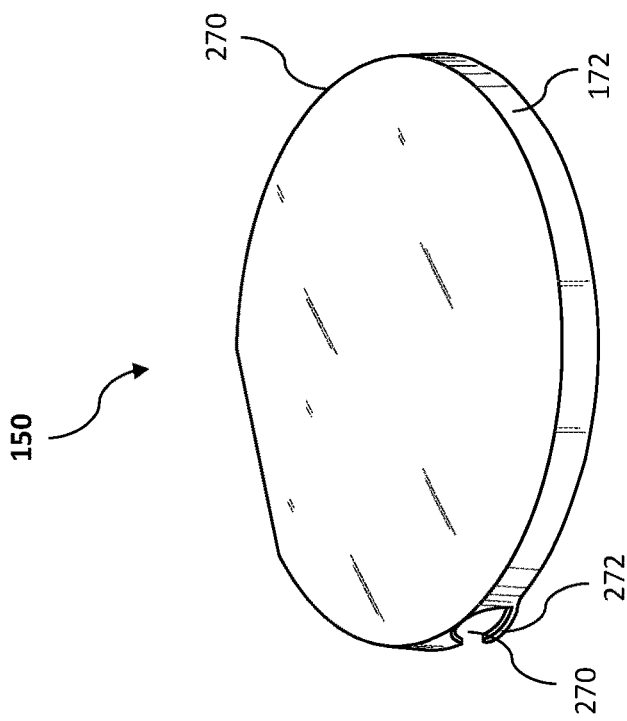
FIG. 14C is a perspective view illustrating example bail mount cutouts.
Figure 14A:
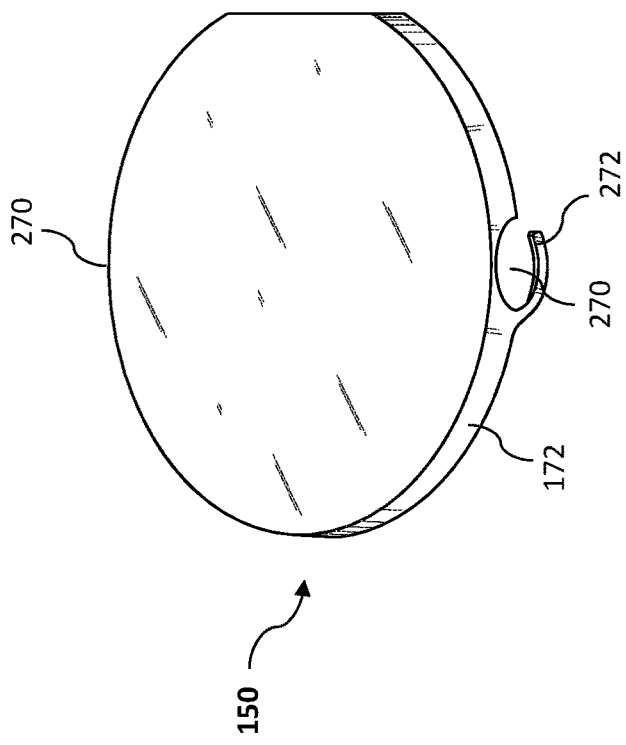
FIG. 14A is a perspective view illustrating example bail mount cutouts.
Figure 14B:
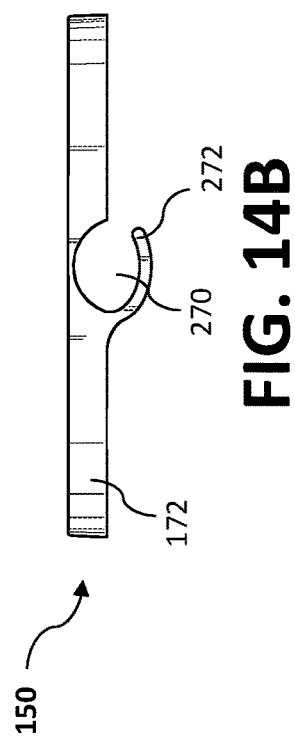
FIG. 14B is a side elevation view illustrating example bail mount cutouts.

As another example, FIGS. 14A, 14B, and 14C illustrate cutouts 270 having a C-shape in outer lip 172 of lid 150. In this regard, cutouts 270 can accommodate bail mounts 104 disposed laterally from or near a rim channel 102. Lid 150 can be placed onto a bucket 100 by sliding lid 150 from the front towards the rear of bucket 100 and around bail mounts 104. The lower arm 272 of cutouts 270 can help to secure lid 150 to bucket 100. FIGS. 14A and 14C are perspective views in which far end cutouts 270 are not shown, but it should be understood and appreciated that lid 150 illustrated in FIGS. 14A and 14C includes a pair of cutouts on opposite sides.

Figure 15C:
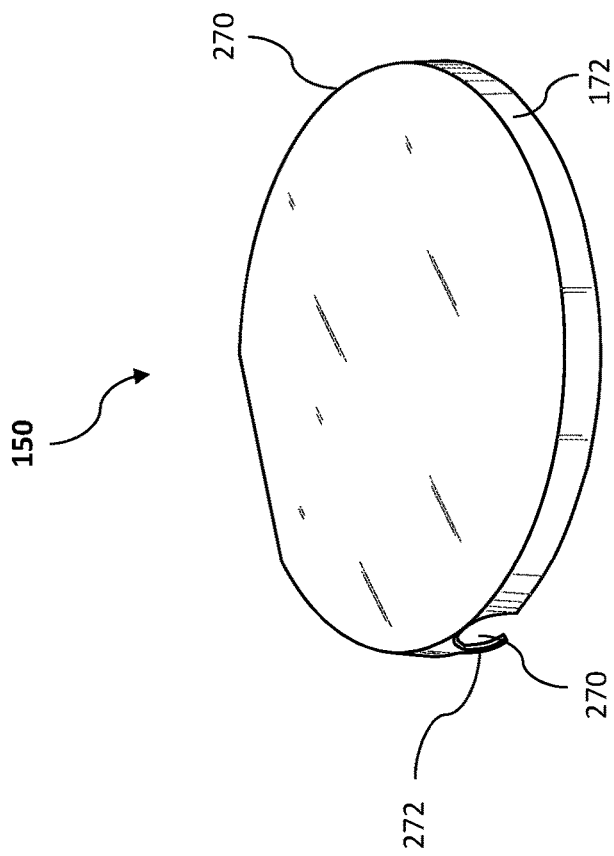
FIG. 15C is a perspective view illustrating example bail mount cutouts.
Figure 15A:
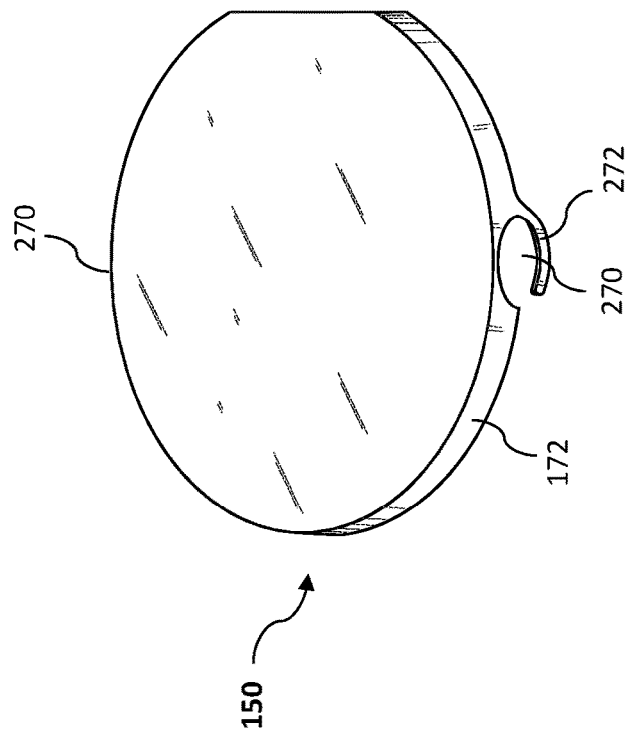
FIG. 15A is a perspective view illustrating example bail mount cutouts.
Figure 15B:
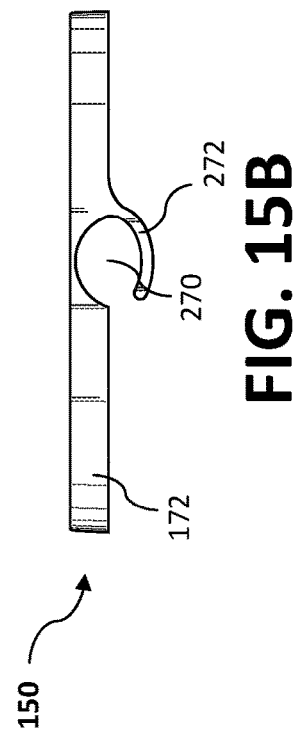
FIG. 15B is a side elevation view illustrating example bail mount cutouts.

As another example, FIGS. 15A, 15B, and 15C illustrate cutouts 270 having a C-shape in outer lip 172 of lid 150. In this regard, cutouts 270 can accommodate bail mounts 104 disposed laterally from or near a rim channel 102. Lid 150 can be placed onto a bucket 100 by sliding lid 150 from the rear towards the front of bucket 100 and around bail mounts 104. The lower arm 272 of cutouts 270 can help to secure lid 150 to bucket 100. FIGS. 15A and 15C are perspective views in which far end cutouts 270 are not shown, but it should be understood and appreciated that lid 150 illustrated in FIGS. 15A and 15C includes a pair of cutouts on opposite sides.

It will be appreciated by those of ordinary skill in the art that other shapes and configurations for bail mount cutouts 270 are possible. For example, cutouts 270 can be shaped as an oval, a circle, a triangle, a square, a rectangle, a diamond, a trapezoid, as well as other shapes. As explained below, where lid 150 includes a multi-piece configuration, additional cutout examples are possible.

As illustrated in FIGS. 16A and 16B, lid 150 can include one or more removable side portions 280. Removable side portion 280 can include a bail mount cutout 270 to receive a bail mount 104 of a bucket 100. Removable side portion 280 can have a proximal end 282 near center lid portion 164 and a distal end 284 near cutout 270. Removable side portion 280 can include a locking wall 286 at the proximal end 282 and configured to removably engage a center portion locking wall 165. Locking walls 286 and 165 can include openings 287 to accommodate the rim channel 102 of a bucket 100. Other configurations may also be used in lieu of the illustrated locking walls to removably couple side portion 280 and center portion 164 as would be appreciated by those of ordinary skill in the art.

Although removable side portion locking wall 286 is illustrated in FIGS. 16A and 16B as projecting downwardly and center portion locking wall 165 is illustrated as projecting upwardly, it will be appreciated by those of ordinary skill in the art that other configurations are possible for removably coupling side portion 280 and center portion 164. For example, removable side portion locking wall 286 can project upwardly and center portion locking wall 165 can project downwardly. As another example, removable side portion 280 and center lid portion 164 can each include continuous locking walls or several locking walls. As a further example, portions of locking walls 286 and 165 may alternate between projecting upwardly and downwardly.

Furthermore, although lid 150 is illustrated in FIGS. 16A and 16B as including one removable side portion 280, lid 150 may include another removable side portion 280 near the other bail mount 104 of bucket 100. Additionally, removable side portion 280 need not span the entire length of lid 150 as illustrated in FIG. 16A, but may include only a portion of lid 150, for example, around a bail mount cutout 270.

Figure 17A:
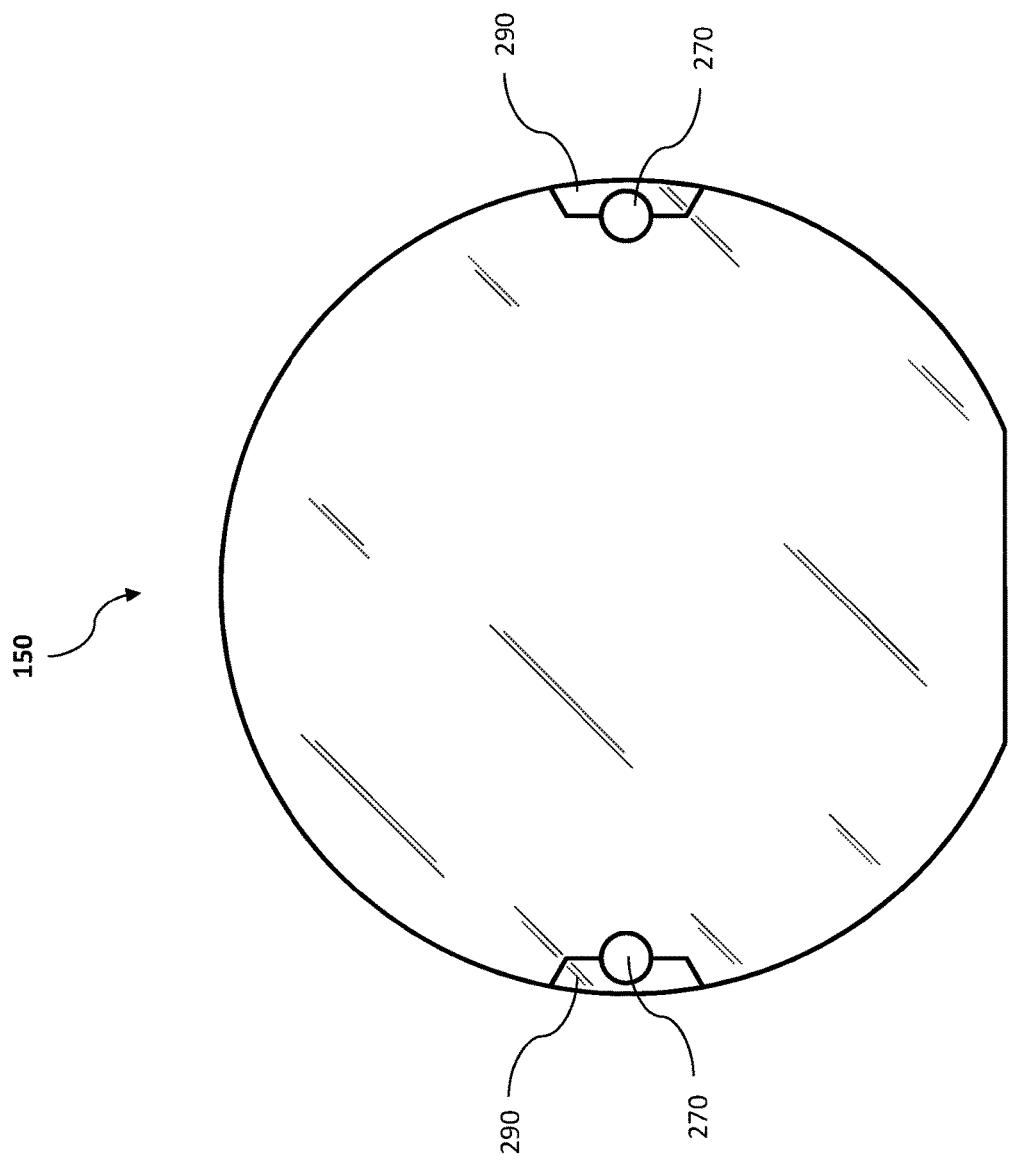
FIG. 17A is a top plan view illustrating an example lid comprising bail mount cutout assemblies.
Figure 17B:
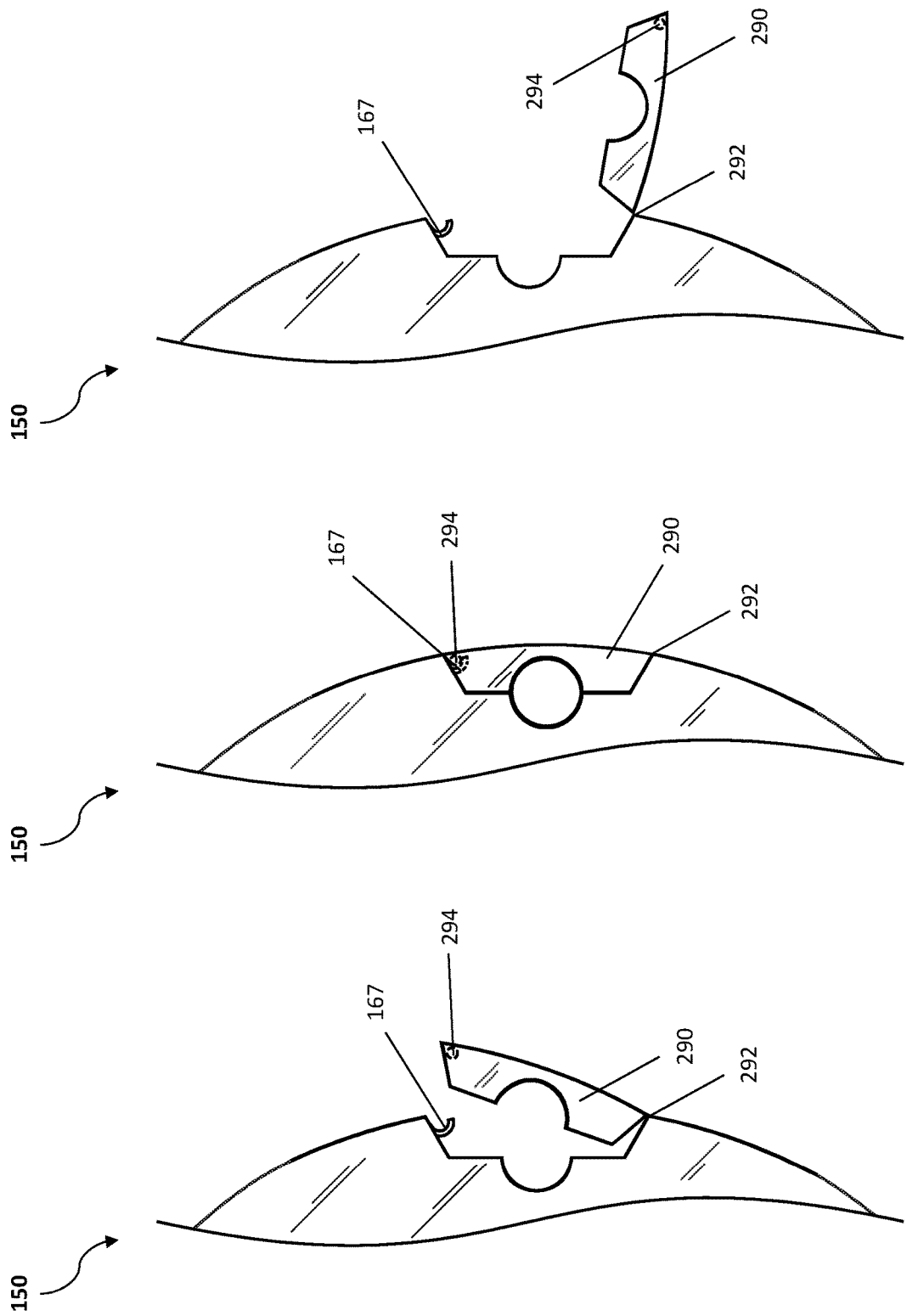
FIG. 17B is a top plan view illustrating an example bail mount cutout assembly.

As illustrated in FIGS. 17A and 17B, lid 150 can include one or more bail mount cutout assemblies 290. A cutout assembly 290 includes a cutout 270 to receive a bail mount 104 of a lid 100. Although cutouts 270 illustrated in FIGS. 17A and 17B are generally circular in shape, any bail mount cutout shape is possible, including those described above. FIG. 17B includes partial views of a lid 150 and illustrates the operation of bail mount cutout assembly 290. Cutout assembly 290 may be hingedly connected to lid 150 by hinge 292, which can be any type of hinge familiar to those of ordinary skill in the art, including a living hinge, mechanical hinge, and others. Cutout assembly 290 can include a post 294 configured to detachably couple with a receiving snap 167 on a side lid portion 166. As best illustrated in FIG. 17B, lid 150 may be placed on a bucket 100 (not shown) without cutout assembly 290 in an open position. After cutouts 270 receive the bail mounts 104 of bucket 100, cutout assembly 290 can be closed around bail mounts 104. Although cutout assembly 290 is illustrated with a post 294 and a receiving snap 167, other configurations and mechanisms for securably attaching cutout assembly 290 are possible as would be appreciated by those of ordinary skill in the art.

Flex Zones.

As illustrated in FIGS. 18A, 18B, and 18C, lid 150 can include one or more flex zones 300. Flex zones 300 permit portions of lid 150 to be flexed or bowed to facilitate placement of the lid 150 over bail mounts 104 and onto a rim channel 102. An example flex zone is an area of reduced thickness of lid 150. Another example flex zone is durable material capable of being flexed or bowed. As illustrated in FIG. 18A, the entire lid 150 can include a flex zone. As illustrated in FIGS. 18B and 18C, portions of lid 150 can include flex zones 300. It will be appreciated by those of ordinary skill in the art that any number of flex zones 300 can be included in lid 150, and that any flex zone 300 can be shaped in any configuration.

Multi-Piece Lid Configurations.

Lid 150 can comprise a generally unitary 1-piece configuration (with or without removable side portions 280 and/or bail mount assemblies 290), or may comprise a multi-piece configuration. Lids 150 that comprise a multi-piece configuration may have two or more lid portions hingedly connected or removably coupled to one another. Examples of these configurations are now provided.

Figure 19B:
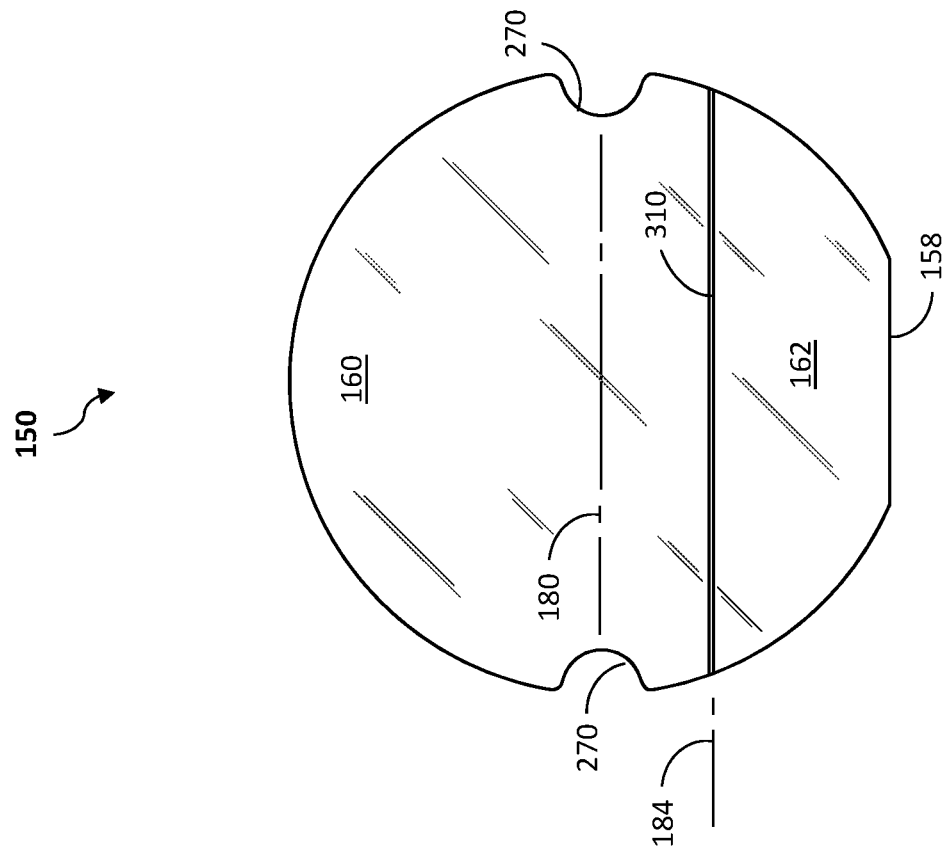
FIGS. 19A through 19C are top plan views illustrating example multi-piece lids.
Figure 19A:
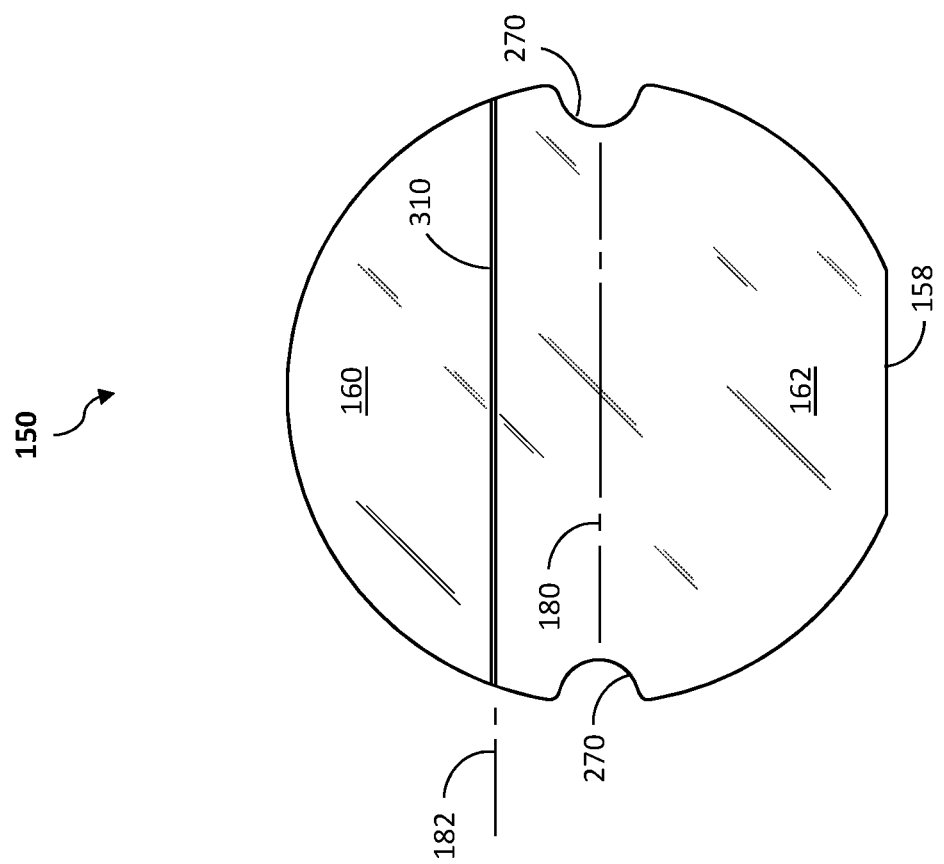
Figure 19C:
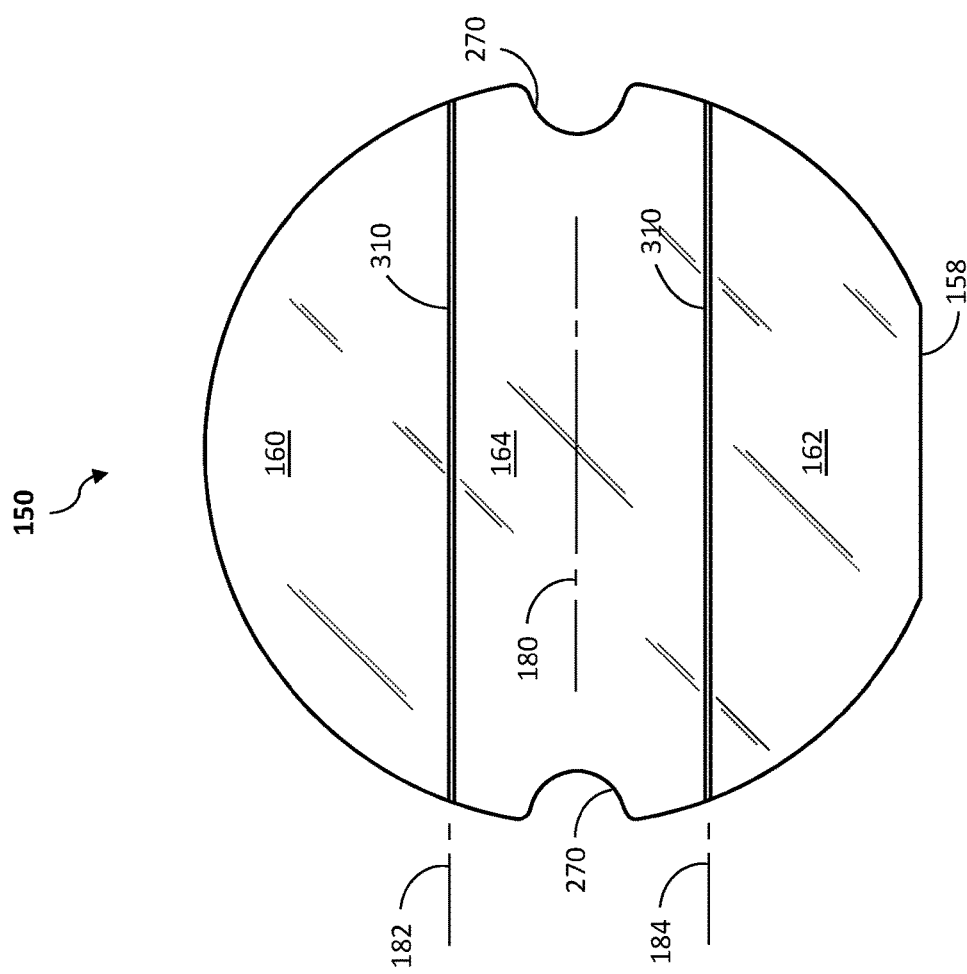

As illustrated in FIGS. 19A and 19B, lid 150 can include a front lid portion 160 hingedly connected to a rear lid portion 162 by hinged connection 310 to allow the front lid portion 160 and rear lid portion 162 to pivot with respect to one another. FIGS. 19A and 19B illustrate a first axis 180 that approximately coincides with cutouts 270. As illustrated in FIG. 19A, hinged connection 310 can lie on a second axis 182 that is substantially parallel to the first axis 180 and lies between the first axis 180 and the front of lid 150. As illustrated in FIG. 19B, hinged connection 310 can lie on a second axis 184 that is substantially parallel to the first axis 180 and lies between the first axis 180 and a flat back 158. As illustrated in FIG. 19C, lid 150 can include a front lid portion 160 hingedly connected to a center lid portion 164, and the center lid portion 164 hingedly connected to a rear lid portion 162. In this configuration, front lid portion 160 can pivot with respect to the center lid portion 164 independent of the rear lid portion 162. Similarly, center lid portion 164 can pivot with respect to the rear lid portion 162 independent of the front lid portion 160. Hinged connection 310 between the front lid portion 160 and center lid portion 164 can lie on a second axis 182 that is substantially parallel to the first axis 180 and lies between the first axis 180 and the front of lid 150. Hinged connection 310 between the center lid portion 164 and rear lid portion 162 can lie on a second axis 184 that is substantially parallel to the first axis 180 and lies between the first axis 180 and a flat back 158. As illustrated in FIGS. 19A, 19B, and 19C, hinged connections 310 can span the entire width of lid 150.

Figure 20A:
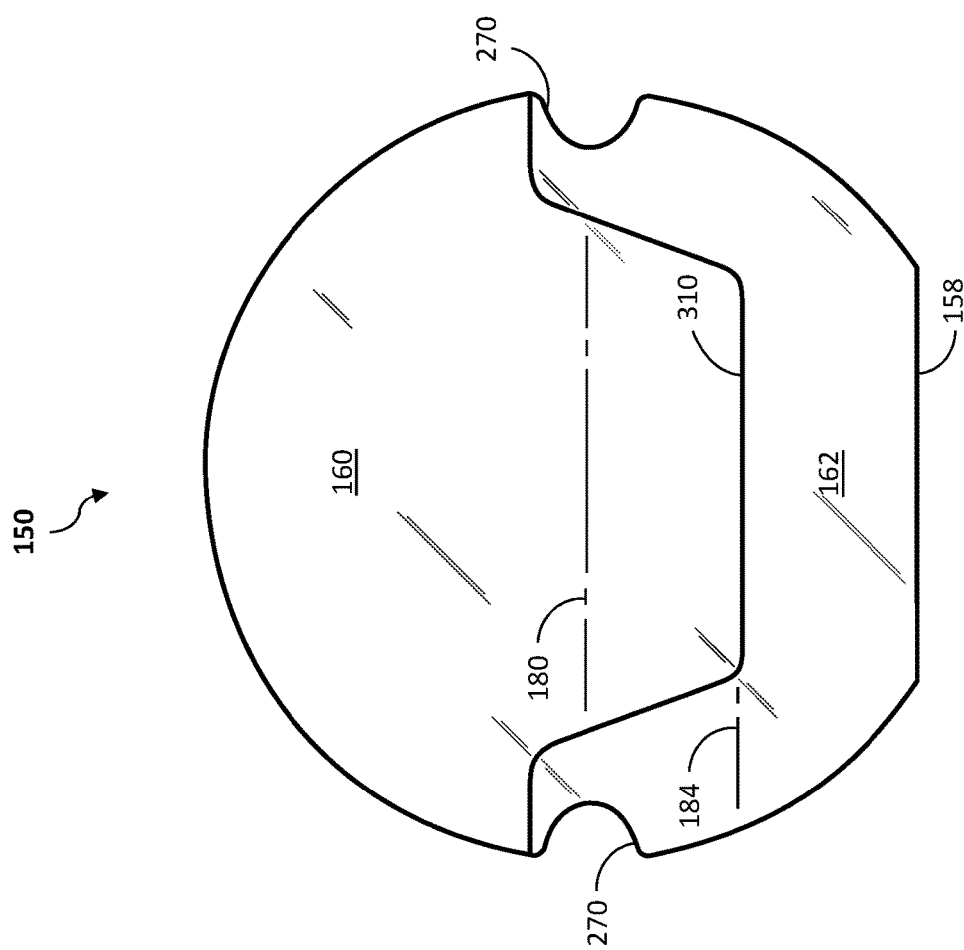
FIGS. 20A through 20C are top plan views illustrating example multi-piece lids.

As illustrated in FIG. 20A, lid 150 can include a front lid portion 160 hingedly connected to a rear lid portion 162 by hinged connection 310. Hinged connection 310 can lie on a second axis 184 that is substantially parallel to a first axis 180 and lies between the first axis 180 and a flat back 158. As illustrated in FIG. 20A, hinged connection 310 may not span the entire width of lid 150. As further illustrated in FIG. 20A, rear lid portion 162 can include bail mount cutouts 270. Bail mount cutouts 270 illustrated in FIG. 20A can accommodate bail mounts 104 disposed upwardly or laterally from or near a rim channel 102.

Figure 20B:
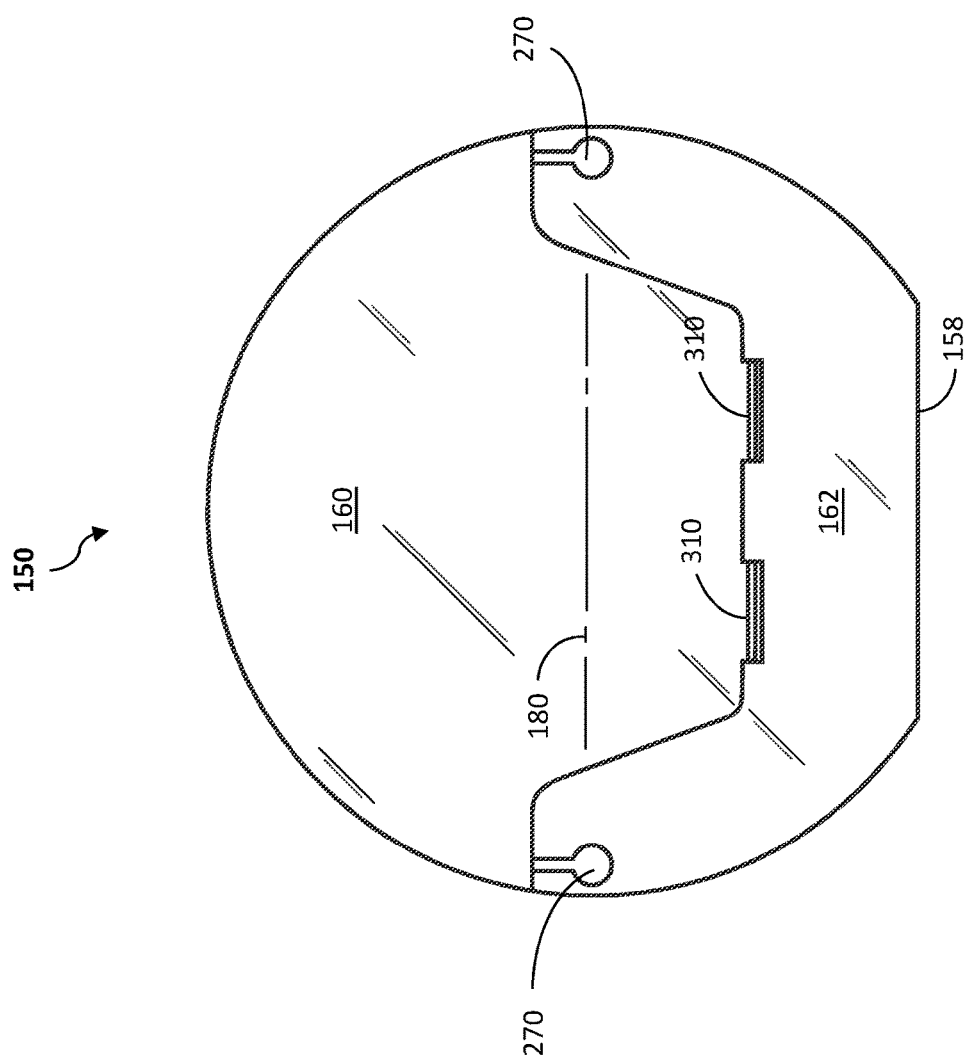
Figure 20D:
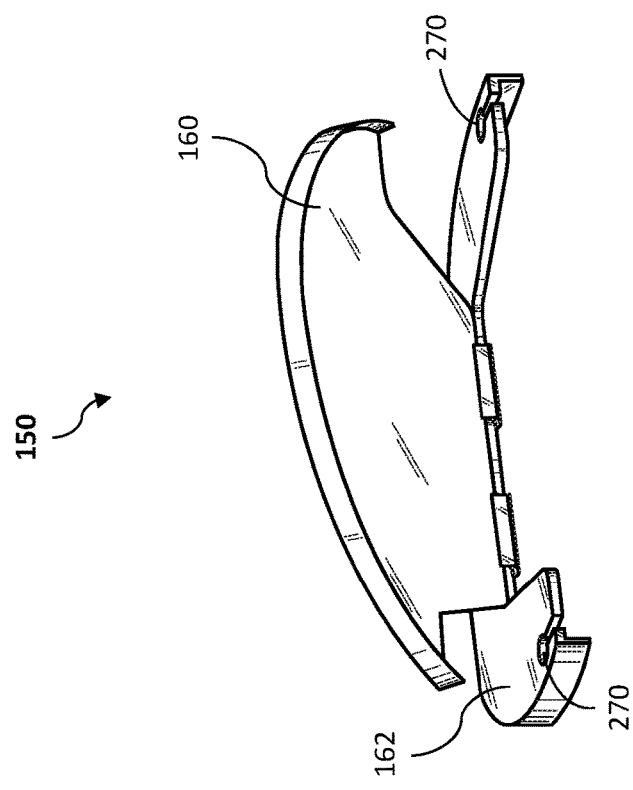
Figure 20C:
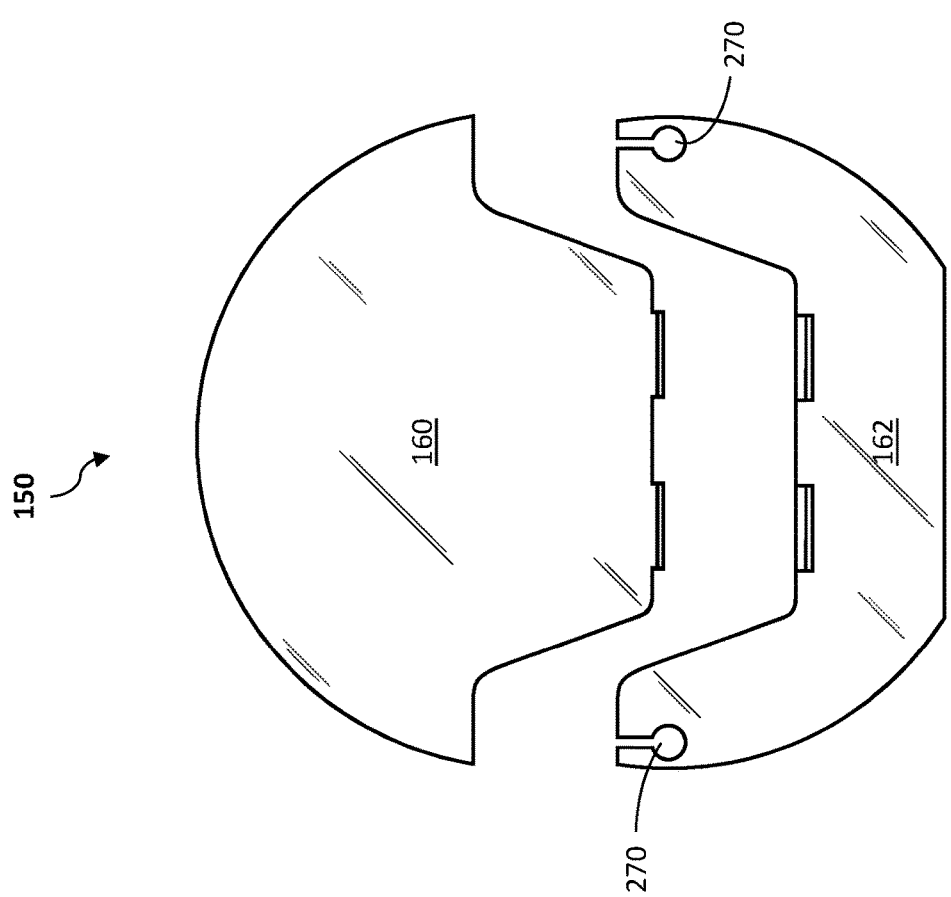

FIG. 20B illustrates an example of lid 150 from FIG. 20A with bail mount cutouts 270 oriented differently. As illustrated in FIG. 20B, rear lid portion 162 can include bail mount cutouts 270 oriented perpendicular to the first axis 180. As illustrated in FIG. 20C, lid 150 can be placed onto a bucket 100 (not shown) by sliding the rear lid portion 162 onto the bucket 100 so that bail mount cutouts 270 receive the bail mounts of bucket 100. Front lid portion 160 can be connected to rear lid portion 162 thereafter. Alternatively, as illustrated in FIG. 20D, lid 150 can be placed onto a bucket 100 (not shown), with front lid portion 160 hingedly connected to rear lid portion 162 and in a raised position, by sliding the rear lid portion 162 onto the bucket 100 so that bail mount cutouts 270 receive the bail mounts of bucket 100. Bail mount cutouts 270 illustrated in FIGS. 20B, 20C, and 20D can accommodate bail mounts 104 disposed upwardly from a rim channel 102.

FIGS. 20E, 20F, and 20G illustrate an example of lid 150 from FIG. 20A with bail mount cutouts 270 oriented differently. As illustrated, rear lid portion 162 can include bail mount cutouts 270 in an outer lip 172 of the rear portion 162. Bail mount cutouts 270 illustrated in FIGS. 20E, 20F, and 20G can accommodate bail mounts 104 disposed laterally from or near a rim channel 102. Thus, lid 150 illustrated in FIGS. 20E, 20F, and 20G can be placed onto a bucket 100 (not shown) so that cutouts 270 receive the laterally-disposed bail mounts 104 of bucket 100.

As illustrated in each of FIGS. 20A through 20G, front lid portion 160 may pivot with respect to rear lid portion 162 so that a portion of lid 150 may be opened while remaining attached to a bucket 100. This may be particularly useful, for example, to allow a horse to drink or feed from a flat back bucket with front lid portion 160 opened, after which lid 150 may be closed and sealed on bucket 100 without having to reattach the lid.

Figure 21A:
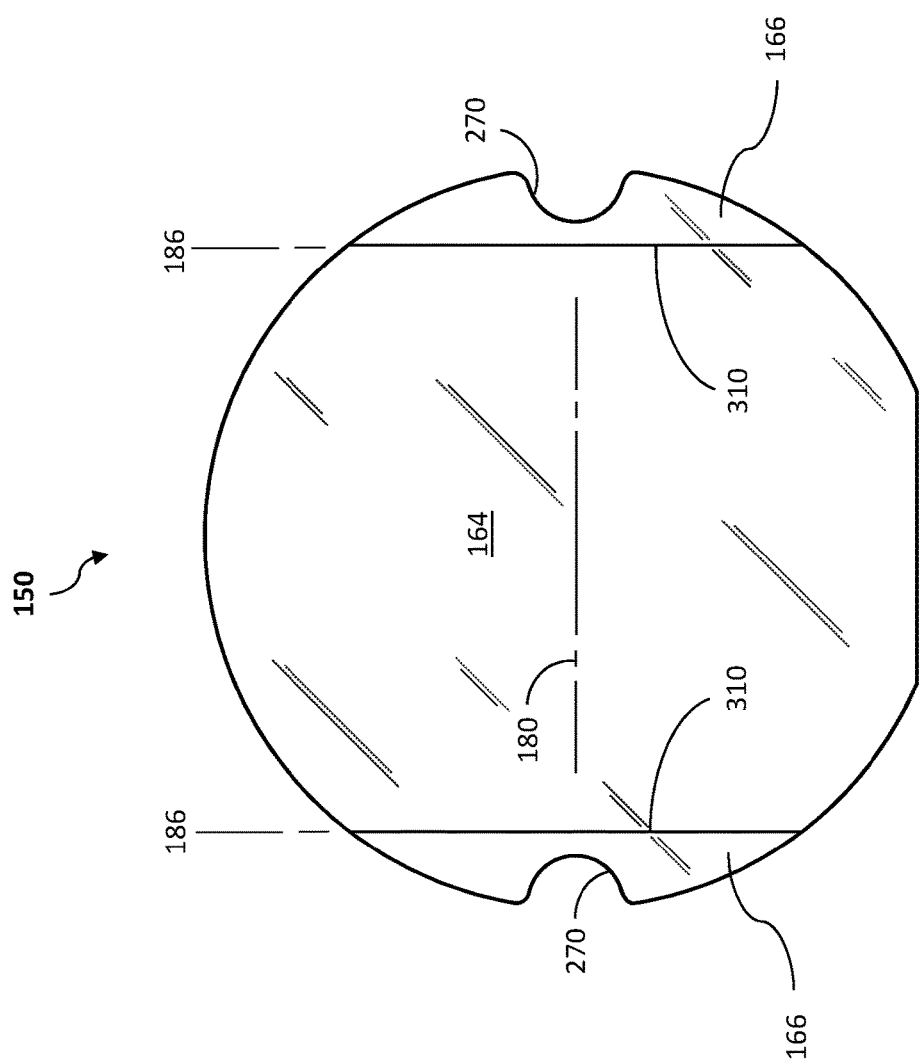
FIGS. 21A through 21C are top plan views illustrating example multi-piece lids.

As illustrated in FIG. 21A, lid 150 can include side lid portions 166 hingedly connected to a center lid portion 164 by hinged connections 310 to allow the side lid portions 166 to pivot with respect to the center lid portion 164. FIG. 21A illustrates a first axis 180 that approximately coincides with cutouts 270. Hinged connections 310 can lie on second axes 186 that are substantially perpendicular to the first axis 180.

Side lid portions 166 can include bail mount cutouts 270. As illustrated in FIG. 21A, hinged connections 310 can span the entire length of lid 150. Although two side lid portions 166 are illustrated as hingedly connected to center lid portion 164, lid 150 can include only one side lid portion 166 (e.g., left side or right side) that is hingedly connected to center lid portion 164.

Figure 21C:
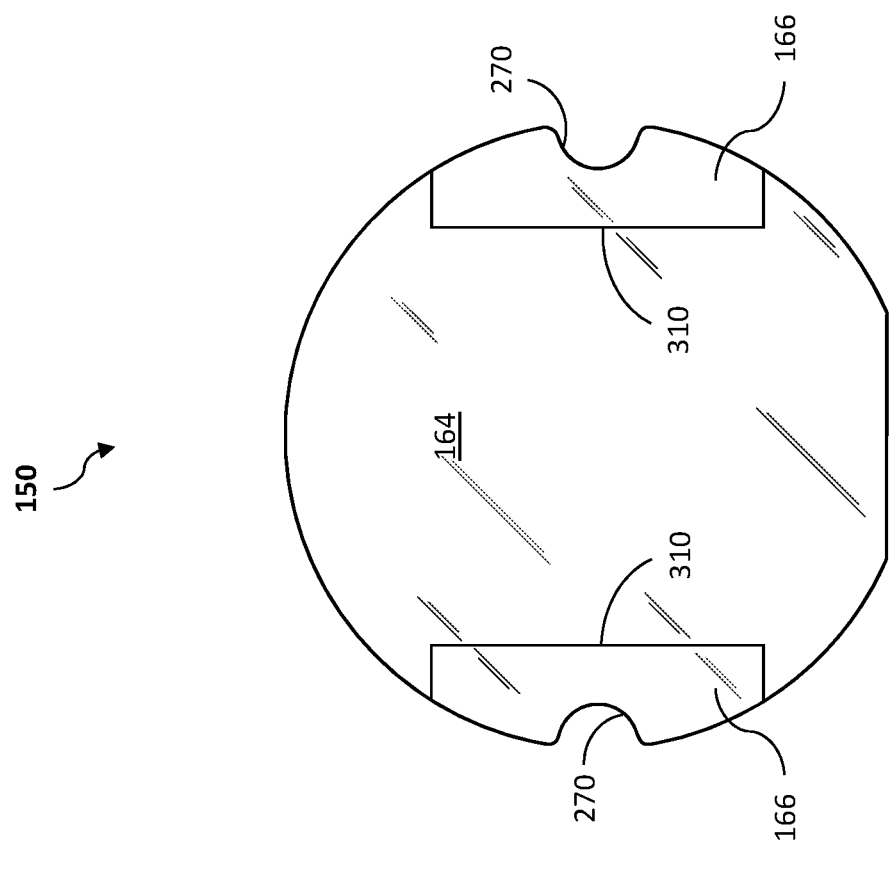
Figure 21B:
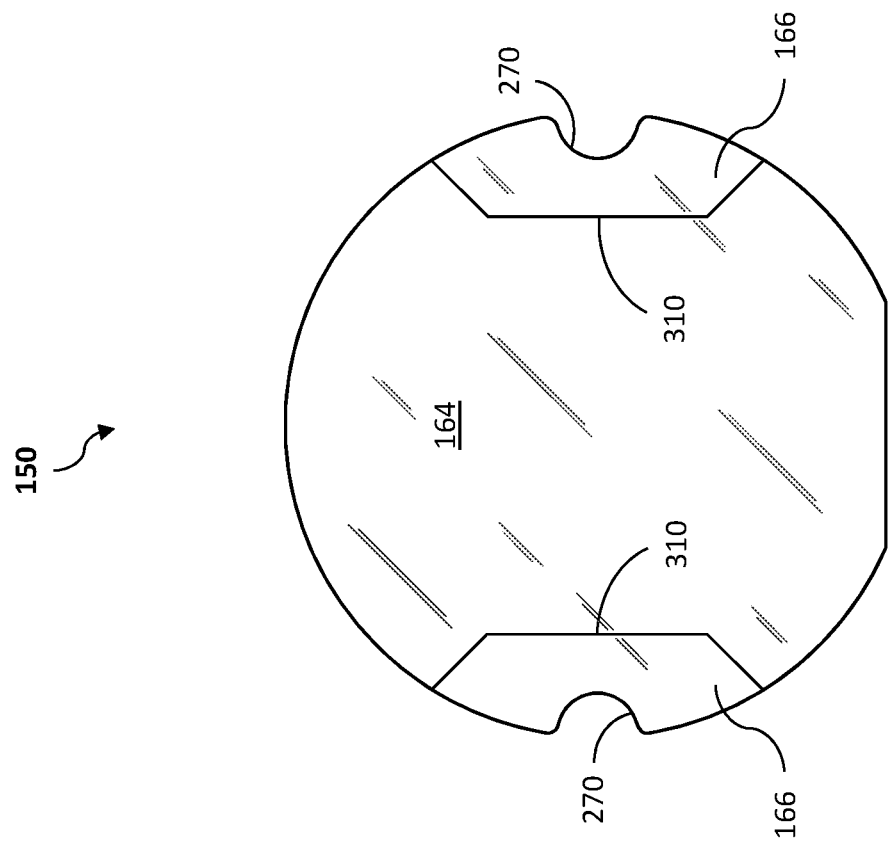

FIGS. 21B and 22C illustrate the hinged connections of lid 150 from FIG. 21A spanning less than the entire length of lid 150. As illustrated, side lid portions 166 can comprise different shapes. In particular, FIG. 21B illustrates side lid portions 166 having a trapezoidal shape, while FIG. 21C illustrates side lid portions 166 having a rectangular shape. It will be appreciated by those of ordinary skill in the art that the shapes illustrated in FIGS. 21A, 21B, and 21C are for example only and not limitation. Other shapes of side lid portions 166 are possible and contemplated herein. Additionally, although bail mount cutouts 270 are illustrated as semicircular on the top surface of lid 150 in FIGS. 21A, 21B, and 21C, other shapes and configurations for cutouts 270 are possible, including those previously described and illustrated.

Figure 22:
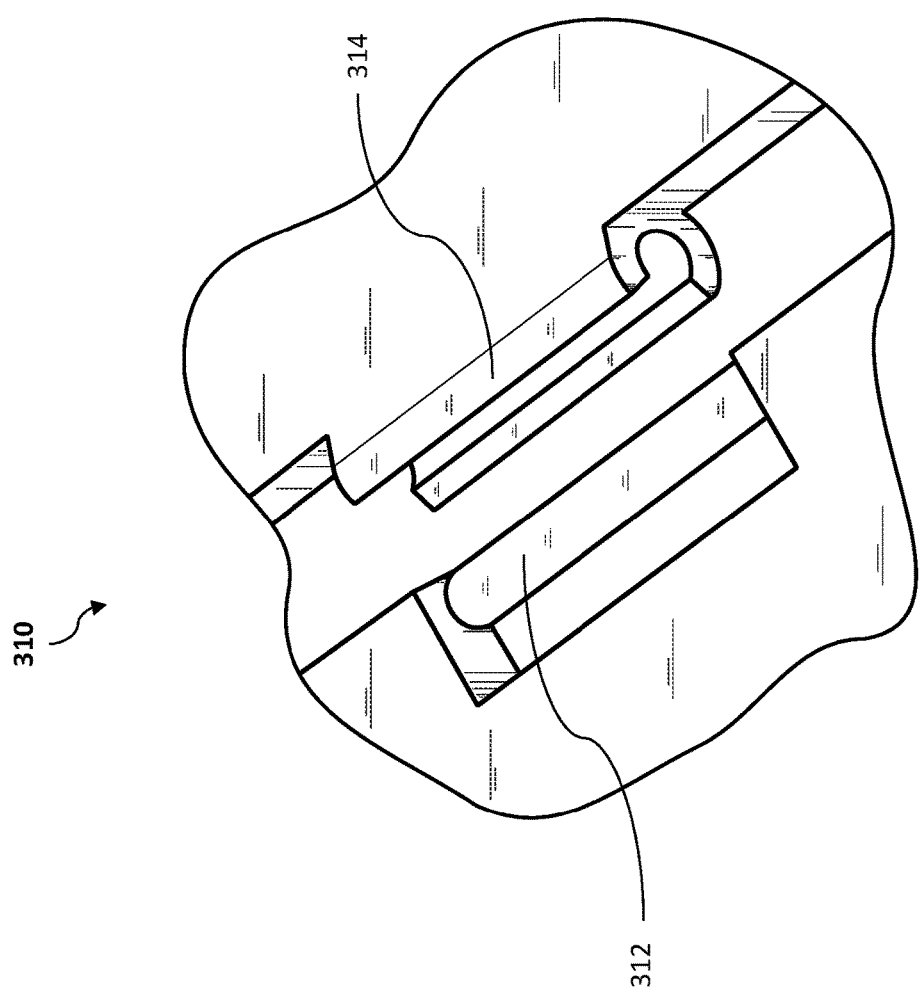
FIG. 22 is a perspective view illustrating an example hinge connection.

As explained in connection with each of FIGS. 19A through 21C, lid portions may be hingedly connected with one or more hinged connections 310. It will be appreciated by those of ordinary skill in the art that, in each case, hinged connections 310 can be any type of hinge or pivoting mechanism that allows the lid portions to pivot with respect to one another, including for example, a living hinge or a mechanical hinge, as well as other types of hinges familiar in the art. Furthermore, hinged connections 310, in each case, can include one or more hinges or pivoting mechanisms. One preferred type of hinge is illustrated in FIG. 22. As illustrated, hinged connection 310 can comprise a rod section 312 on one lid portion and one or more mating open claw sections 314 on the other hingedly connected lid portion. The claw section 314 is removable from the rod section 312 such that the lid portions can be separated and removed, then later snapped back together.

Optionally, the lid portions illustrated as hingedly connected in FIGS. 19A through 21C can be separate parts and removably coupled to one another in one of several ways familiar to those of ordinary skill in the art, including, for example, with the locking walls described and illustrated in connection with FIGS. 16A and 16B. As one example of this, lid 150 illustrated in FIG. 16A with removable side portion 280 is similar to lid 150 illustrated in FIG. 21A with pivoting side portions 166, the difference being primarily whether side portions 166 are hingedly connected (FIG. 21A) or removably coupled (FIG. 16A) to center lid portion 164.

Filler for Bail Mount Cutouts.

Lid 150 can include one of a variety of materials to fill bail mount cutouts 270 when bail mounts 104 are disposed therein such that lid 150 forms a substantially closed seal with a bucket 100 when attached. This can help keep insects, rodents, dirt and other debris from entering the bucket, which can prove particularly useful when the bucket contains water or feed. Examples of such materials can include, without limitation, plastic, rubber, foam, bristles, and gel-based materials.

For example, FIGS. 23A and 23B illustrate cutout filler 320 suitable for filling a cutout 270 having a semicircular shape. Cutout filler 320 can include slots 322 to accommodate bail mounts 104 (not shown) of a bucket 100 (not shown). Cutout filler 320 may be, for example, a rubber grommet.

Figure 24B:
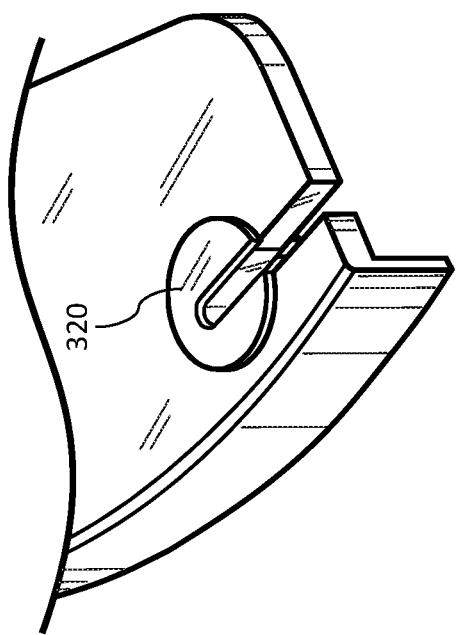
Figure 24A:
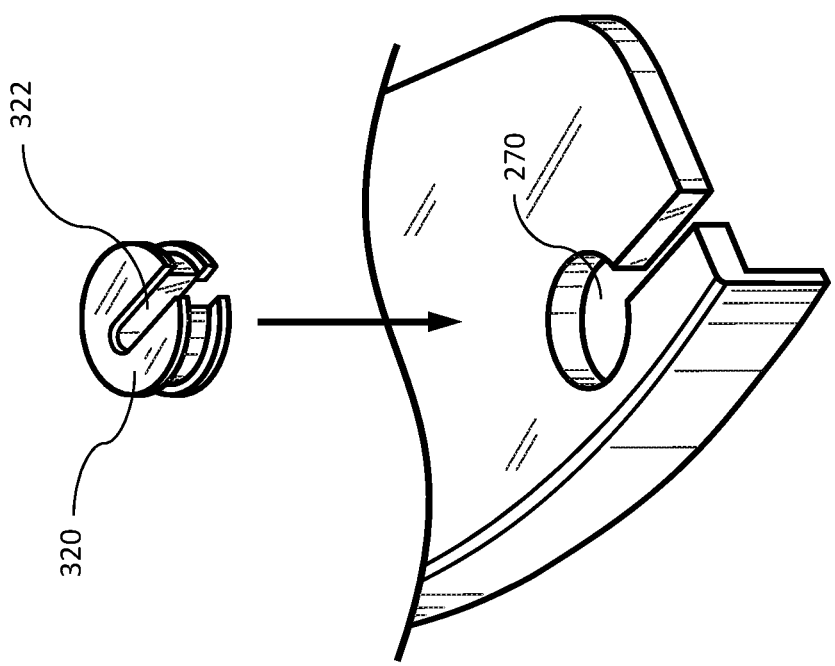

As another example, FIGS. 24A and 24B illustrate cutout filler 320 suitable for filling a cutout 270 having a circular shape, such as illustrated in FIGS. 17A, 20B, 20C, and 20D. As illustrated in FIGS. 24A and 24B, cutout filler 320 can include a slot 322 to accommodate bail mounts 104 (not shown) of a bucket 100 (not shown). Cutout filler 320 may be, for example, a rubber grommet sized to fit snuggly into bail mount cutout 270. It will be appreciated by those of ordinary skill in the art that other shapes and configurations for cutout filler 320 are possible, including, for example, rubber grommets sized to fit snuggly into any bail mount cutout, including the cutouts previously described and illustrated herein.

Lid Materials.

Lid 150 can be made of any material familiar to those of ordinary skill in the art, including, for example, polypropylene (PP), high-density polyethylene (HDPE), plastic, rubber, metal, and any combination thereof. Lid 150 is preferably made of a food grade material.

EXAMPLE EMBODIMENTS

Those of ordinary skill in the art will appreciate that the features described above may be combined in various ways. The following embodiments provide examples of such combinations, which should not be construed as limiting how the features may be combined, but rather as examples of how the features may be combined. That is, additional features not specifically illustrated or described in the following embodiments may nevertheless still be combined with such embodiments consistent with disclosure. Furthermore, other embodiments based on combinations of the aforementioned features are also possible, even if not specifically described or illustrated below.

Figure 25:
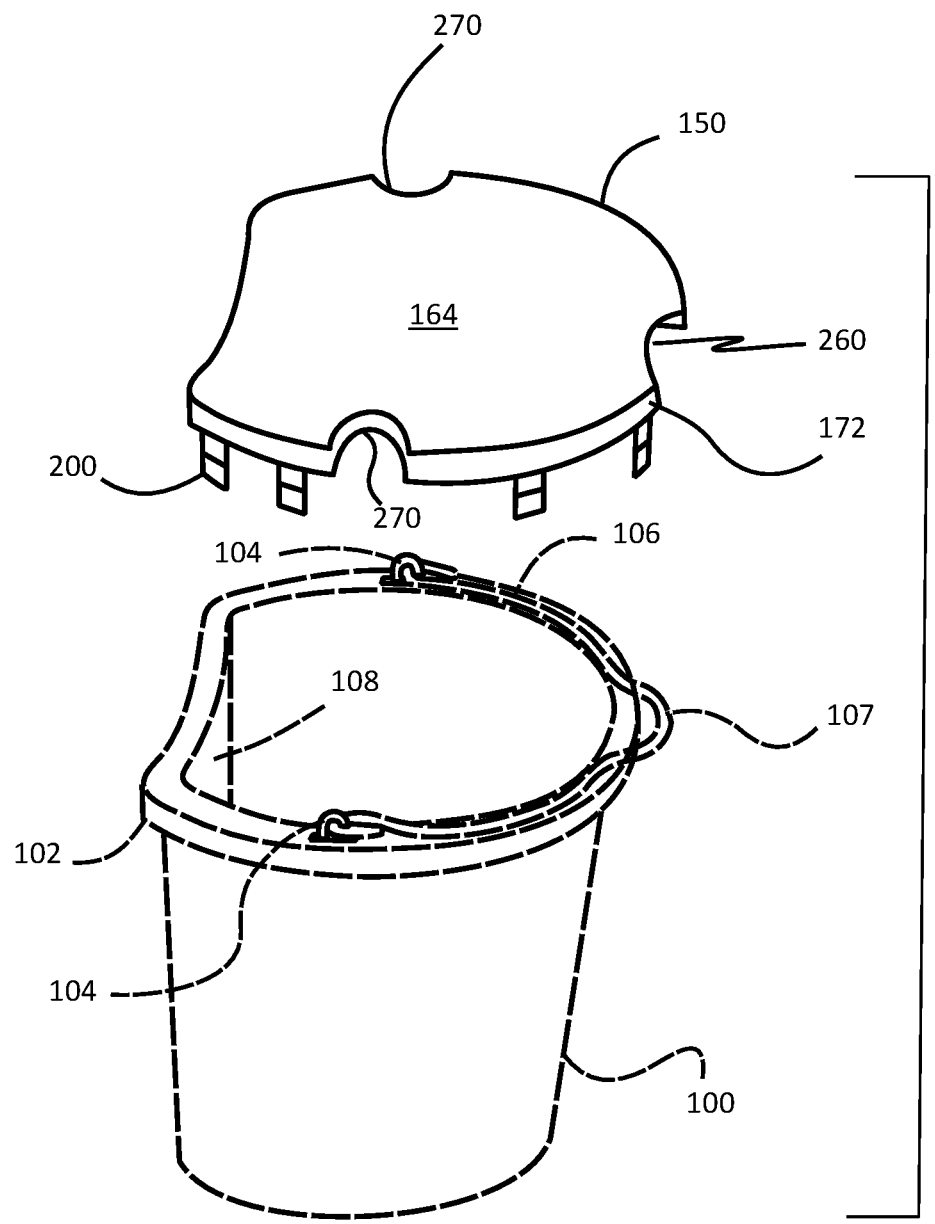
FIG. 25 is a perspective view illustrating a bucket lid and a flat back bucket according to a first embodiment.

One embodiment of a lid 150 is illustrated in FIGS. 25-29. FIG. 25 is an exploded perspective view of a bucket lid 150 over a conventional flat back bucket 100. The bucket includes a flat back 108, rim channel 102, a bail 106, and plural bail mounts 104 that are secured to the rim channel 102. The bail has a hook 107.

Figure 26:
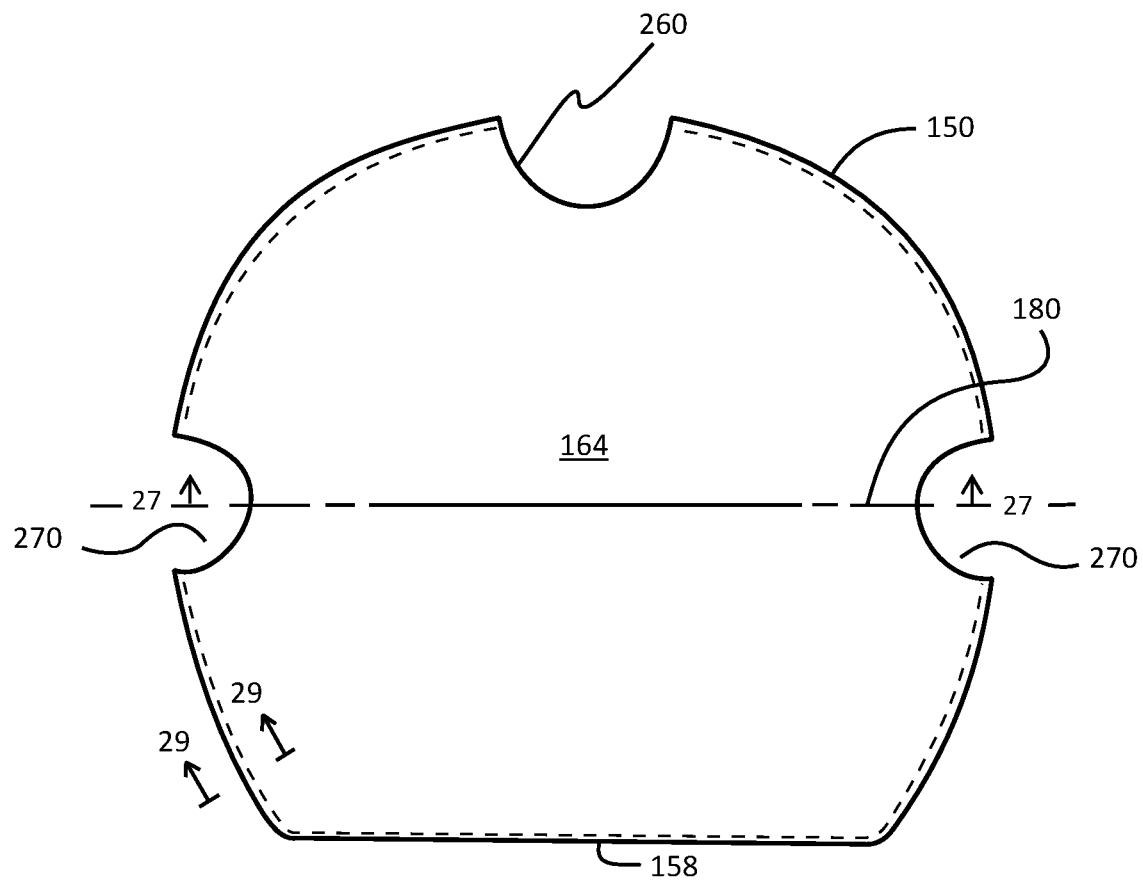
FIG. 26 is a top plan view of the lid of FIG. 25.
Figure 27:
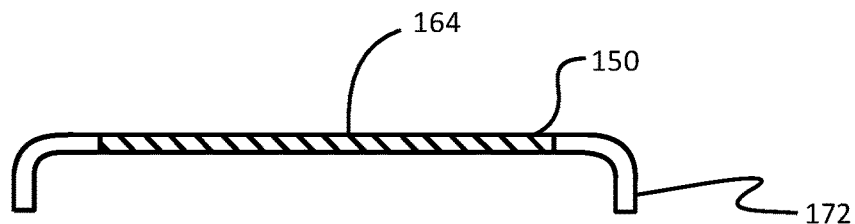
FIG. 27 is a cross-sectional view of the lid of FIG. 25 taken along line 27-27 of FIG. 26.

As shown in FIGS. 25-27, the lid 150 comprises a center portion 164, overhanging lip 172, a pair of side cutouts 270, at least one, preferably two or more locking tabs or clips 200 and an optional bail hook cutout 260. The lid has a flat back 158 that matches the flat back 108 of the bucket. The lid center portion 164 can be flat as shown or can include a recess that is sized and configured to receive the bottom of another bucket. The two side cutouts 270 are opposite each other and aligned with each other on an axis 180 that is substantially parallel to the flat back 158. The lid is dimensioned and configured to fit securely over the top of the bucket. As shown in FIGS. 25-28, a peripheral margin of the bottom surface of the lid 150 engages the top of the bucket rim channel 102, and the lip 172 extends downwardly exterior of the rim channel. Further, because many manufacturers of flat back buckets produce buckets in substantially standard sizes, the lid of the invention is preferably dimensioned and configured as a universal lid that can be used with multiple brands of flat back buckets.

The lid 150 is secured to the rim channel 102 of the bucket by tabs or clips 200 that may be integral with and extend downwardly from lip 172 of the lid, and are configured to engage the bottom 101 of the bucket rim channel. The optional front cutout 260 in the lid provides room to easily grasp the bail hook 107.

The lid is preferably molded from a substantially rigid, durable plastic or plastic-rubber blend, most preferably from the same material as the bucket. The lid material is preferably a food grade material.

Figure 28A:
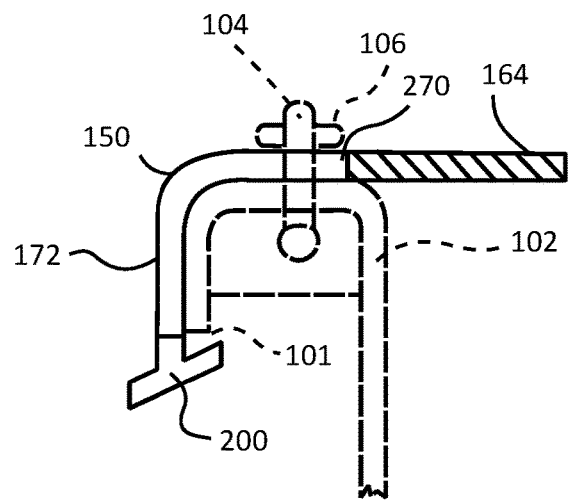
FIG. 28A is a cross-sectional view of the lid of FIG. 25 at an opening in a peripheral margin of the bucket lid.

FIG. 28A is a detailed cross sectional view of one side of the lid taken along the same line as FIG. 27. The bucket rim channel 102, bail 106 and bail mount 104 are shown in dashed lines. As illustrated, the cutout 270 provides sufficient space to avoid interference of the lid with bail 106 or bail mount 104. However, the lid center portion 164 extends outwardly a sufficient distance so that the bottom surface of the lid engages the top inside portion of the rim channel 102 to provide an effective seal with the rim channel.

Figure 28B:
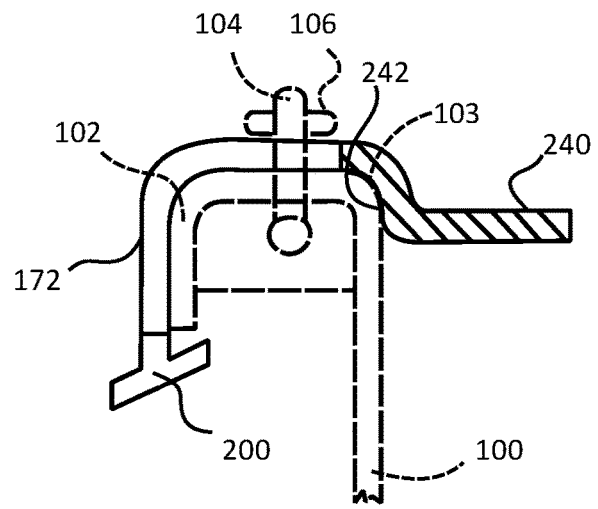
FIG. 28B is a cross-sectional view of an alternative (second) embodiment of the lid of FIG. 28A.

FIG. 28B is an alternate embodiment of the lid in FIG. 28A wherein the center portion 164 of the lid is recessed inwardly. This performs a dual function, namely to provide a nesting recess 240 for the bottom of another bucket (not shown) to facilitate stacking of two or more buckets; and to provide an enhanced seal with the rim channel. More specifically, an outer bottom surface 242 of the recessed portion 240 is dimensioned and configured to fit snugly into an inner surface 103 of the rim channel 102 to provide at least a partial seal.

Figure 29:
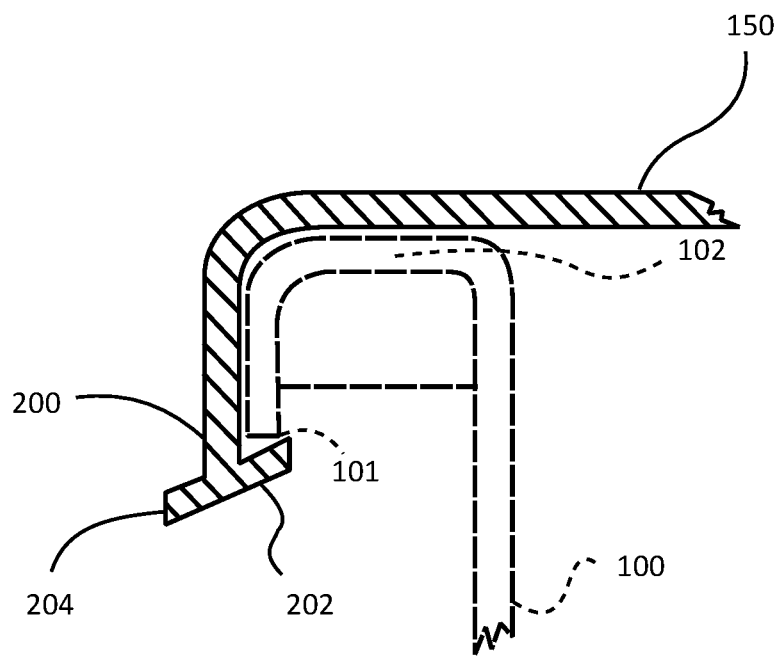
FIG. 29 is a cross-sectional view of the lid of FIG. 25 and locking tab taken along line 29-29 of FIG. 26.

FIG. 29 is a detailed cross-sectional view through a locking tab 200 taken along line 29-29 of FIG. 26. The tab 200 extends from the overhanging lip 172, and includes a clip 202 to releasably engage the bottom 101 of the bucket rim channel 102 and thumb grip 204 to release the tab. The lid may contain any number of tabs, preferably two on opposite sides of the lid. The illustrated tab 200 is only one embodiment of a locking tab. Other tab configurations can be used in lieu of the illustrated embodiment, as will be well known and apparent to those skilled in the art, including, for example, the locking tab described in connection with FIGS. 3A through 3E.

Figure 30:
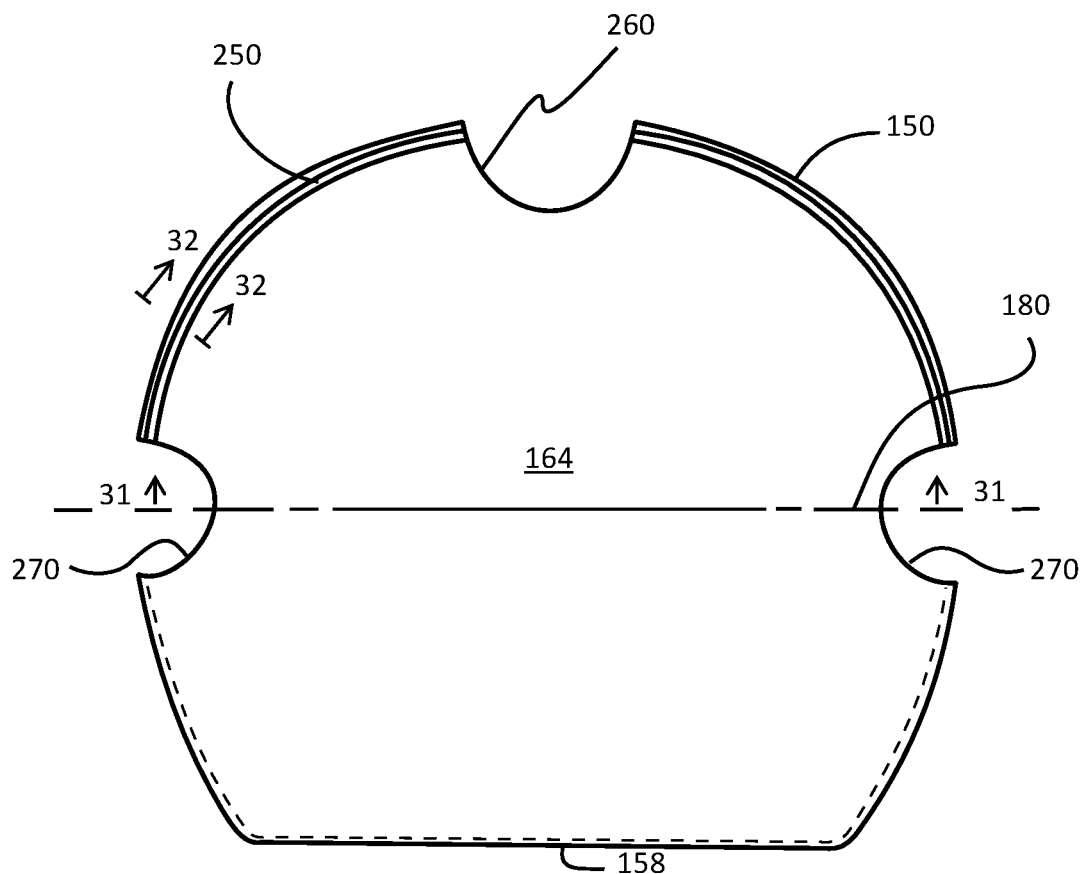
FIG. 30 is a top plan view illustrating a lid according to a third embodiment.
Figure 31:
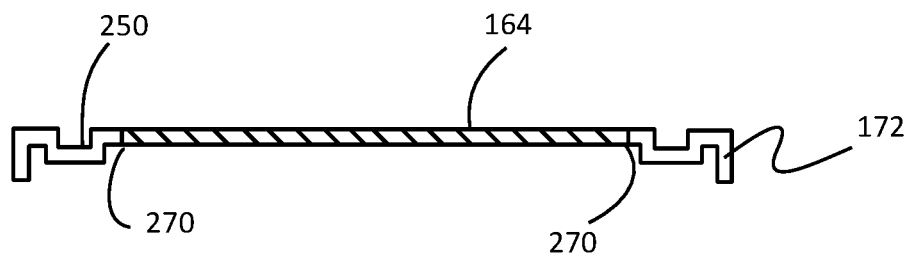
FIG. 31 is a cross-sectional view of the third embodiment taken along line 31-31 of FIG. 30.
Figure 32:
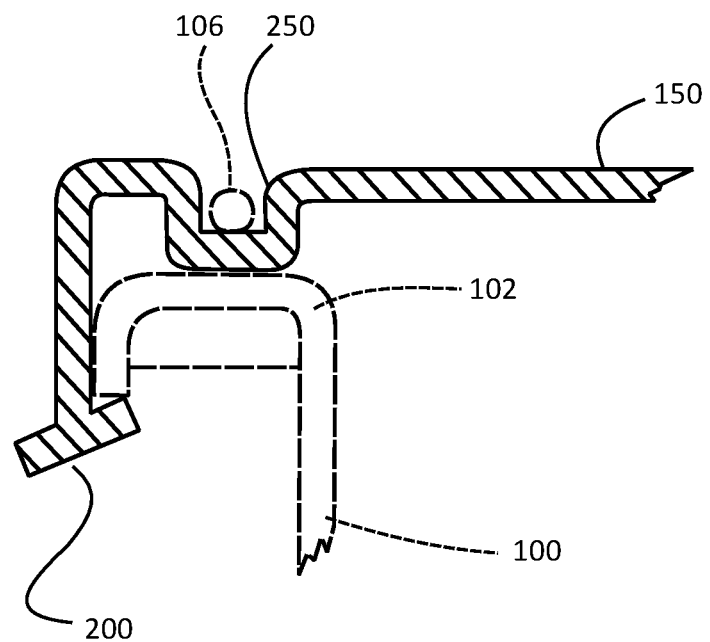
FIG. 32 is a cross-sectional view of the third embodiment and locking tab at a peripheral margin of the bucket lid taken along line 32-32 of FIG. 30.

Another embodiment of a lid 150 is illustrated in FIGS. 30-32. This embodiment differs from the previous embodiment in that it has a raised lid center portion 164 having a groove 250 for receiving the bail 106, whereby the top surface of the bucket is substantially flush. Like the previous embodiment, this embodiment has an overhanging lip 172, flat or concave back 158, a pair of side cutouts 270 opposite each other, and an optional front cutout 260 that can receive the bail hook 107. Side cutouts 270 are aligned with each other on an axis 180 parallel to flat back 158 of the lid. As in the previous embodiment, the lid is secured to the rim channel of the bucket by tabs 200 that extend from lip 172 of the lid, and are configured to engage the bottom 101 of the bucket rim channel 102. In FIG. 32, the bucket rim channel 102, and bail 106 are shown in dashed lines. A tab 200 extends downwardly from the overhanging lip 172 such that the lid can be secured by fastening the tab to the bottom 101 of the bucket rim channel 102.

Figure 33:
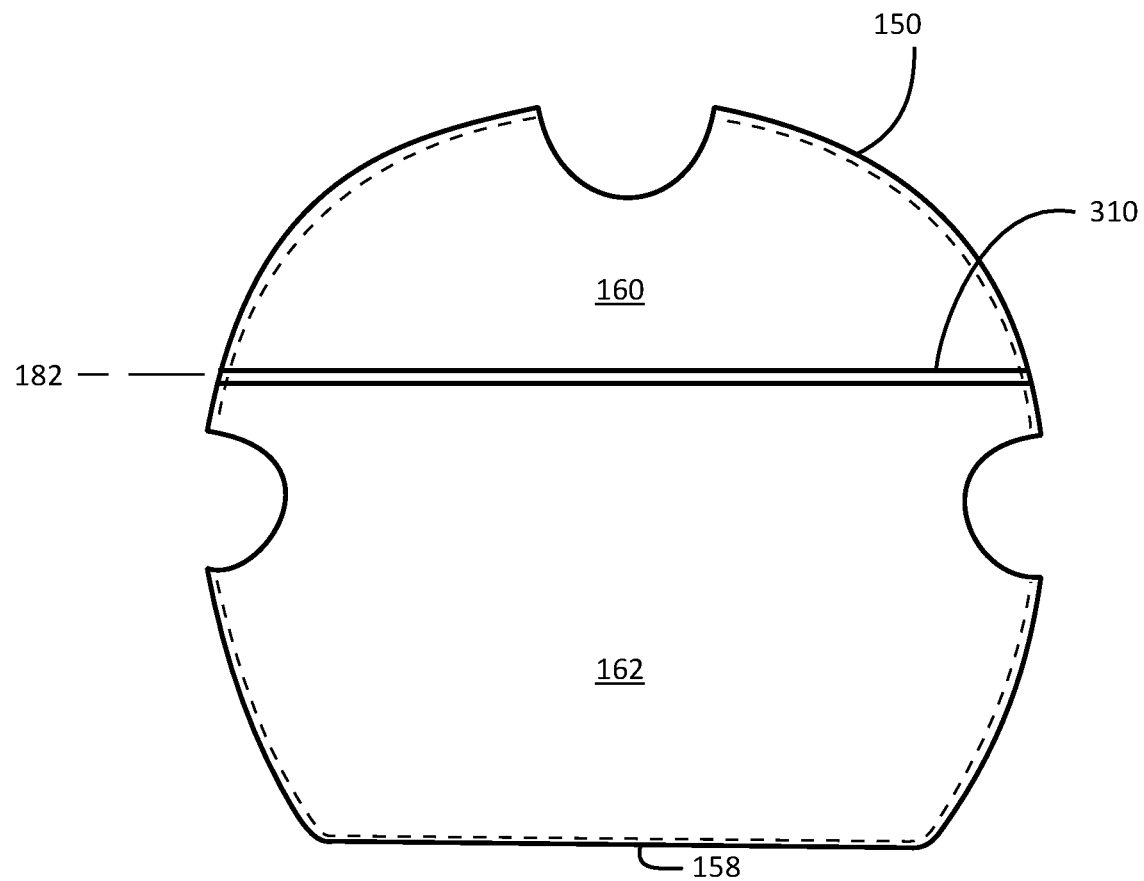
FIG. 33 is a top plan view illustrating a hinged lid according to a fourth embodiment.
Figure 34:
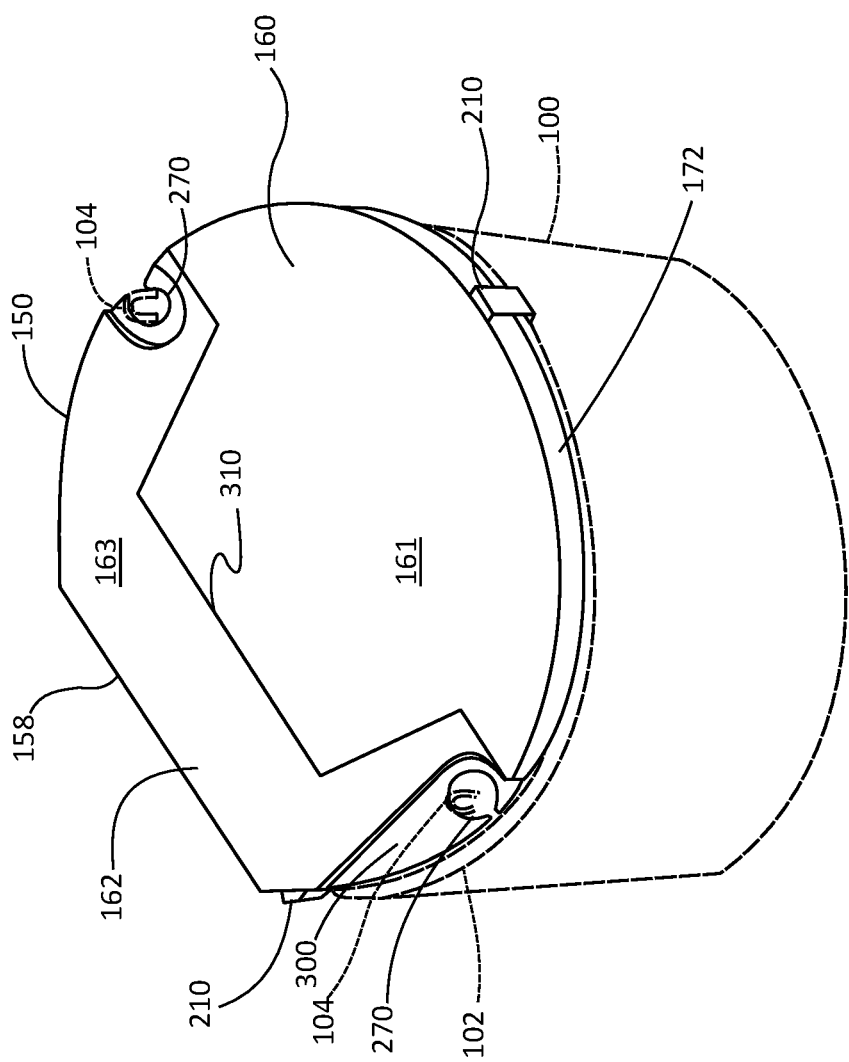
FIG. 34 is a perspective view illustrating a hinged lid according to a fifth embodiment.
Figure 35:
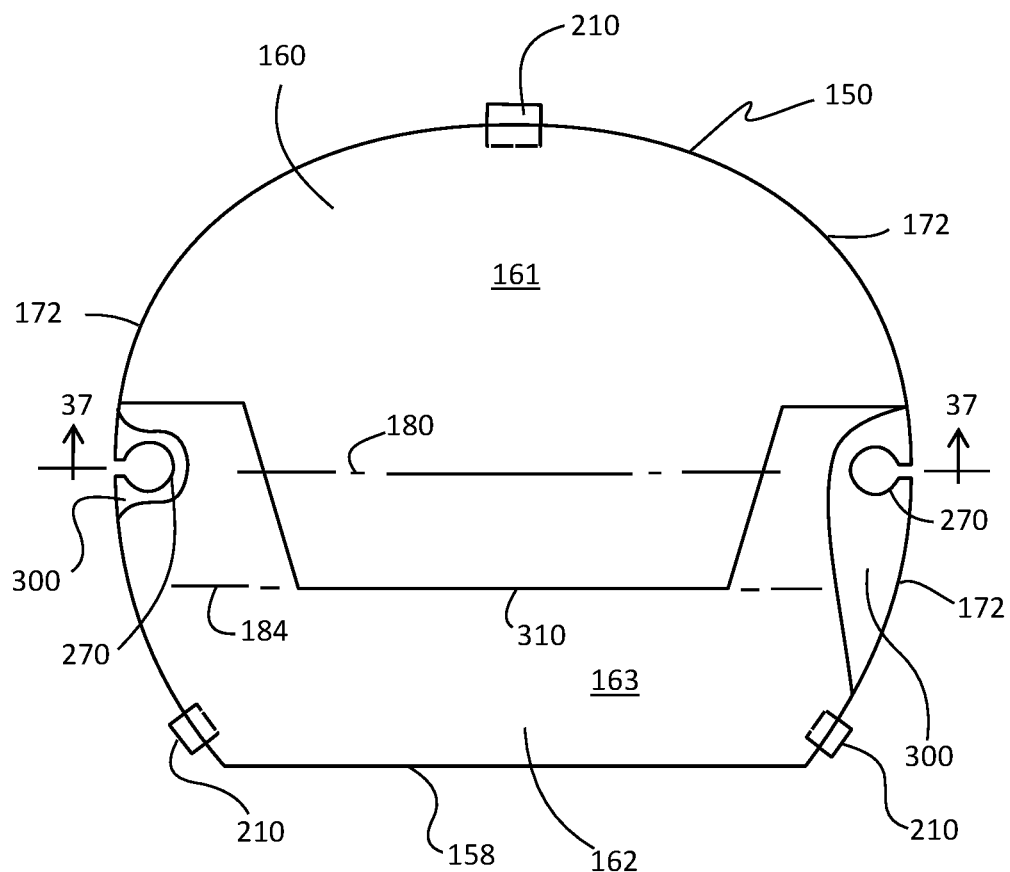
FIG. 35 is a top plan view of the fifth embodiment.

Another embodiment of a lid 150 is illustrated in FIG. 33. FIG. 33 is a top plan view of the bucket lid 150 in which the front portion of the lid 160 is attached to the rear portion 162 by a hinged connection 310 which allows the front portion to be lifted up independently of the rear portion. The hinged connection 310 lies on a second axis 182 that is substantially parallel to the flat back 158 of the lid.

Another embodiment of a lid 150 is illustrated in FIGS. 34-40. The lid 150 comprises a rear lid portion 162 with a top surface 163 and a bottom surface 173, a front lid portion 160 that is preferably hingedly connected to the rear lid portion 162 so that it can be pivoted between open and closed positions. The front lid portion 160 has a top surface 161 and a bottom surface 171. Lips 172 extend downwardly from both the front lid portion and rear lid portion and are configured to be exterior of bucket rim channel 102. Peripheral margins 170 of the bottom surfaces of the rear and front lid portions are configured to engage the rim channel 102 of the bucket 100 when the lid 150 is attached to the bucket. Plural cut outs or openings 270 in the peripheral margins of one of the lid portions, preferably the rear lid portion, are configured to receive, respectively, the plural bail mounts 104. The cutouts lie on an axis 180 that is substantially parallel to the flat back 158. The lid portions are preferably fabricated from substantially rigid plastic as described above. In a more preferred embodiment the rear lid portion includes one or more flex zones 300 that permit the rear lid portion to be flexed or bowed to facilitate placement of the rear lid portion over the bail mounts and onto the rim channel.

Preferably a hinged connection 310 connects the rear lid portion 162 and the front lid portion 160. The hinged connection is preferably located on a second axis 184 parallel to and between the first axis 180 and flat back 158. In this regard, the access opening when the front portion is raised may be greater. Preferably the rear lid portion is provided with flanges 169 to assist in supporting the front lid portion when in a closed position. A preferred hinge is described above in connection with FIG. 22.

Figure 36:
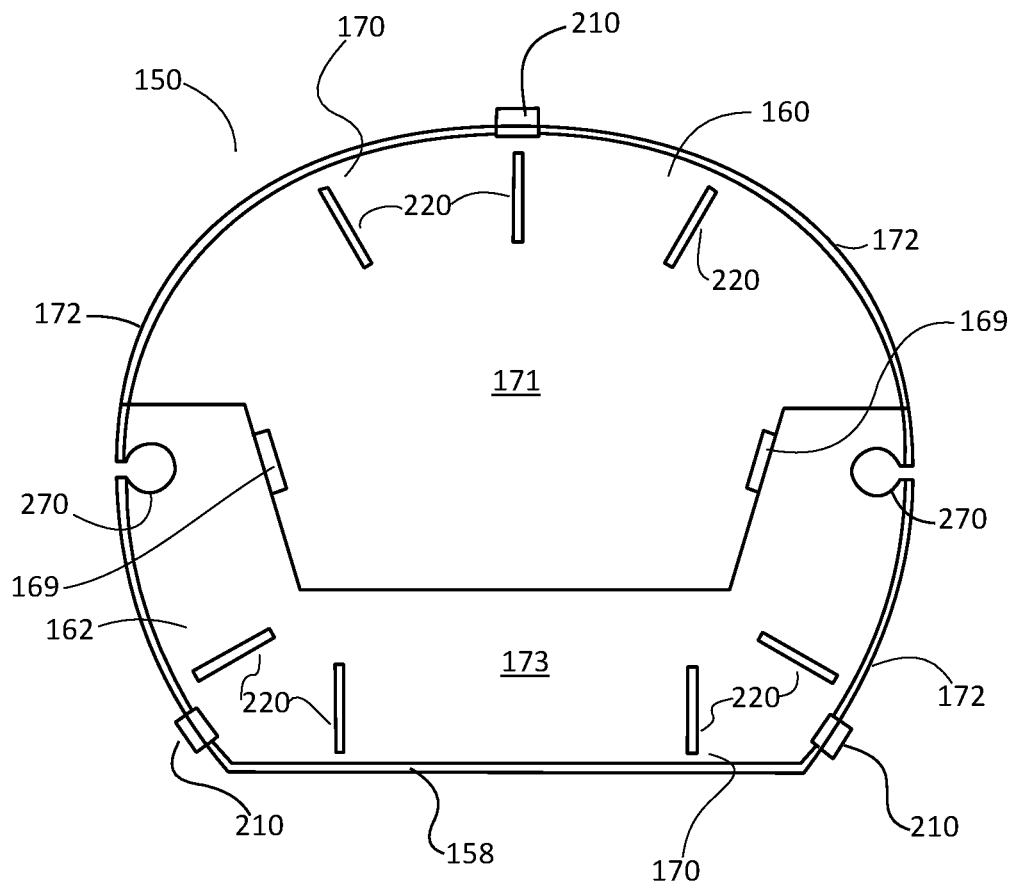
FIG. 36 is a bottom plan view of the fifth embodiment.
Figure 37:
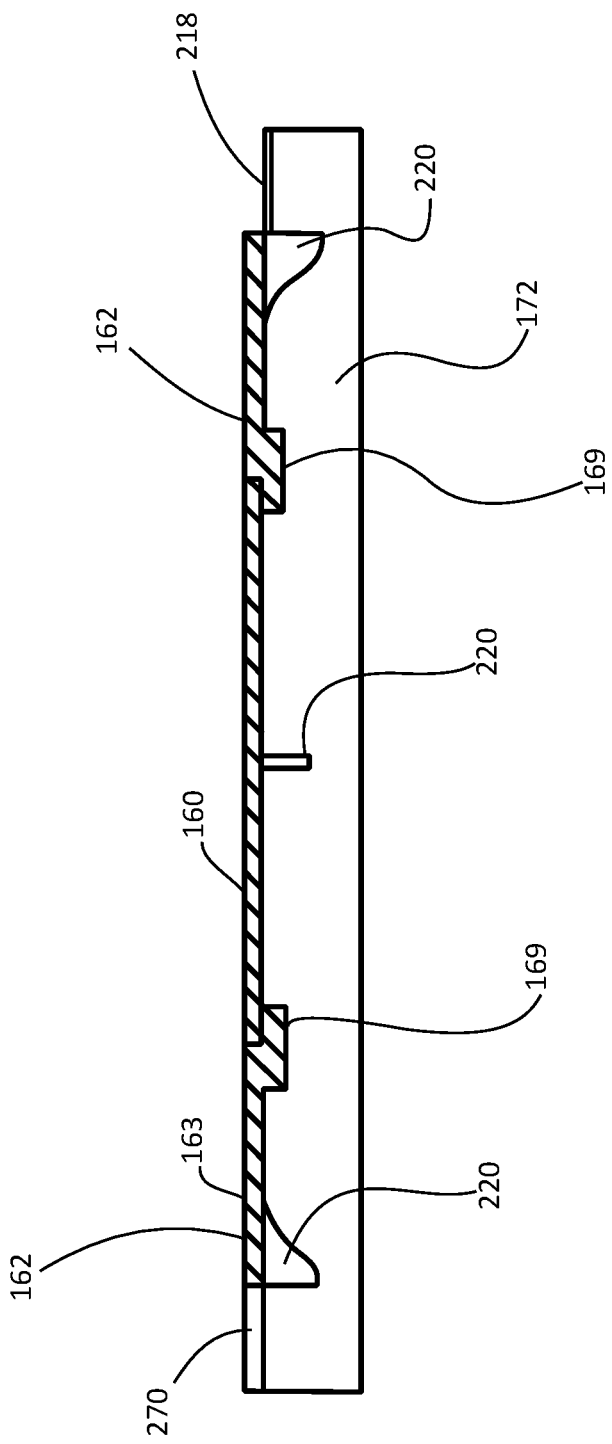
FIG. 37 is a cross-sectional view of the fifth embodiment taken along line 37-37 of FIG. 35.

As illustrated in FIGS. 36 and 37, a lip 172 extends downwardly from the rear lid portion and the front lid portion and is positioned to be exterior of and overhang the rim channel of the bucket. A plurality of ribs 220 extend downwardly from the bottom surface of the rear lid portion 173, and the bottom surface of the front lid portion 171. Ribs 220 are positioned relative to lips 172 to form a slot or gap for receiving the rim channel 102 of the bucket 100. One or more locking tabs or clips 210 are configured to secure the lid 150 to the rim channel of the bucket.

Figure 38:
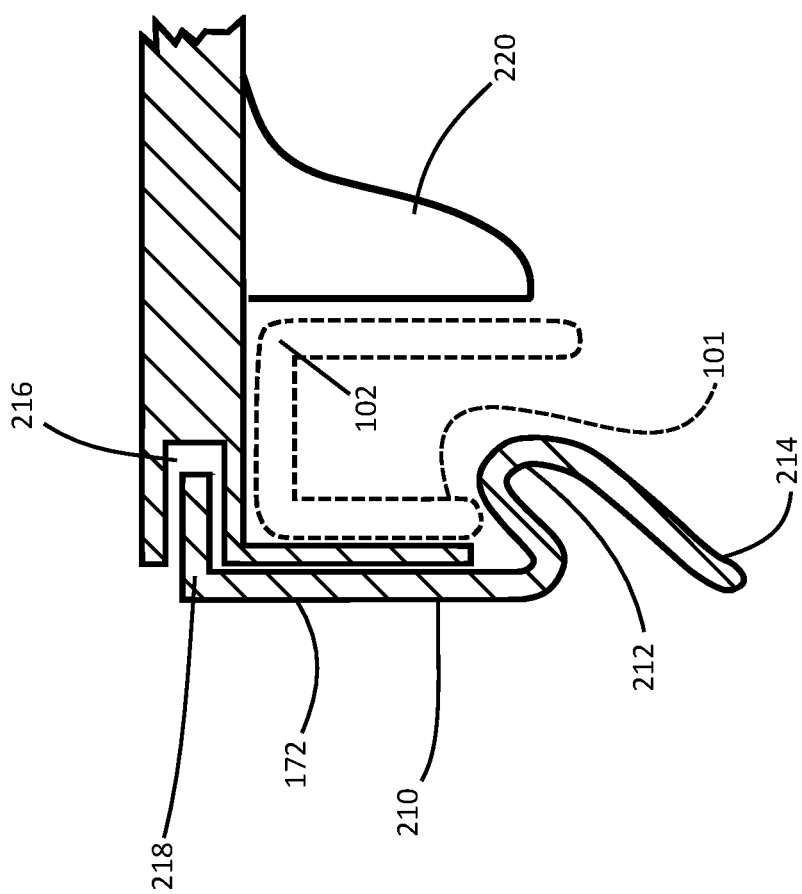
FIG. 38 is a cross-sectional view of the locking tab of the fifth embodiment.
Figure 40C:
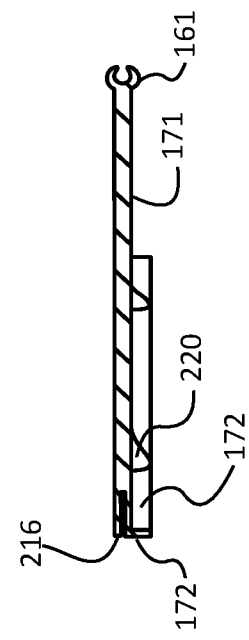
FIG. 40C is a cross-sectional view of the front lid portion of the fifth embodiment taken along line 40C-40C of FIG. 40A.
Figure 40A:
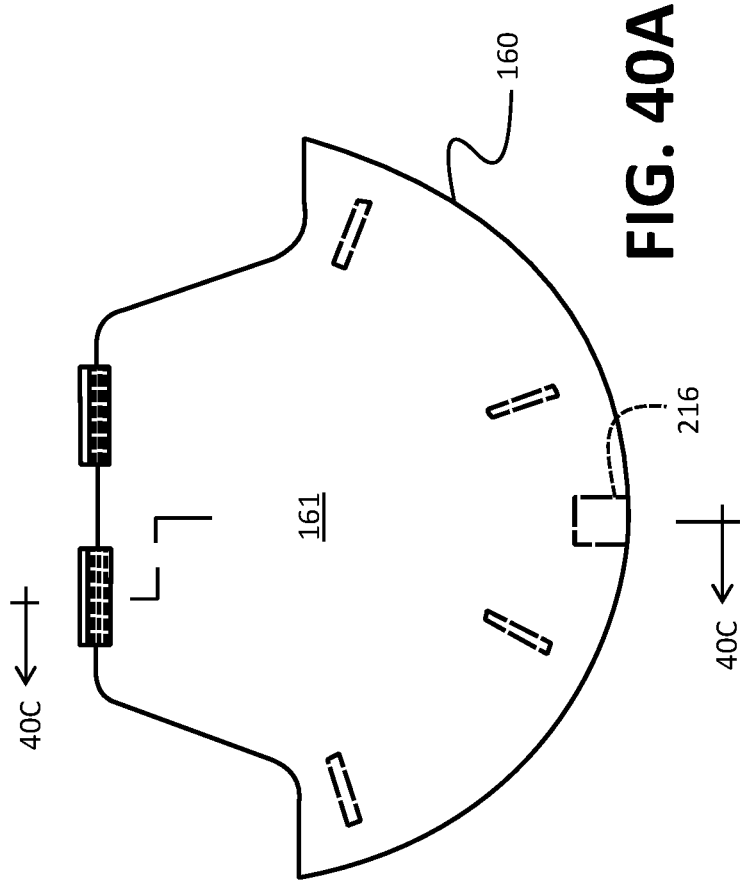
FIG. 40A is a plan view of the front lid portion of the fifth embodiment.
Figure 40B:
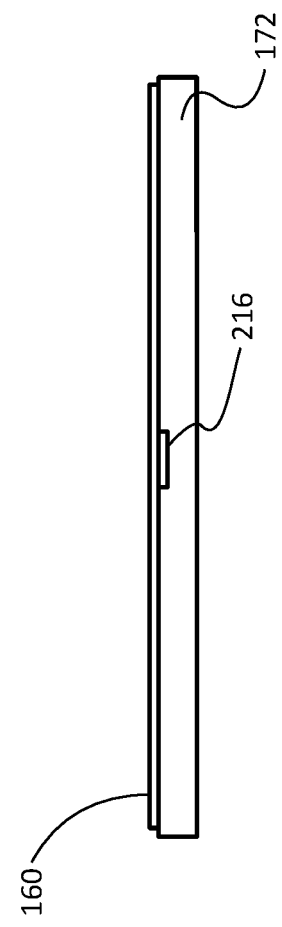
FIG. 40B is a front elevation view of the front lid portion of the fifth embodiment.

FIG. 38 is a cross-sectional view of a preferred embodiment of a removable locking tab 210. Tab 210 has a flat top portion 218 that is configured to be removably inserted into a receiving slot 216 in lid 150. A lower or clip portion 212 of the tabs is configured to engage the bottom 101 of the bucket rim channel. The clip includes a thumb grip 214 to release the clip.

FIGS. 39A through 40C are piece part drawings for the rear lid portion and front lid portion, respectively, of this embodiment.

Figure 41A:
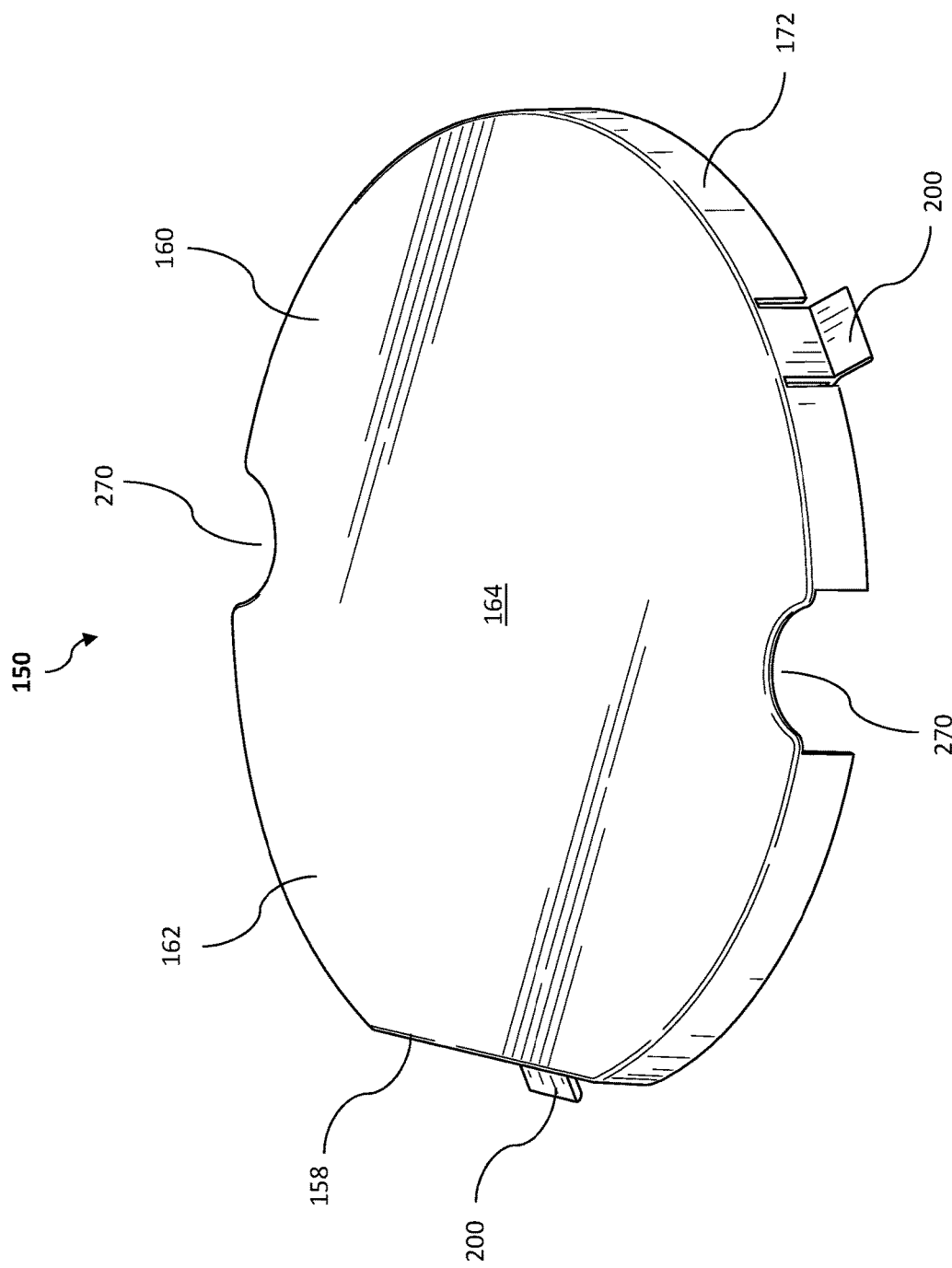
FIG. 41A is a left side perspective view illustrating a lid according to a sixth embodiment.
Figure 41B:
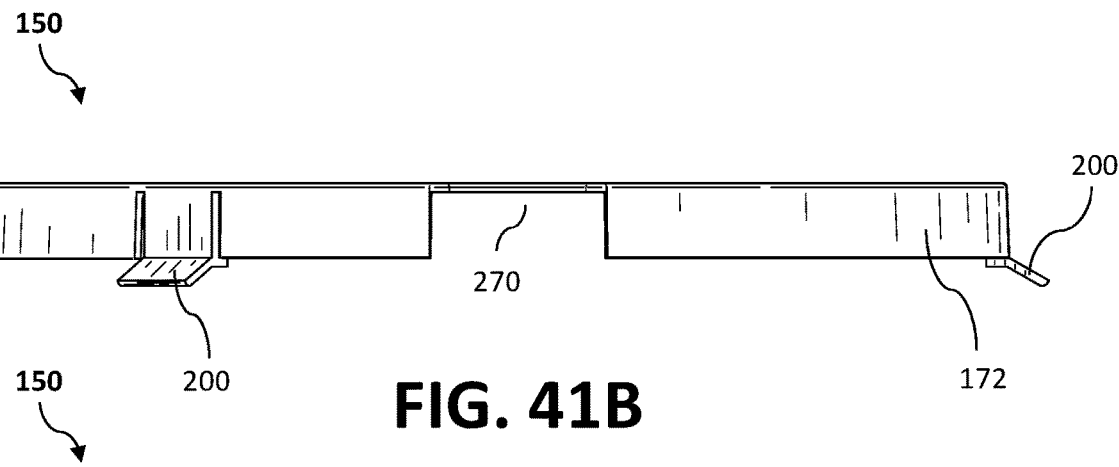
FIG. 41B is a right side elevation view of the sixth embodiment.
Figure 41C:
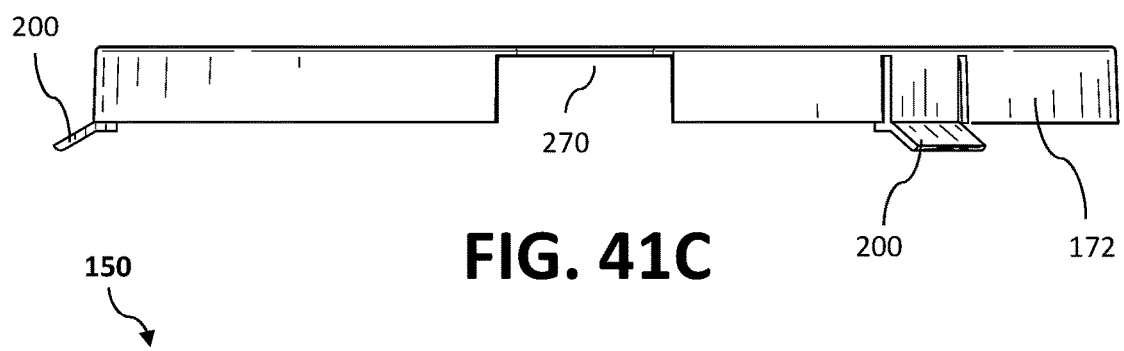
FIG. 41C is a left side elevation view of the sixth embodiment.
Figure 41D:
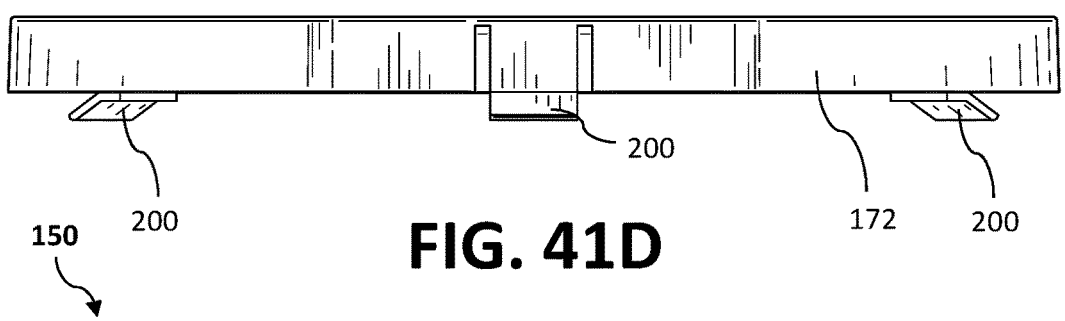
FIG. 41D is a rear elevation view of the sixth embodiment.
Figure 41E:
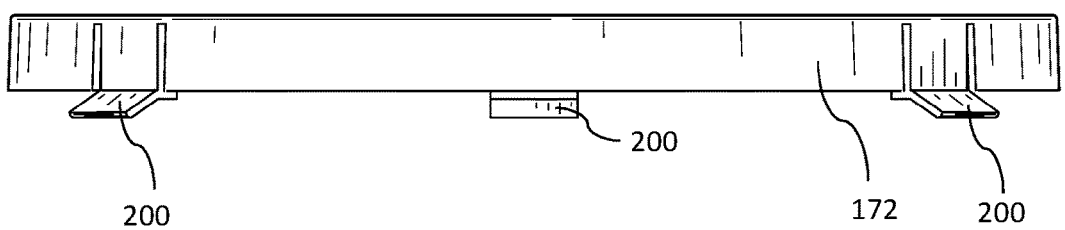
FIG. 41E is a front elevation view of the sixth embodiment.
Figure 41G:
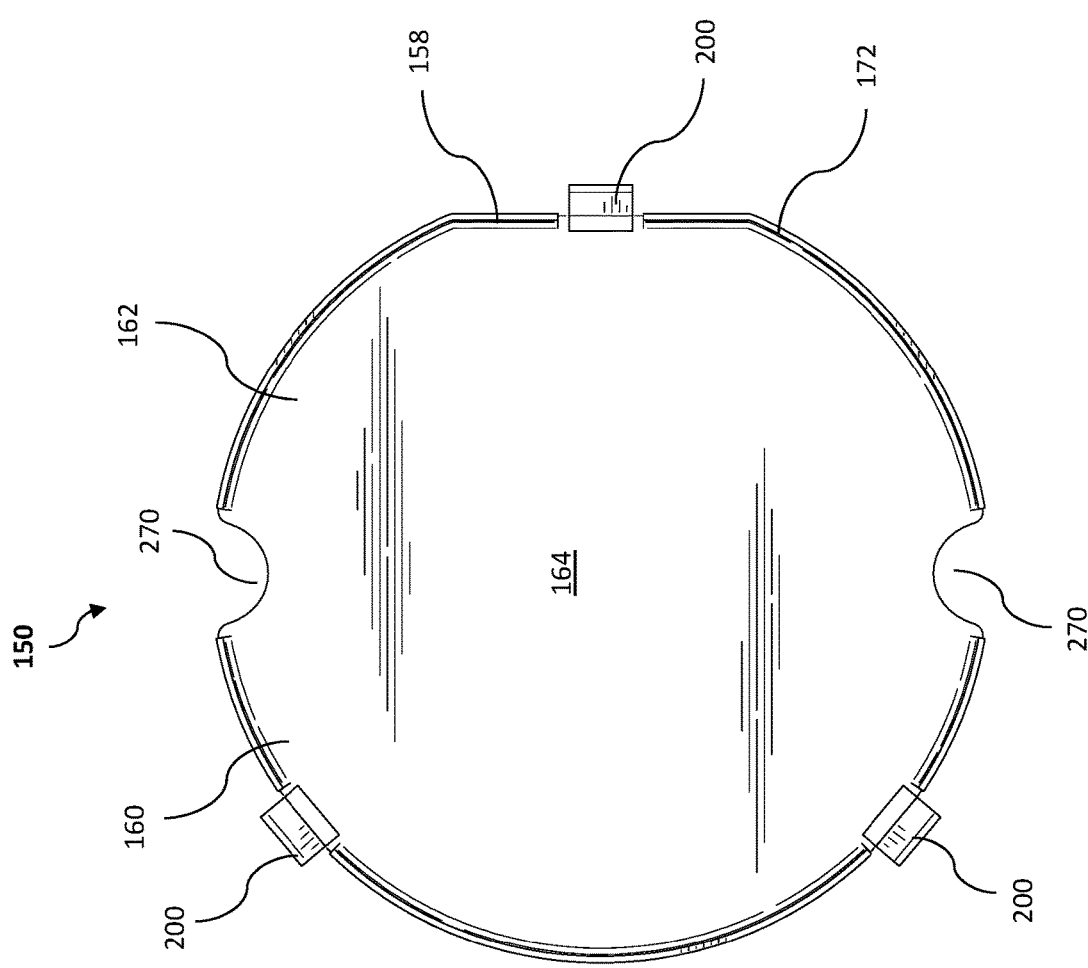
FIG. 41G is a bottom plan view of the sixth embodiment.
Figure 41H:
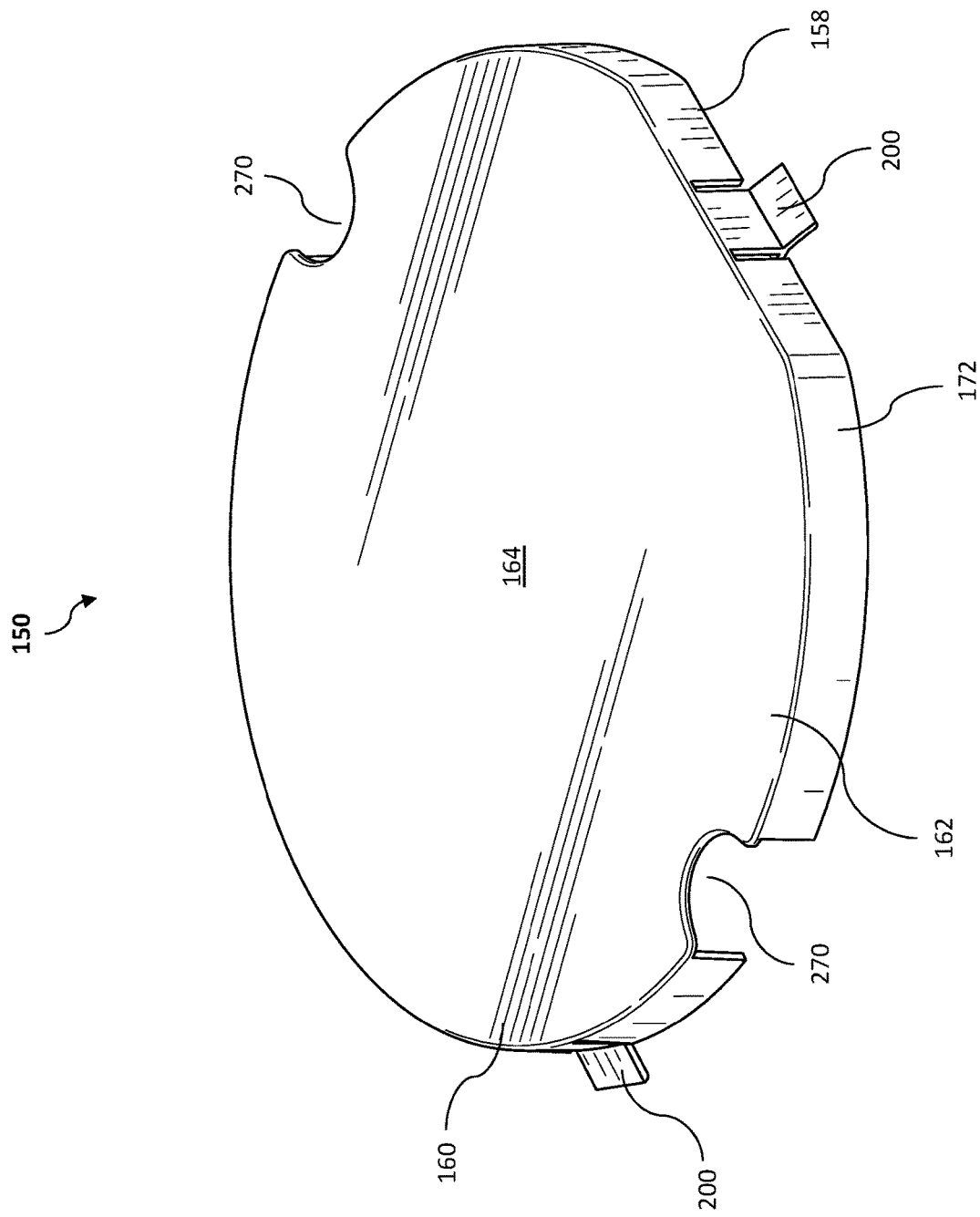
FIG. 41H is a rear perspective view of the sixth embodiment.

Another embodiment of a lid 150 is illustrated in FIGS. 41A through 41H. FIG. 41A is a left side perspective view, FIGS. 41B through 41E are elevation views of the right side, left side, rear, and front, respectively, FIG. 41F is a top plan view, FIG. 41G is a bottom plan view, and FIG. 41H is a rear perspective view of a lid 150. As illustrated, lid 150 includes a center portion 164, a front portion 160 and rear portion 162 that are semicircular, and a flat back 158. Lid 150 further includes an outer lip 172 extending from a peripheral margin and capable of being exterior of and overhang a rim channel 102 (not shown) when lid 150 is attached to a bucket. Lid 150 further includes a pair of bail mount cutouts 270 having a semicircular shape. In this regard, cutouts 270 are suitable for receiving bail mounts 104 disposed upwardly or laterally from or near a bucket rim channel. Optionally, each bail mount cutout 270 can include a filler 320, such as a rubber grommet. Lid 150 further includes integral locking tabs 200 in the outer lip 172.

Figure 42A:
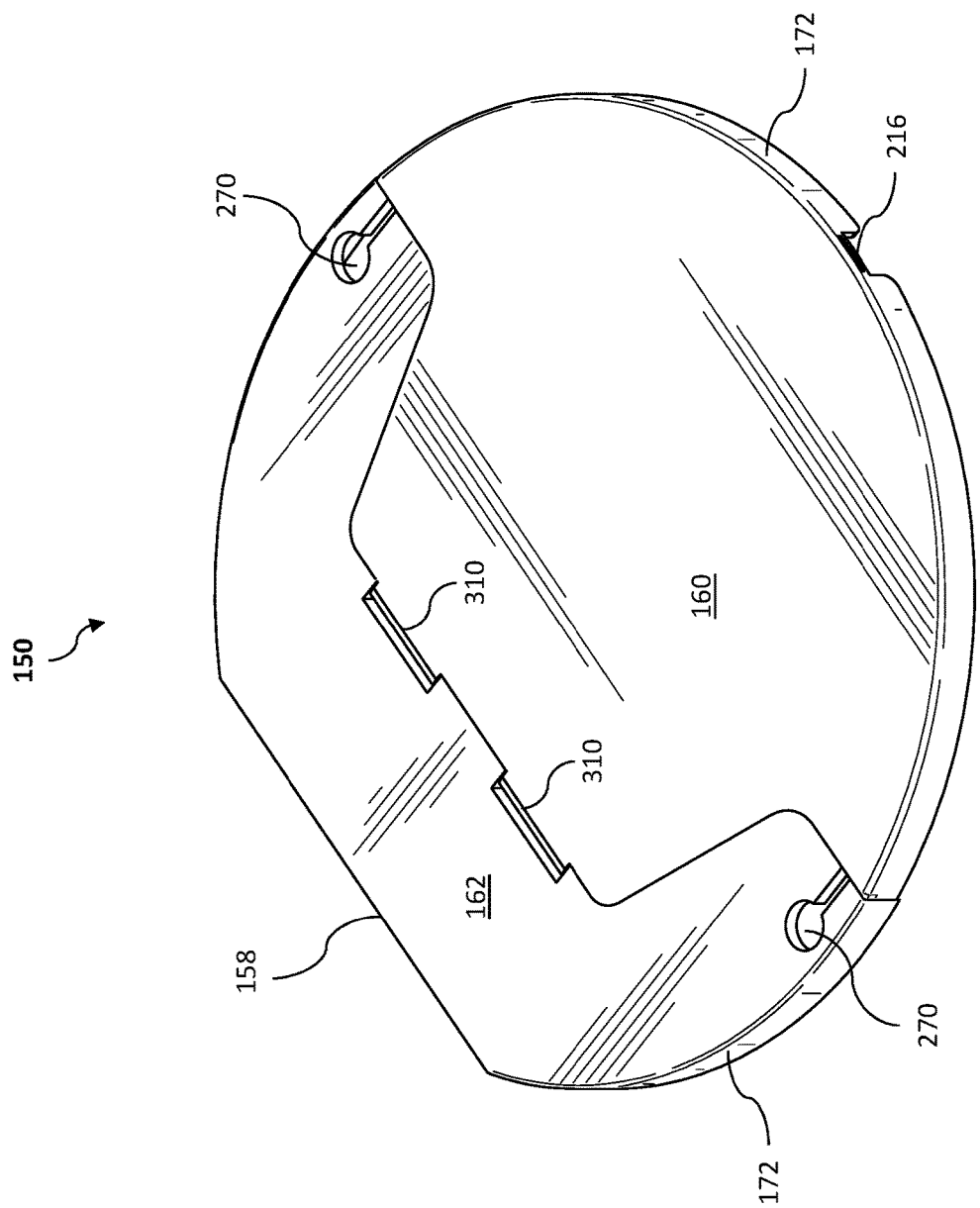
FIG. 42A is a front perspective view illustrating a lid according to a seventh embodiment.
Figure 42B:
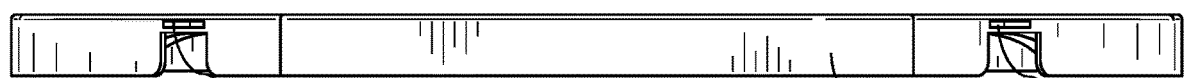
FIG. 42B is a rear elevation view of the seventh embodiment.
Figure 42C:
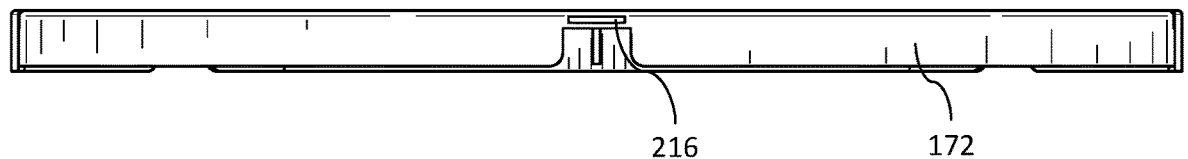
FIG. 42C is a front elevation view of the seventh embodiment.
Figure 42D:
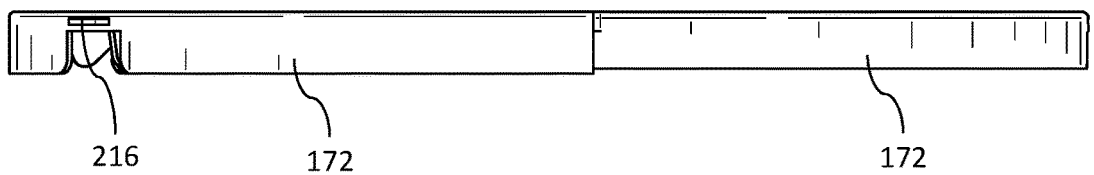
FIG. 42D is a left side elevation view of the seventh embodiment.
Figure 42E:
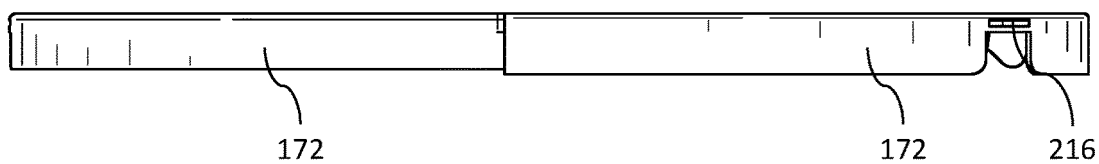
FIG. 42E is a right side elevation view of the seventh embodiment.
Figure 42F:
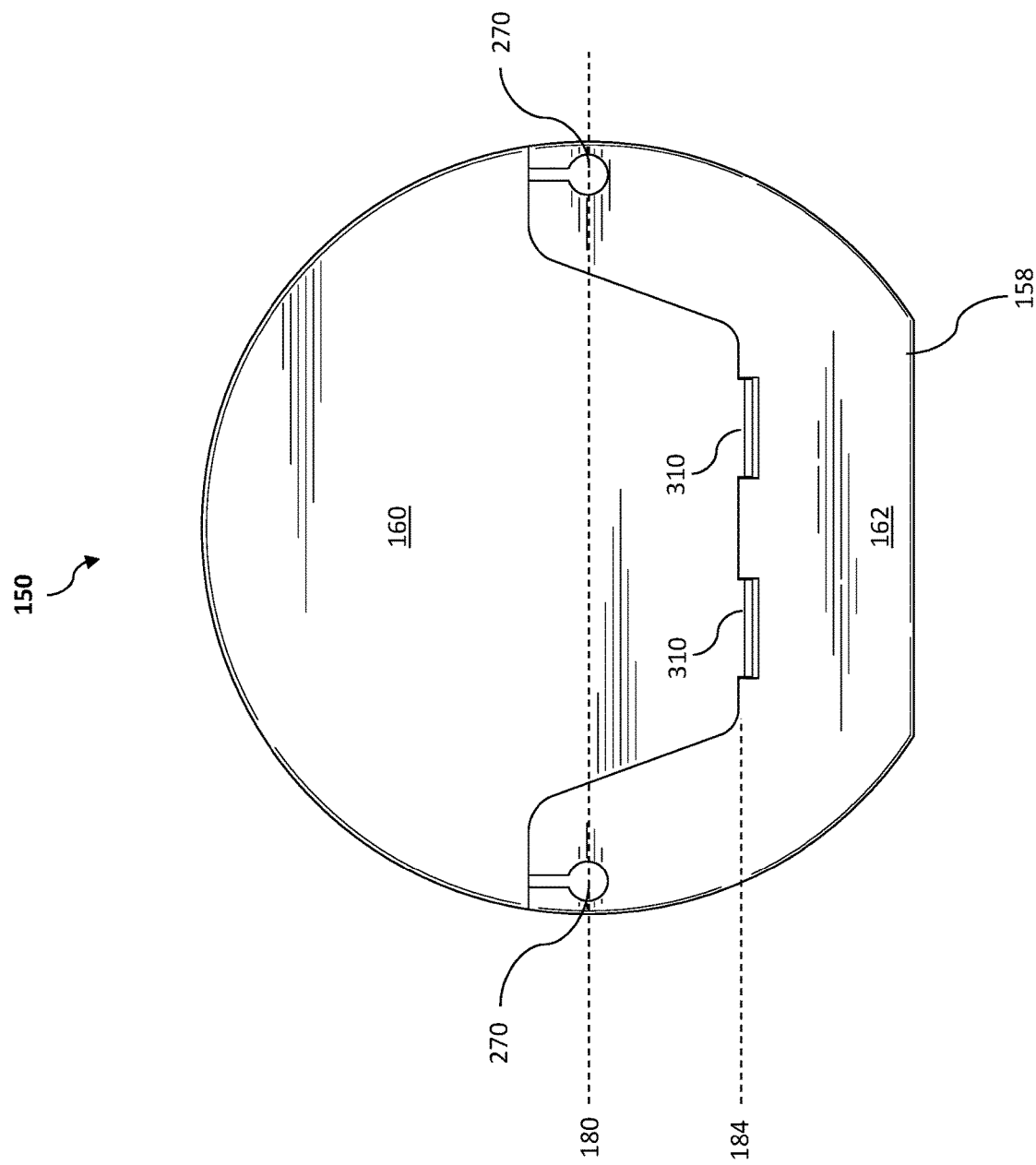
FIG. 42F is a top plan view of the seventh embodiment.
Figure 42G:
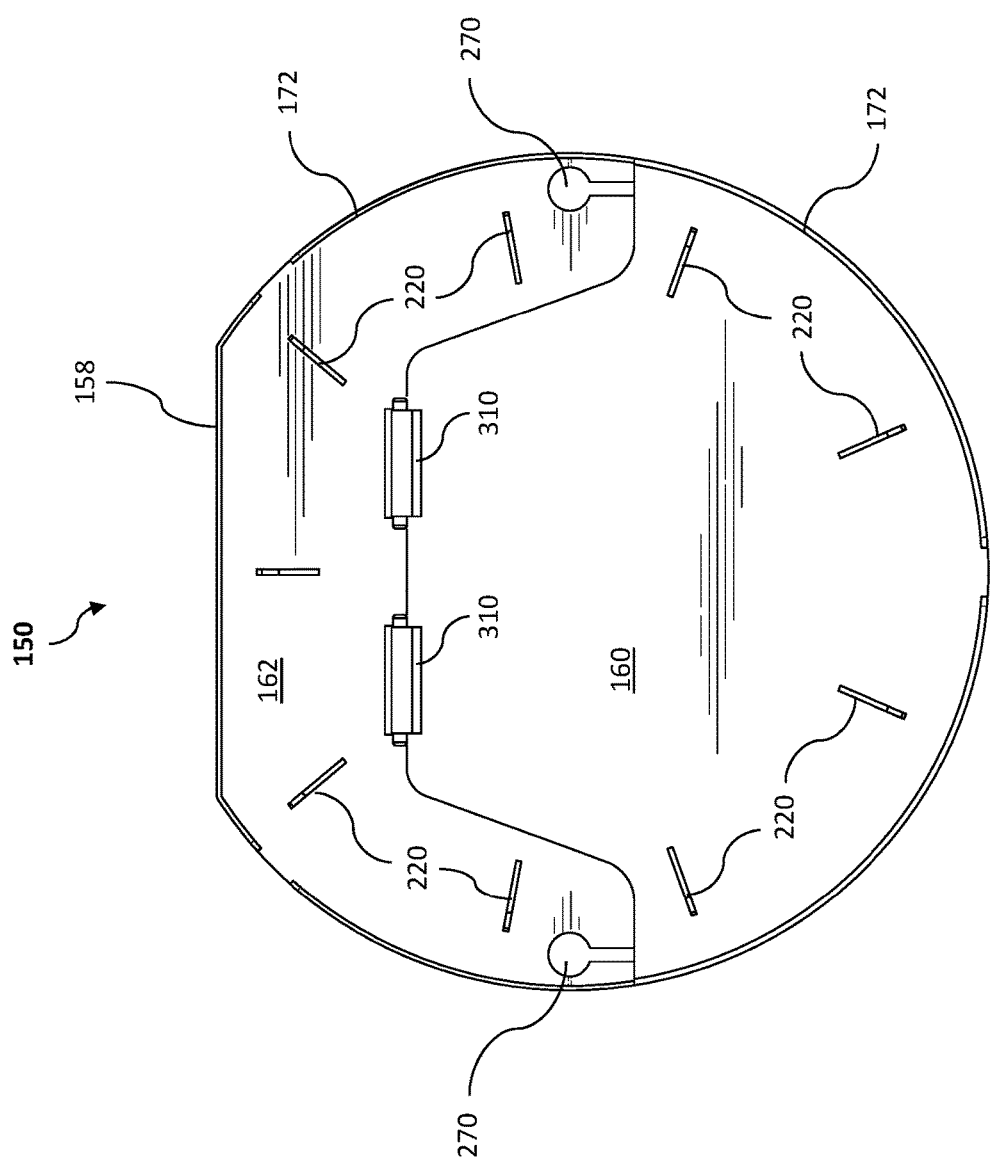
FIG. 42G is a bottom plan view of the seventh embodiment.
Figure 42H:
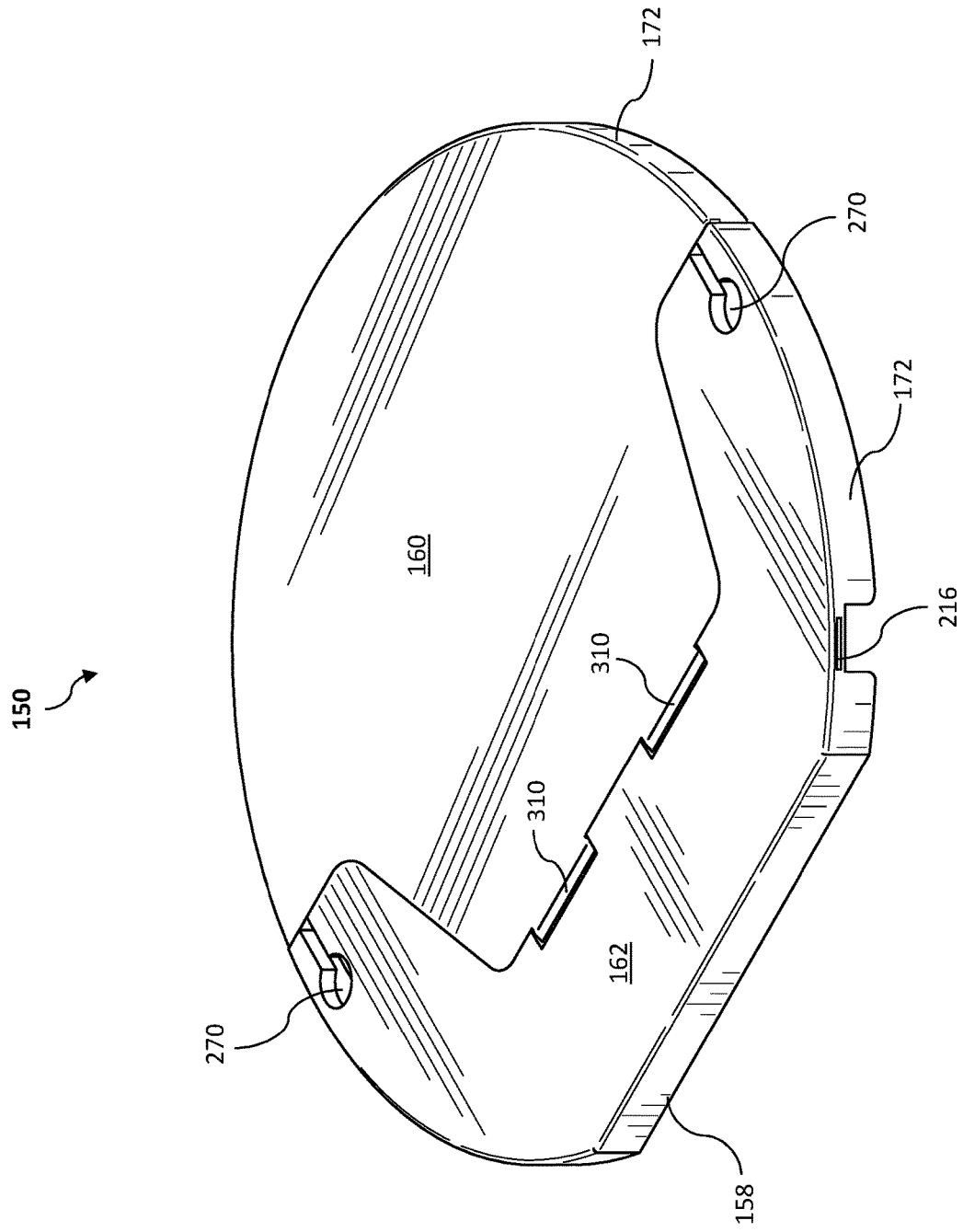
FIG. 42H is a rear perspective view of the seventh embodiment.

Another embodiment of a lid 150 is illustrated in FIGS. 42A through 42H. FIG. 42A is a front perspective view, FIGS. 42B through 42E are elevation views of the rear, front, left side, and right side, respectively, FIG. 41F is a top plan view, FIG. 42G is a bottom plan view, and FIG. 42H is a rear perspective view of a lid 150. As illustrated, lid 150 includes a front portion 160 hingedly connected to rear lid portion 162 by hinged connections 310. Front portion 160 and rear portion 162 have semicircular shapes. Lid 150 further includes a flat back 158. Lid 150 further includes bail mount cutouts 270, which lie on an axis 180 that is substantially parallel to flat back 158. In this regard, cutouts 270 are suitable for receiving bail mounts 104 disposed upwardly from a rim channel 102 (not shown) when lid 150 is attached to a bucket. Optionally, each bail mount cutout 270 can include a filler 320, such as a rubber grommet. Lid 150 further includes outer lips 172 extending downward from peripheral margins in the front portion 160 and rear portion 162. Lid 150 further includes receiving slots 216, which may be capable of receiving a removable locking tab, for example, such as the removable locking tab described in connection with FIGS. 4A through 4C. Hinged connections 310 lie on an axis 184 that is substantially parallel to axis 180 and is located between axis 180 and flat back 158. As best illustrated in FIG. 42G, lid 150 further includes ribs 220 on the bottom surfaces of front portion 160 and rear portion 162.

Figure 43:
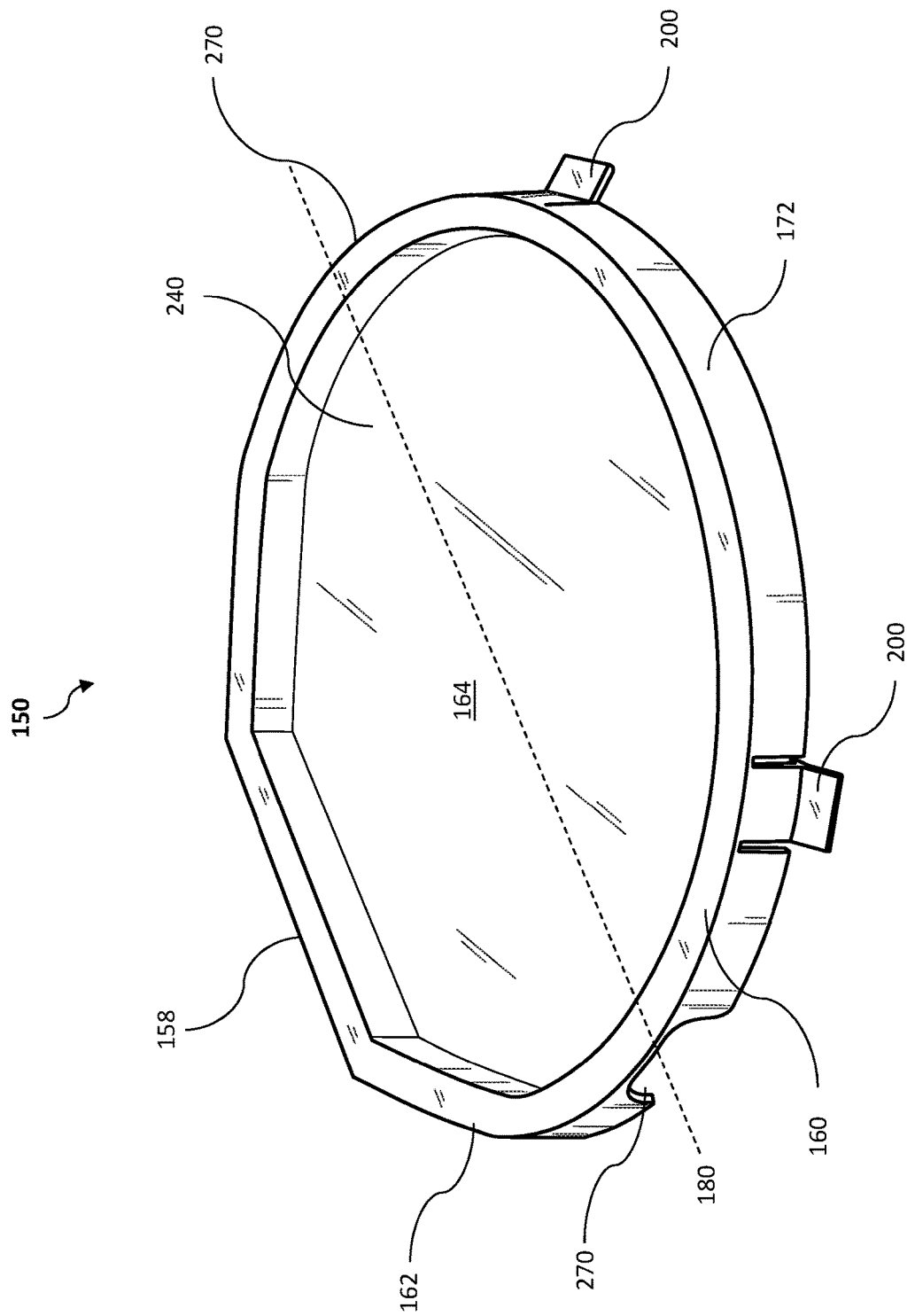
FIG. 43 is a perspective view illustrating a lid according to an eighth embodiment.

Another embodiment of a lid 150 is illustrated in FIG. 43. Lid 150 includes a center portion 164 with a top surface and a bottom surface, a front portion 160 having a semicircular shape, a rear portion 162 having a trapezoidal shape, and a flat back 158. Lid 150 further includes an outer lip 172 extending from a peripheral margin and capable of being exterior of and overhang a rim channel 102 (not shown) when lid 150 is attached to a bucket. Lid 150 further includes a pair of bail mount cutouts 270 in outer lip 172, which lie on an axis 180 that is substantially parallel to flat back 158. In this regard, cutouts 270 are suitable for receiving bail mounts 104 disposed laterally from or near a bucket rim channel. Optionally, each bail mount cutout 270 can include a filler 320, such as a rubber grommet. Lid 150 includes integral locking tabs 200 in the outer lip 172. Center portion 164 includes a downwardly recessed portion 240 suitable for receiving the bottom of another bucket in a stacked relationship and capable of engaging an inner surface of a rim channel 102 of a bucket (not shown).

Figure 44:
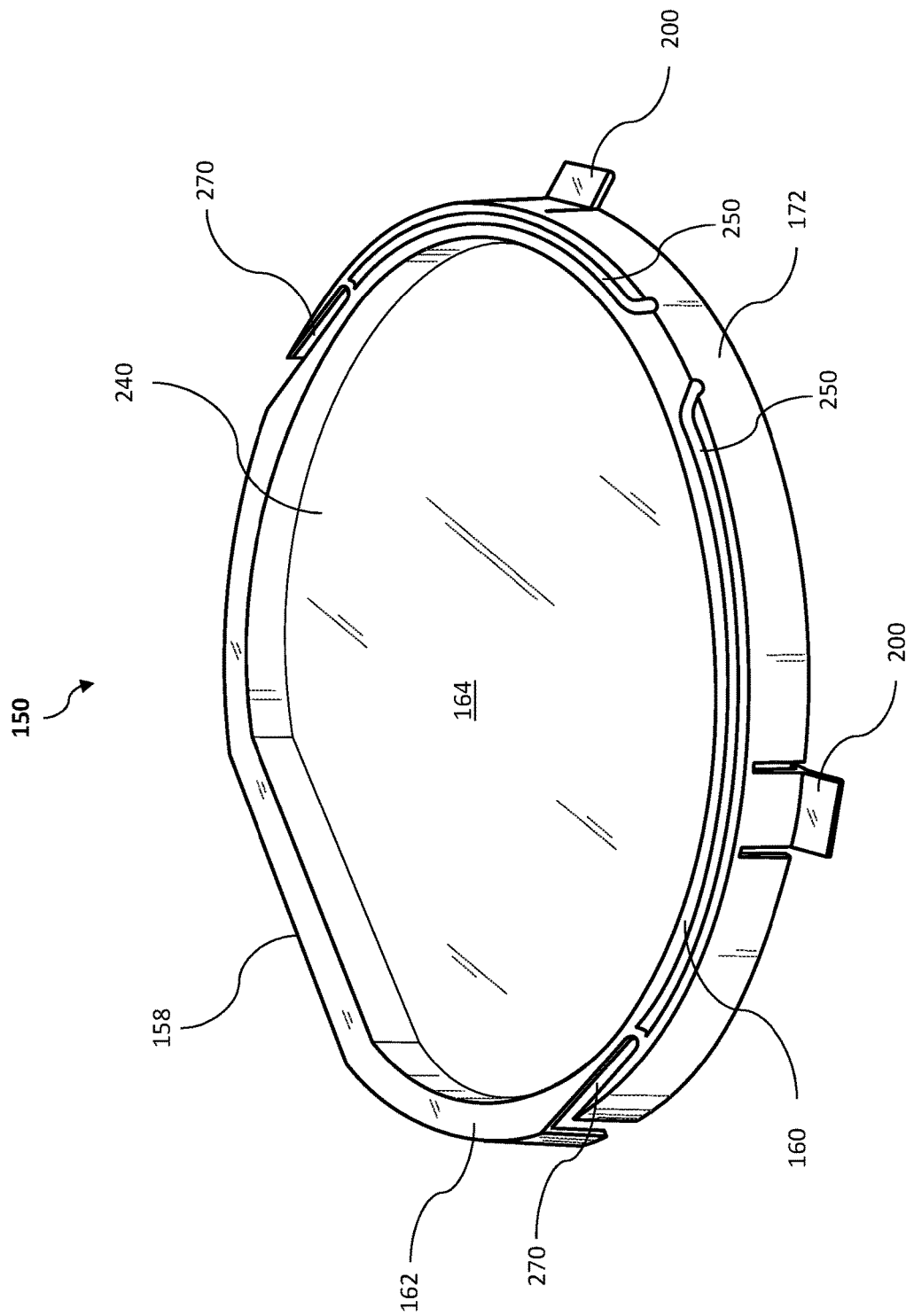
FIG. 44 is a perspective view illustrating a lid according to a ninth embodiment.

Another embodiment of a lid 150 is illustrated in FIG. 44. Lid 150 includes a center portion 164 with a top surface and a bottom surface, a front portion 160 and rear portion 162 having semicircular shapes, and a flat back 158. Lid 150 further includes an outer lip 172 extending from a peripheral margin and capable of being exterior of and overhang a rim channel 102 (not shown) when lid 150 is attached to a bucket. Lid 150 further includes a pair of bail mount cutouts 270 having a slotted-shape with an opening towards the rear portion 162. In this regard, cutouts 270 are suitable for receiving bail mounts 104 disposed upwardly from a bucket rim channel. Optionally, each bail mount cutout 270 can include a filler 320, such as a rubber grommet. Lid 150 further includes integral locking tabs 200 in the outer lip 172. Center portion 164 includes a downwardly recessed portion 240 suitable for receiving the bottom of another bucket in a stacked relationship and capable of engaging an inner surface of a rim channel 102 of a bucket (not shown). Lid 150 illustrated in FIG. 44 further includes grooves 250 in front portion 160 suitable for receiving a bail handle 106 of a bucket 100.

Figures 45A, 45B:
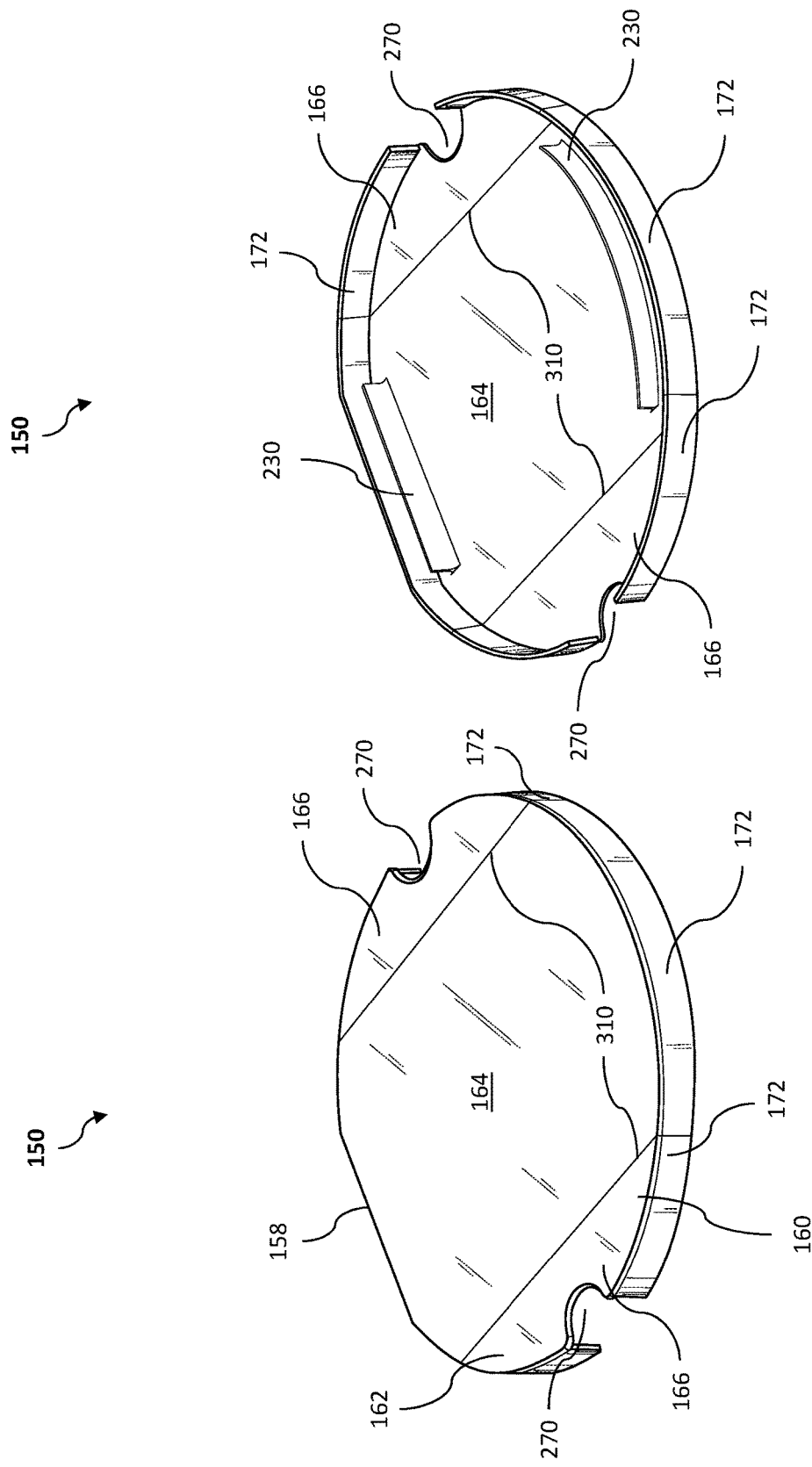
FIGS. 45A and 45B are perspective views illustrating a lid according to a tenth embodiment.

Another embodiment of a lid 150 is illustrated in FIGS. 45A and 45B. Lid 150 includes a center portion 164 with a top surface and a bottom surface, a front portion 160 and rear portion 162 having semicircular shapes, and a flat back 158. Lid 150 further includes two side portions 166 hingedly connected to center portion 164 by hinged connections 310. Alternatively, side portions 166 may be removably coupled to center portion 164, for example, with locking walls 286 and 165 described in connection with FIGS. 16A and 16B. Each side portion 166 includes a bail mount cutout 270 having a semicircular shape. In this regard, cutouts 270 are suitable for receiving bail mounts 104 disposed upwardly or laterally from or near a bucket rim channel. Optionally, each bail mount cutout 270 can include a filler 320, such as a rubber grommet. Center portion 164 and side portions 166 include outer lips 172 extending from a peripheral margin and capable of being exterior of and overhang a rim channel 102 (not shown). As illustrated in FIG. 45B, which is a bottom perspective view, lid 150 further includes retainer lips 230 extending downwardly from the bottom surface of center portion 164. As illustrated, retainer lips 230 are substantially parallel to outer lip 172 and positioned suitably for receiving a rim channel of a bucket. When lid 150 is attached to a bucket 100, retainer lips 230 are capable of engaging an inner surface of rim channel 102.

Another embodiment of a lid 150 is illustrated in FIGS. 46A and 46B. Lid 150 includes a center portion 164 with a top surface and a bottom surface, a front portion 160 and rear portion 162 having semicircular shapes, and a flat back 158. Lid 150 further includes two side portions 166 hingedly connected to center portion 164 by hinged connections 310. Alternatively, side portions 166 may be removably coupled to center portion 164, for example, with locking walls 286 and 165 described in connection with FIGS. 16A and 16B. Each side portion 166 includes a bail mount cutout 270 having a semicircular shape. In this regard, cutouts 270 are suitable for receiving bail mounts 104 disposed upwardly or laterally from or near a bucket rim channel. Optionally, each bail mount cutout 270 can include a filler 320, such as a rubber grommet. Center portion 164 and side portions 166 include outer lips 172 extending from peripheral margins and capable of being exterior of and overhang a rim channel 102 (not shown). Center portion 164 includes a downwardly recessed portion 240 suitable for receiving the bottom of another bucket in a stacked relationship and capable of engaging an inner surface of a rim channel 102 of a bucket (not shown). Lid 150 further includes an integral locking tab 200 in the front of lip 172 of center portion 164. As illustrated in FIG. 46A, lid 150 further includes a groove 250 suitable for receiving a bail handle 106 of a bucket 100.

While particular embodiments and features of buckets and lids have been illustrated and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law. It will be appreciated that the systems and apparatuses described above are set forth by way of example and not of limitation. Numerous variations, additions, omissions, and other modifications will be apparent to one of ordinary skill in the art.

What is claimed is:
1. A lid for a bucket having a rim channel and plural bail mounts, the lid comprising:
   plural cutouts suitable for receiving plural bail mounts of a bucket;
   a center portion with a top surface and a bottom surface; and at least one side portion with a top surface and a bottom surface, the side portion hingedly connected to the center portion and having one of the plural cutouts;

wherein the top surface of the center portion has a substantially greater surface area than the top surface of the at least one side portion;

wherein the plural cutouts are on a first axis and wherein the hinged connection between the center portion and the at least one side portion is on a second axis that is substantially perpendicular to the first axis;

wherein, when the center portion is engaged with a rim channel of a bucket and covering a substantial portion of a mouth of a bucket, the side portion is capable of being rotated from an open vertical position to a closed horizontal position, wherein, during such rotation, the cutout of the at least one side portion receives a bail mount of a bucket;

wherein the lid has a semicircular configuration with a flat back; and wherein the lid further comprises a front portion opposite the flat back of the lid, the front portion having at least one groove suitable for receiving a bail handle of a bucket.

2. A lid for a bucket having a rim channel and plural bail mounts, the lid comprising:

plural cutouts suitable for receiving plural bail mounts of a bucket;

a center portion with a top surface and a bottom surface;

at least one side portion with a top surface and a bottom surface, the side portion hingedly connected to the center portion and having one of the plural cutouts; and outer lips extending from the center portion and the at least one side portion, wherein the outer lips are capable of being exterior of and overhang a rim channel of a bucket;

wherein the top surface of the center portion has a substantially greater surface area than the top surface of the at least one side portion;

wherein the plural cutouts are on a first axis and wherein the hinged connection between the center portion and the at least one side portion is on a second axis that is substantially perpendicular to the first axis;

wherein, when the center portion is engaged with a rim channel of a bucket and covering a substantial portion of a mouth of a bucket, the side portion is capable of being rotated from an open vertical position to a closed horizontal position, wherein, during such rotation, the cutout of the at least one side portion receives a bail mount of a bucket;

wherein the lid has a semicircular configuration with a flat back; and wherein the lid further comprises a front portion opposite the flat back of the lid, the front portion having at least one groove suitable for receiving a bail handle of a bucket.

3. A lid as in claim 2 further comprising at least one retainer lip extending downwardly from the bottom surface of the center portion, the retainer lip being substantially parallel to the outer lip of the center portion and positioned relative to the outer lip of the center portion to form a gap suitable for receiving a rim channel of a bucket, wherein the retainer lip is capable of engaging an inner surface of a rim channel of a bucket.

4. A lid for a bucket comprising:

a first piece having a top surface and a bottom surface, wherein the first piece comprises a center portion of the lid and a cutout suitable for receiving a bail mount of a bucket;

a second piece having a top surface and a bottom surface, wherein the second piece comprises a side portion of the lid and a cutout suitable for receiving a bail mount of a bucket; and at least one groove suitable for receiving a bail handle of a bucket;

wherein the top surface of the first piece has a substantially greater surface area than the top surface of the second piece;

wherein the first piece and the second piece are configured to engage one another such that, when engaged, the lid is suitable for covering substantially all of a mouth of a bucket;

wherein the first piece and the second piece are further configured to be detachable from one another and from a bucket;

wherein, when the first piece is engaged with a rim channel of a bucket and covering a portion of a mouth of a bucket, the second piece is capable of being detached from the first piece, and the second piece is capable of being joined to the first piece, wherein, during such joining, the cutout of the second piece receives a bail mount of a bucket;

wherein the lid has a semicircular configuration with a flat back, wherein an axis of engagement between the first piece and the second piece is approximately perpendicular to the flat back.

\* \* \* \* \*